United States Patent
Seiders et al.

(10) Patent No.: US 11,001,422 B2
(45) Date of Patent: May 11, 2021

(54) CLOSURE AND LID AND METHOD OF FORMING CLOSURE AND LID

(71) Applicant: YETI Coolers, LLC, Austin, TX (US)

(72) Inventors: Roy Joseph Seiders, Austin, TX (US); John Alan Tolman, Austin, TX (US); Steve Charles Nichols, Austin, TX (US)

(73) Assignee: YETI Coolers, LLC, Austin, TX (US)

( * ) Notice: Subject to any disclaimer, the term of this patent is extended or adjusted under 35 U.S.C. 154(b) by 0 days.

(21) Appl. No.: 17/082,957

(22) Filed: Oct. 28, 2020

(65) Prior Publication Data

US 2021/0047089 A1 Feb. 18, 2021

Related U.S. Application Data

(60) Continuation of application No. 16/261,661, filed on Jan. 30, 2019, which is a division of application No.
(Continued)

(51) Int. Cl.
*B65D 51/18* (2006.01)
*A47G 19/22* (2006.01)
(Continued)

(52) U.S. Cl.
CPC .......... *B65D 51/18* (2013.01); *A47G 19/2272* (2013.01); *B29C 45/1671* (2013.01);
(Continued)

(58) Field of Classification Search
CPC .. B65D 51/18; B65D 47/286; B65D 51/1605; B65D 43/0229; B65D 2251/0025;
(Continued)

(56) References Cited

U.S. PATENT DOCUMENTS

| D109,789 S | 5/1938 | Pershall |
|---|---|---|
| D112,150 S | 11/1938 | Pershall |

(Continued)

FOREIGN PATENT DOCUMENTS

| AU | 2011211425 A1 | 9/2011 |
|---|---|---|
| CN | 101037153 A | 9/2007 |

(Continued)

OTHER PUBLICATIONS

United States District Court Western District of Texas Austin Division, "Complaint," *Yeti Coolers, LLC* v. *Dunhuang Group, SZ Flowerfairy Technology Co., Ltd., Tan Er Pa Technology Co., Ltd., Shenzhen Great Electronic Technology Co., Ltd., and Huagong Trading Co.*, Case: 1:17-cv-00938, Document #1, filed Sep. 28, 2017, 272 pages.

(Continued)

*Primary Examiner* — J. Gregory Pickett
*Assistant Examiner* — Niki M Eloshway
(74) *Attorney, Agent, or Firm* — Banner & Witcoff, Ltd.

(57) ABSTRACT

An example lid assembly can include a lid and a slider. The lid can include a wall defining a recess. The slider can be configured to slide in the recess and can be configured to move between a closed position where the slider covers the opening to aid in preventing spilling of contents of the container and an opened position where the slider uncovers the opening such that the contents of the container can be consumed. The slider can be configured to be removable from the lid and can be replaced back on the lid. Additionally, the slider can be configured to lock into place on the recess in both the closed position and the opened position.

30 Claims, 20 Drawing Sheets

Related U.S. Application Data

15/288,175, filed on Oct. 7, 2016, now Pat. No. 10,232,993, which is a continuation-in-part of application No. 14/971,788, filed on Dec. 16, 2015, now Pat. No. 10,124,942, and a continuation-in-part of application No. 14/971,779, filed on Dec. 16, 2015, now Pat. No. 10,232,992.

(60) Provisional application No. 62/248,996, filed on Oct. 30, 2015.

(51) Int. Cl.
  *B65D 47/28* (2006.01)
  *B29C 45/16* (2006.01)
  *B65D 51/16* (2006.01)
  *B29K 101/12* (2006.01)
  *B29L 31/56* (2006.01)
  *B65D 43/02* (2006.01)

(52) U.S. Cl.
  CPC ....... *B65D 47/286* (2013.01); *B65D 51/1605* (2013.01); *A47G 2200/106* (2013.01); *B29C 2045/1673* (2013.01); *B29K 2101/12* (2013.01); *B29K 2995/0008* (2013.01); *B29L 2031/565* (2013.01); *B65D 43/0229* (2013.01); *B65D 2251/0025* (2013.01); *B65D 2251/0081* (2013.01); *B65D 2543/00046* (2013.01); *B65D 2543/00092* (2013.01)

(58) Field of Classification Search
  CPC ........ B65D 2251/0081; B65D 2313/04; B65D 41/16; A47G 19/2272; A47G 2200/106; B29C 45/02; B29C 45/0013; B29C 45/1671; B29C 45/1657; B29C 2045/1673; B29C 2045/0158
  USPC .............................................. 220/230, 254.9
  See application file for complete search history.

(56) References Cited

U.S. PATENT DOCUMENTS

| | | |
|---|---|---|
| D114,536 S | 5/1939 | Hacmac |
| D121,154 S | 6/1940 | Bernhardt |
| 2,304,214 A | 12/1942 | Straub |
| D157,491 S | 2/1950 | Heintze |
| D177,559 S | 5/1956 | Emmert |
| 2,762,621 A | 9/1956 | Zumwalt |
| D209,308 S | 11/1967 | Schilling |
| D217,781 S | 6/1970 | Stone |
| D229,006 S | 11/1973 | Sauey |
| 3,938,690 A | 2/1976 | Butler |
| 4,057,167 A | 11/1977 | Lee |
| 4,570,817 A | 2/1986 | Hambleton et al. |
| D285,032 S | 8/1986 | Alonzo |
| D288,667 S | 3/1987 | Miner |
| D289,484 S | 4/1987 | Forquer et al. |
| 4,819,829 A | 4/1989 | Rosten et al. |
| D307,743 S | 5/1990 | Pierce et al. |
| D314,708 S | 2/1991 | DeCoster |
| 5,208,951 A | 5/1993 | Aoki |
| D379,738 S | 6/1997 | Liming et al. |
| D384,646 S | 10/1997 | Miller et al. |
| D412,806 S | 8/1999 | Pierce |
| D416,755 S | 11/1999 | Trombly |
| D416,757 S | 11/1999 | Ginuntoli |
| 5,984,156 A | 11/1999 | Bridges |
| D417,589 S | 12/1999 | Parker |
| D417,819 S | 12/1999 | Kelly-Pollet |
| D425,374 S | 5/2000 | Besser et al. |
| D432,865 S | 10/2000 | Cohen |
| D433,876 S | 11/2000 | Freed |
| D436,295 S | 1/2001 | Furman et al. |
| D446,687 S | 8/2001 | Furman et al. |
| D448,620 S | 10/2001 | Neal |
| D449,963 S | 11/2001 | Neal |
| D455,610 S | 4/2002 | Bridges |
| D456,212 S | 4/2002 | Bridges |
| D457,389 S | 5/2002 | Snell |
| D457,395 S | 5/2002 | Gluck |
| D458,081 S | 6/2002 | Bodum |
| D458,082 S | 6/2002 | Gluck |
| RE37,773 E | 7/2002 | Trombley |
| D461,679 S | 8/2002 | Robinson et al. |
| D462,575 S | 9/2002 | Gluck |
| D463,715 S | 10/2002 | Dretzka |
| D466,371 S | 12/2002 | Parker |
| D471,763 S | 3/2003 | Hurlbut et al. |
| D472,101 S | 3/2003 | Janky |
| D475,891 S | 6/2003 | Bin |
| D476,193 S | 6/2003 | Janky |
| D477,185 S | 7/2003 | Janky |
| D477,532 S | 7/2003 | Wong |
| 6,626,326 B2 | 9/2003 | Murakami |
| D481,590 S | 11/2003 | Lin |
| D481,591 S | 11/2003 | Lin |
| D482,238 S | 11/2003 | Lin |
| D483,165 S | 12/2003 | Dretzka |
| D483,995 S | 12/2003 | Otake |
| D486,996 S | 2/2004 | Karp |
| D488,672 S | 4/2004 | Oas |
| D490,274 S | 5/2004 | Irvine |
| 6,752,287 B1 | 6/2004 | Lin |
| D493,068 S | 7/2004 | Slater et al. |
| D498,979 S | 11/2004 | Bhavnani |
| 6,824,003 B1 | 11/2004 | Wong |
| D511,653 S | 11/2005 | Oas |
| D515,358 S | 2/2006 | Orr et al. |
| D522,855 S | 6/2006 | Liebe et al. |
| D523,692 S | 6/2006 | Meehan |
| D523,693 S | 6/2006 | Bodum |
| D530,153 S | 10/2006 | Karp |
| D531,033 S | 10/2006 | Schmidtner et al. |
| D531,451 S | 11/2006 | Bin |
| D533,402 S | 12/2006 | Bin |
| D533,747 S | 12/2006 | Jin |
| D533,748 S | 12/2006 | Bresler |
| D533,779 S | 12/2006 | Schmidtner et al. |
| D534,069 S | 12/2006 | Ohno et al. |
| D534,396 S | 1/2007 | Kramer |
| D536,213 S | 2/2007 | Schuler et al. |
| D536,214 S | 2/2007 | Schuler et al. |
| D537,677 S | 3/2007 | Bresler |
| D539,609 S | 4/2007 | Ying et al. |
| D541,105 S | 4/2007 | Jin |
| D545,128 S | 6/2007 | Liu et al. |
| D545,129 S | 6/2007 | Tien |
| D548,012 S | 8/2007 | Tien |
| D548,522 S | 8/2007 | Greenspon |
| D548,523 S | 8/2007 | Greenspon |
| D550,032 S | 9/2007 | Tien |
| D550,503 S | 9/2007 | Liu |
| D553,440 S | 10/2007 | Bodum |
| 7,275,653 B2 | 10/2007 | Tedford, Jr. |
| D554,431 S | 11/2007 | Tien |
| D558,523 S | 1/2008 | Bhavnani |
| D560,512 S | 1/2008 | Safar |
| D565,901 S | 4/2008 | Edelstein et al. |
| D568,107 S | 5/2008 | Bhavnani |
| D569,182 S | 5/2008 | Homma |
| D569,183 S | 5/2008 | Blake |
| D571,152 S | 6/2008 | Tien |
| D571,154 S | 6/2008 | Pearson |
| D572,083 S | 7/2008 | Tien |
| D572,473 S | 7/2008 | Tuttle |
| D572,474 S | 7/2008 | Tuttle |
| D572,475 S | 7/2008 | Tuttle |
| D573,839 S | 7/2008 | Sun |
| D577,260 S | 9/2008 | Bodum |
| 7,455,191 B2 | 11/2008 | Bhavnani |
| D582,206 S | 12/2008 | Fuller |
| D583,191 S | 12/2008 | Wong |

(56) References Cited

U.S. PATENT DOCUMENTS

| | | |
|---|---|---|
| D584,102 S | 1/2009 | Valderrama et al. |
| D584,106 S | 1/2009 | Wong |
| D586,182 S | 2/2009 | Trombly |
| D589,747 S | 4/2009 | Wong |
| D589,751 S | 4/2009 | Liu et al. |
| D591,103 S | 4/2009 | Wong |
| 7,513,380 B2 | 4/2009 | Canedo |
| D591,556 S | 5/2009 | Fuller |
| D593,802 S | 6/2009 | Baek |
| D600,073 S | 9/2009 | Carreno |
| 7,591,389 B2 | 9/2009 | Wong |
| D604,102 S | 11/2009 | Pearson |
| 7,611,029 B2 | 11/2009 | Wong |
| D609,526 S | 2/2010 | Tuttle |
| D613,554 S | 4/2010 | Koennecke |
| D615,358 S | 5/2010 | Wahl |
| D618,050 S | 6/2010 | Eisenhardt |
| D618,964 S | 7/2010 | Eisenhardt |
| D621,659 S | 8/2010 | Liu |
| D622,548 S | 8/2010 | Jensen et al. |
| D625,951 S | 10/2010 | Baek |
| D629,653 S | 12/2010 | Gullickson et al. |
| 7,845,510 B2 | 12/2010 | Schmidtner et al. |
| 7,850,037 B2 | 12/2010 | Schmidtner et al. |
| D631,284 S | 1/2011 | Fuller |
| 7,874,447 B2 | 1/2011 | Schmidtner et al. |
| D631,699 S | 2/2011 | Moreau |
| 7,950,541 B2 | 5/2011 | Holcomb et al. |
| D647,760 S | 11/2011 | Pearson |
| D648,599 S | 11/2011 | Watanabe et al. |
| D651,045 S | 12/2011 | Eyal |
| D652,248 S | 1/2012 | Valderrama et al. |
| D659,474 S | 5/2012 | Wahl et al. |
| D660,082 S | 5/2012 | Wahl |
| D664,001 S | 7/2012 | Liu |
| 8,215,519 B2 | 7/2012 | Steininger |
| D666,052 S | 8/2012 | Trombly |
| D667,268 S | 9/2012 | Pallotto |
| D667,272 S | 9/2012 | Fishman et al. |
| D669,306 S | 10/2012 | Barreto et al. |
| D669,310 S | 10/2012 | Barreto et al. |
| D669,735 S | 10/2012 | Wong |
| D675,063 S | 1/2013 | Wahl |
| D677,122 S | 3/2013 | Liu |
| 8,397,934 B2 | 3/2013 | Lai |
| 8,397,940 B2 | 3/2013 | Steininger |
| 8,403,166 B2 | 3/2013 | Steininger |
| D693,176 S | 11/2013 | Kaiser |
| D696,586 S | 12/2013 | Huang |
| D698,200 S | 1/2014 | Lauwagie |
| 8,636,167 B2 | 1/2014 | Hajichristou et al. |
| 8,640,904 B2 | 2/2014 | Steininger et al. |
| D704,986 S | 5/2014 | Manies |
| D709,328 S | 7/2014 | Ross |
| D711,280 S | 8/2014 | Tannenbaum |
| D712,701 S | 9/2014 | Boroski |
| D713,202 S | 9/2014 | Lin |
| D713,686 S | 9/2014 | Eyal |
| D715,100 S | 10/2014 | Eyal |
| D717,103 S | 11/2014 | Wilbur |
| D717,605 S | 11/2014 | Kristinik |
| D717,606 S | 11/2014 | Kristinik |
| D718,087 S | 11/2014 | Marasligiller et al. |
| D720,183 S | 12/2014 | Chiang |
| 8,919,593 B2 | 12/2014 | Sinacori et al. |
| 8,925,756 B2 | 1/2015 | Tarapata et al. |
| D725,970 S | 4/2015 | Karussi et al. |
| D728,313 S | 5/2015 | Bo |
| D729,581 S | 5/2015 | Boroski |
| 9,022,239 B2 | 5/2015 | Mackenzie et al. |
| D731,251 S | 6/2015 | Lane |
| D732,338 S | 6/2015 | Boroski |
| D732,343 S | 6/2015 | Romley |
| D732,895 S | 6/2015 | McClellan |
| D734,092 S | 7/2015 | Kristinik |
| D736,564 S | 8/2015 | Thornton et al. |
| D742,173 S | 11/2015 | Perman |
| D742,177 S | 11/2015 | Morris, II et al. |
| D743,209 S | 11/2015 | Maas et al. |
| D744,280 S | 12/2015 | Chiang |
| D744,286 S | 12/2015 | Morris, II et al. |
| D751,338 S | 3/2016 | Seiders et al. |
| D751,339 S | 3/2016 | Seiders et al. |
| D751,340 S | 3/2016 | Seiders et al. |
| D751,341 S | 3/2016 | Seiders et al. |
| D758,792 S | 6/2016 | Karussi |
| D761,619 S | 7/2016 | Seiders et al. |
| 9,456,710 B2 * | 10/2016 | Blain ............... B65D 43/26 |
| D790,272 S | 6/2017 | Han |
| D790,913 S | 7/2017 | Stover et al. |
| D796,256 S | 9/2017 | Stover et al. |
| D796,902 S | 9/2017 | Gordon |
| D797,510 S | 9/2017 | Ke |
| D798,716 S | 10/2017 | Fitchell |
| 9,782,029 B1 | 10/2017 | FitzSimons |
| D801,746 S | 11/2017 | Thuma et al. |
| 9,815,076 B2 | 11/2017 | Schulz et al. |
| D804,905 S | 12/2017 | Seiders et al. |
| 9,845,181 B2 | 12/2017 | Abraham |
| 9,889,968 B2 | 2/2018 | Morewitz et al. |
| D814,240 S | 4/2018 | Kabalin |
| D817,094 S | 5/2018 | Silsby et al. |
| D820,044 S | 6/2018 | Jenkins et al. |
| D820,045 S | 6/2018 | Harrington, III et al. |
| D824,212 S | 7/2018 | Seiders et al. |
| D830,770 S | 10/2018 | Verhoeven |
| 10,124,942 B2 * | 11/2018 | Seiders ............ B29C 45/0013 |
| D839,049 S | 1/2019 | Seiders et al. |
| 10,232,992 B2 | 3/2019 | Seiders et al. |
| D871,149 S | 12/2019 | Kaiser |
| 2005/0045643 A1 | 3/2005 | Ghanem |
| 2005/0121015 A1 | 6/2005 | Postorivo |
| 2006/0201945 A1 | 9/2006 | Tedford |
| 2006/0261068 A1 | 11/2006 | Schmidtner et al. |
| 2007/0012697 A1 | 1/2007 | Holcomb et al. |
| 2007/0170184 A1 | 7/2007 | Canedo |
| 2007/0215625 A1 | 9/2007 | Schmidtner et al. |
| 2007/0272650 A1 | 11/2007 | Kishi et al. |
| 2007/0278228 A1 | 12/2007 | Wong |
| 2008/0006643 A1 | 1/2008 | Ma |
| 2008/0073343 A1 | 3/2008 | Shadrach et al. |
| 2008/0073347 A1 | 3/2008 | Shadrach |
| 2008/0087264 A1 | 4/2008 | Postorivo |
| 2010/0200590 A1 | 8/2010 | Shadrach, III et al. |
| 2010/0206874 A1 | 8/2010 | Masurier et al. |
| 2010/0251119 A1 | 9/2010 | Geppert et al. |
| 2011/0007960 A1 | 1/2011 | Nireki |
| 2011/0079601 A1 | 4/2011 | Steininger |
| 2011/0132907 A1 | 6/2011 | Hajichristou et al. |
| 2012/0012585 A1 | 1/2012 | Sinacori et al. |
| 2012/0080429 A1 | 4/2012 | Steininger |
| 2012/0080456 A1 | 4/2012 | Steininger |
| 2012/0205371 A1 | 8/2012 | Lee |
| 2012/0305558 A1 | 12/2012 | Steininger |
| 2012/0305559 A1 | 12/2012 | Steininger |
| 2012/0305563 A1 | 12/2012 | Steininger |
| 2012/0312816 A1 | 12/2012 | Barreto et al. |
| 2013/0140316 A1 | 6/2013 | Flowers et al. |
| 2013/0213978 A1 | 8/2013 | Libourel et al. |
| 2013/0320013 A1 | 12/2013 | Bratsch |
| 2014/0034080 A1 | 2/2014 | Paquet et al. |
| 2014/0117016 A1 | 5/2014 | Hodge |
| 2015/0102032 A1 | 4/2015 | Dunn et al. |
| 2015/0102046 A1 | 4/2015 | Steininger |
| 2015/0250341 A1 | 9/2015 | Liu et al. |
| 2015/0351568 A1 | 12/2015 | Blain et al. |
| 2016/0236838 A1 * | 8/2016 | Dabbur ............ B65D 17/401 |
| 2016/0272384 A1 * | 9/2016 | Lee ............... A47G 19/2272 |
| 2017/0066573 A1 | 3/2017 | Karussi et al. |
| 2017/0101230 A1 | 4/2017 | Sato |
| 2017/0121072 A1 | 5/2017 | Seiders et al. |
| 2017/0121073 A1 | 5/2017 | Seiders et al. |

(56) References Cited

U.S. PATENT DOCUMENTS

| | | | |
|---|---|---|---|
| 2017/0121074 | A1 | 5/2017 | Seiders et al. |
| 2017/0225855 | A1 | 8/2017 | Lawson et al. |
| 2018/0127165 | A1 | 5/2018 | Smaldone et al. |

FOREIGN PATENT DOCUMENTS

| | | | |
|---|---|---|---|
| CN | 301355584 | | 9/2010 |
| CN | 102802462 | A | 11/2012 |
| CN | 103654438 | A | 3/2014 |
| CN | 302770712 | | 3/2014 |
| CN | 302823399 | | 5/2014 |
| CN | 302846547 | | 6/2014 |
| CN | 303176496 | | 4/2015 |
| CN | 303652430 | | 11/2015 |
| CN | 303589339 | | 2/2016 |
| CN | 303883775 | | 10/2016 |
| CN | 207383540 | U | 5/2018 |
| EM | 002775078-0001 | | 11/2015 |
| EP | 2432349 | B1 | 4/2013 |
| JP | D1507225 | | 9/2014 |
| KR | 300953895.0000 | | 4/2018 |
| WO | 2007087185 | A2 | 8/2007 |
| WO | 2008021523 | A2 | 2/2008 |
| WO | 2008121942 | A2 | 10/2008 |
| WO | 2012031994 | A1 | 3/2012 |
| WO | 2012107861 | A2 | 8/2012 |

OTHER PUBLICATIONS

United States International Trade Commission of Washington, DC, "Complaint Under Section 337 of the Tariff Act of 1930, as Amended," *Yeti Coolers, LLC* vs. *Alibaba(China) Technology Co., Ltd., Alibaba Group Holding Limited, Alibaba.com Hong Kong Limited, Alibaba.com Singapore E-Commerce Private Limited, Bonanza. com, Inc., ContextLogic, Inc. d/b/a Wish, Dunhuang Group, Hangzhou Alibaba Advertising Co. Ltd., Huizhou Dashu Trading Co., Ltd, Huagong Trading Co., and Tan Er Pa Technology Co., Ltd.*, filed Sep. 28, 2017, 191 pages.

United States District Court Western District of Texas Austin Division, "Second Amended Complaint," *YETI Coolers, LLC* v. *Sam's West, Inc., and Sam's East, Inc., and CY Top, Ltd.*, Case: 1:16-cv-00829-RP, Document #51, filed Sep. 22, 2017, 49 pages.

United States District Court Western District of Texas Austin Division, "Defendant Takeya USA Corporation's Memorandum in Support of Rule 12(b)(6) Motion to Dismiss," *YETI Coolers, LLC* v. *Home Depot U.S.A., Inc., Takeya USA Corporation*, Case: 1:17-cv-00342, Document #12, filed May 25, 2017, 34 pages.

United States District Court Western District of Texas Austin Division, "Defendant Kelly Scoggins d/b/a King Engraving's Memorandum in Support of Rule 12(b)(6) Motion to Dismiss and Motion to Take Judicial Notice," *YETI Coolers, LLC* v. *JDS Industries, Inc., Lionel Landry Jr., d/b/a Accolades d/b/a Accolades Awards & Engraving, Creative and Fast LLC d/b/a Promotional Products San Antonio, Kelly Scoggins d/b/a King Engraving*, Case: 1:17-cv-00424-RP, Document #65, filed Aug. 11, 2017, 28 pages.

Dick's Sporting Goods. YETI 10/20 oz. Rambler Mag Slider Lid. Jun. 2017 [earliest online date], [site visited Oct. 26, 2017]. Available from Internet, < URL: https://www.dickssportinggoods. com/p/yeti-10-20-ozrambler -mag slider -lid-17yeta 1020mgsld rlod r/17yeta1 020mgsldrlodr>. (Year: 2017).

United States District Court Western District of Texas Austin Division, "Complaint," *YETI Coolers, LLC* v. *Wal-Mart Stores, Inc.*, Case: 1:17-cv-01145, Document #1, filed Dec. 8, 2017, 98 pages.

United States District Court Western District of Texas Austin Division, "Complaint," *YETI Coolers, LLC* v. *Ad-N-Art Inc. (CA) d/b/a Asobu, and Ad-N-Art Inc. (US) d/b/a Asobu*, Case: 1:18-cv-00514, Document #1, filed Jun. 20, 2018, 26 pages.

United States District Court Western District of Texas Austin Division, "Complaint," *YETI Coolers, LLC* v. *Hogg Outfitters, LLC*, Case: 1:18-cv-00512, Document #1, filed Jun. 20, 2018, 26 pages.

United States District Court Western District of Texas Austin Division, "Complaint," *YETI Coolers, LLC* v. *Elighters Management, Inc. d/b/a Visol Products d/b/a Visol d/b/a eflasks.com*, Case: 1:18-cv-00513, Document #1, filed Jun. 20, 2018, 25 pages.

Green Steel 20oz Beast Tumbler [online], [retrieved Jul. 26, 2018], Retrieved from the Internet, URL: <https://www.amazon.com/dp/B074L7M8DT/ref=twster_B01DQNHFCS?_encoding=UTF8&th=1>; 9 sheets, published Apr. 2, 2016.

Green Steel 30oz Beast Tumbler [online], [retrieved Jul. 26, 2018], Retrieved from the Internet, URL: https://www.amazon.com/gp/product/b01n2iyxtg <https://www.amazon.com/gp/product/b0ln2iyxtg>; 9 sheets, published date unknown, but for purposes of patent prosecution presumably more than a year prior to the filing date of the present application.

United States District Court Western District of Texas Austin Division, "Complaint," *YETI Coolers, LLC* v. *99 Cents Dnly Stores, LLC and 99 Cents Only Stores Texas, Inc.*, Case: 1:18-cv-00799, Document #1, filed Sep. 18, 2018, 102 pages.

Dec. 10, 2018—(AU) Examination Report—App No. 2016343757—MM.

Jan. 16, 2019—(CA)—Examiner's Report—App 3,003,731.

Jul. 15, 2019—(CN)—First Office Action—App 201680075940.4.

Oct. 7, 2019—(CA) Examiner's Report—App 3,003,731.

Feb. 25, 2020—(CN) Second Office Action—201680075940.4.

May 8, 2020—(BR) Office Action—App. No. BR112018008820-0.

Jul. 13, 2020—(CN) Rejection Decision—App. No. 201680075940.4.

United States District Court Western District of Texas Austin Division, "Complaint," *YETI Coolers, LLC* v. *Ideastage Promotions, LLC, d/b/a Swag Brokers*, Case: 1:15-cv-00774, Document #1, filed Sep. 2, 2015, 22 pages.

United States District Court Western District of Texas Austin Division, "Order," *YETI Coolers, LLC* v. *Ideastage Promotions, LLC, d/b/a Swag Brokers*, Case: 1:15-cv-00774-RP, Document #19, filed Dec. 21, 2015, 1 page.

United States District Court Western District of Texas Austin Division, "Complaint," *YETI Coolers, LLC* v. *Imagen Brands, LLC, d/b/a Crown Products, and Ebsco Industries, Inc.*, Case: 1:16-cv-00578-RP, Document #1, filed May 16, 2016, 20 pages.

United States District Court Western District of Texas Austin Division, "Complaint," *YETI Coolers, LLC* v. *Kaiser Group Inc., d/b/a Thermo Steel, d/b/a Vino2GO, d/b/a Brew2Go*, Case: 1:15-cv-00725, Document #1, filed Aug. 19, 2015, 21 pages.

United States District Court Western District of Texas Austin Division, "Complaint," *YETI Coolers, LLC* v. *Kuer Outdoors, LLC*, Case: 1:16-cv-00631, Document #1, filed May 27, 2016, 89 pages.

United States District Court Western District of Texas Austin Division, "Complaint," *YETI Coolers, LLC* v. *Magnum Solace LLC*, Case: 1:16-cv-00663-RP, Document #1, filed Jun. 7, 2016, 24 pages.

United States District Court Western District of Texas Austin Division, "Defendant's Rule 12(B)(6) Motion to Dismiss For Failure to State a Claim," *YETI Coolers, LLC* v. *Magnum Solace LLC*, Case: 1:16-cv-00663-RP, Document #10, filed Aug. 5, 2016, 30 pages.

United States District Court Western District of Texas Austin Division, "Defendant's Answer," *YETI Coolers, LLC* v. *Magnum Solace LLC*, Case: 1:16-cv-00663-RP, Document #34, filed Apr. 13, 2017, 7 pages.

United States District Court Western District of Texas Austin Division, "Defendant's Answer to Plaintiffs Complaint and Affirmative Defenses," *YETI Coolers, LLC* v. *MyCrew, LLC, MyCrew Drinkware, LLC and NNRiverLife, LLC*, Case: 1:16-cv-01008-RP, Document #14, filed Nov. 29, 2016, 12 pages.

United States District Court Western District of Texas Austin Division, "Complaint," *YETI Coolers, LLC* v. *MyCrew, LLC, MyCrew Drinkware, LLC and NNRiverLife, LLC*, Case: 1:16-cv-01008, Document #1, filed Aug. 26, 2016, 29 pages.

United States District Court Western District of Texas Austin Division, "Plaintiff YETI Coolers, LLC's Original complaint," *YETI Coolers, LLC* v. *Ontel Products Corporation and World Pack USA, LLC*, Case: 1:17-cv-00091-RP, Document #1, filed Feb. 8, 2017, 65 pages.

(56) References Cited

OTHER PUBLICATIONS

United States District Court Western District of Texas Austin Division, "RTIC Drinkware's First Amended Complaint for Declaratory Judgment," *RTIC Drinkware, LLC v. YETI Coolers, LLC*, Case: 1:16-cv-00907-RP, Document #52, filed Nov. 14, 2016, 124 pages.
United States District Court Western District of Texas Austin Division, "YETI Coolers, LLC's Answer to RTIC Drinkware's First Amended Complaint," *RTIC Drinkware, LLC v. YETI Coolers, LLC*, Case: 1:16-cv-00907-RP, Document #58, filed Dec. 1, 2016, 15 pages.
United States District Court Western District of Texas Austin Division, "YETI Coolers, LLC's Answer to RTIC Drinkware LLC's Complaint," *RTIC Drinkware, LLC v. YETI Coolers, LLC*, Case: 1:16-cv-00907-RP, Document #35, filed Aug. 9, 2016, 27 pages.
United States District Court for the Southern District of Texas Huston Division, "RTIC Drinkware's Original Complaint for Declaratory Judgment, Damages, and Injunctive Relief," *RTIC Drinkware, LLC v. YETI Coolers, LLC*, Case: 4:16-cv-01201, Document #1, filed May 2, 2016, 58 pages.
United States District Court Western District of Texas Austin Division, "Order," *RTIC Drinkware, LLC v. YETI Coolers, LLC*, Case: 1:16-cv-00907-RP, Document #47, filed Oct. 13, 2016, 3 pages.
United States District Court Western District of Texas Austin Division, "YETI Coolers, LLC's First Amended Complaint," *YETI Coolers, LLC v. RTIC Coolers, LLC, RTIC Drinkware, LLC, RTIC Web Services, LLC, Corporate Support& Fulfillment, LLC, John Jacobsen, and James Jacobsen*, Case: 1:16-cv-00264-RP, Document #15, filed May 16, 2016, 110 pages.
United States District Court Western District of Texas Austin Division, "Defendant RTIC Drinkware, LLC, RTIC Web Services, LLC, Corporate Support & Fulfillment, LLC, John Jacobsen, and James Jacobsen's Answer and Counterclaims to YETI's First Amended Complaint for Damages and Injunctive Relief," *YETI Coolers, LLC v. RTIC coolers, LLC, RTIC Drinkware, LLC, RTIC Web Services, LLC, Corporate Support& Fulfillment, LLC*; John Jacobsen; and James Jacobsen; Case: 1:16-cv-00264-RP, Document #25, filed Jun. 13, 2016, 42 pages.
United States District Court Western District of Texas Austin Division, "Complaint," *YETI Coolers, LLC v. RTIC Coolers, LLC*, Case: 1:16-cv-00264, Document #1, filed Mar. 2, 2016, 34 pages.
United States District Court Western District of Texas Austin Division, "YETI Coolers, LLC's Answer to RTIC Drinkware, LLC's, RTIC Web Services, LLC's, Corporate Support & Fulfillment, LLC's, John Jacobsen's, and James Jacobsen's Counterclaims," *YETI Coolers, LLC v. RTIC Coolers, LLC, RTIC Drinkware, LLC, RTIC Web Services, LLC, Corporate Support& Fulfillment, LLC, John Jacobsen, and James Jacobsen*, Case: 1:16-cv-00264-RP, Document #31, filed Jul. 7, 2016, 7 pages.
United States District Court Western District of Texas Austin Division, "First Amended Complaint," *Yeti Coolers, LLC v. Sam's West, Inc., and Sam's East, Inc*., Case: 1:16-cv-00829-RP, Document #32, filed Jan. 9, 2017, 24 pages.
United States District Court Western District of Texas Austin Division, "Defendants Sam's West, Inc. and Sam's East, Inc.'s Answer to Complaint," *YETI Coolers, LLC v. Sam's West, Inc., and Sam's East, Inc*., Case: 1:16-cv-00829-RP, Document #16, filed Aug. 26, 2016, 11 pages.
United States District Court Western District of Texas Austin Division, "Complaint," *YETI Coolers, LLC v. Sam's West, Inc., and Sam's East, Inc*., Case: 1:16-cv-00829, Document #1, Jun. 30, 2016, 21 pages.
United States District Court Western District of Texas Austin Division, "First Amended Complaint," *YETI Coolers, LLC v. Sic Products LLC, d/b/a Sic Cups, d/b/a Sic*, Case: 1:16-cv-00117-RP, Document #34, Nov. 21, 2016, 25 pages.
United States District Court Western District of Texas Austin Division, "Sic Products, LLC's Answer, Affirmative Defenses, and Counterclaims to Plaintiff's Amended Complaint," *YETI Coolers,* *LLC v. Sic Products LLC, d/b/a Sic Cups, d/b/a Sic*, Case: 1:16-cv-00117-RP, Document #35, Dec. 5, 2016, 81 pages.
United States District Court Western District of Texas Austin Division, "Sic Products, LLC's Answer, Affirmative Defenses, and Counterclaims to Plaintiff's Complaint," *YETI Coolers, LLC v. Sic Products LLC, d/b/a Sic Cups, d/b/a Sic*, Case: 1:16-cv-00117-RP, Document #14, Jun. 3, 2016, 38 pages.
United States District Court Western District of Texas Austin Division, "Complaint," *YETI Coolers, LLC v. Sic Products LLC, d/b/a Sic Cups, d/b/a Sic*, Case: 1:16-cv-00117-RP, Document #1, Feb. 4, 2016, 23 pages.
United States District Court Western District of Texas Austin Division, "YETI Coolers, LLC's Answer to Sic Products, LLC Counterclaims," *YETI Coolers, LLC v. Sic Products LLC, d/b/a Sic Cups, d/b/a Sic*, Case: 1:16-cv-00117-RP, Document #21, Sep. 29, 2016, 15 pages.
United States District Court Western District of Texas Austin Division, "YETI Coolers, LLC's Answer to Sic Products, LLC Counterclaims to YETI Coolers, LLC's Amended Complaint," *YETI Coolers, LLC v. Sic Products LLC, d/b/a Sic Cups, d/b/a Sic*, Case: 1:16-cv-00117-RP, Document #38, Dec. 19, 2016, 20 pages.
United States District Court Western District of Texas Austin Division, "Complaint," *YETI Coolers, LLC v. The Allen Company, d/b/a Allen Color Craft*, Case: 1:15-cv-00888-RP, Document #1, Oct. 6, 2015, 24 pages.
United States District Court Western District of Texas Austin Division, "Complaint," *YETI Coolers, LLC v. Titan Custom Products, Inc*., Case: 1:15-cv-00775, Document #1, Sep. 2, 2015, 22 pages.
United States District Court Western District of Texas Austin Division, "Answer," *YETI Coolers, LLC v. Tree Leaf Marketing, LLC d/b/a Big Frig*, Case: 1:16-cv-00699-RP, Document #11, Oct. 21, 2016, 8 pages.
United States District Court Western District of Texas Austin Division, "Complaint," *YETI Coolers, LLC v. Tree Leaf Marketing, LLC d/b/a Big Frig*, Case: 1:16-cv-00699, Document #1, Jun. 17, 2016, 33 pages.
United States District Court Western District of Texas Austin Division, "Complaint," *YETI Coolers, LLC v. US Imprints, LLC, d/b/a GOimprints*, Case: 1:15-cv-00773, Document #1, Sep. 2, 2015, 22 pages.
United States District Court Western District of Texas Austin Division, "Order," *YETI Coolers, LLC v. US Imprints, LLC, d/b/a GOimprints*, Case: 1:15-cv-00773-RP, Document #23, Apr. 25, 2016, 1 page.
United States District Court Western District of Texas Austin Division, "Veterinary Internet Company, LLC d/b/a VetInternetCo's Answer to Plaintiff's Complaint," *YETI Coolers, LLC v. Polar Pad LLC, d/b/a Polar Drifter, d/b/a Polar Pad, and Veterinary Internet Company, LLC, d/b/a VetInternetCo*, Case: 1:16-cv-00677-RP, Document #11, Aug. 19, 2016, 12 pages.
United States District Court Western District of Texas Austin Division, "Complaint," *YETI Coolers, LLC v. Polar Pad LLC, d/b/a Polar Pad Drifter, d/b/a Polar Pad, and Veterinary Internet Company, LLC, d/b/a VetInternetCo*, Case: 1:16-cv-00128, Document #1, Feb. 12, 2016, 24 pages.
United States District Court Western District of Texas Austin Division, "Complaint," *YETI Coolers, LLC v. Polar Pad LLC, d/b/a Polar Pad Drifter, d/b/a Polar Pad, and Veterinary Internet Company, LLC, d/b/a VetInternetCo*, Case: 1:16-cv-00677, Document #1, Jun. 10, 2016, 25 pages.
United States District Court Western District of Texas Austin Division, "Order," *YETI Coolers, LLC v. Polar Pad LLC, d/b/a Polar Pad Drifter, d/b/a Polar Pad, and Veterinary Internet Company, LLC, d/b/a VetInternetCo*, Case: 1:16-cv-00128-RP, Document #17, Jun. 17, 2016, 1 page.
United States District Court Western District of Texas Austin Division, "[Proposed] Order Granting Stipulated Motion to Dismiss Defendant Polar Pad, LLC, Without Prejudice, Pursuant to Fed. R. Civ. P. 21," *YETI Coolers, LLC v. Polar Pad LLC, d/b/a Polar Pad Drifter, d/b/a Polar Pad, and Veterinary Internet Company, LLC, d/b/a VetInternetCo*, Case: 1:16-cv-00677-RP, Document #14, Sep. 15, 2016, 1 page.

(56) References Cited

OTHER PUBLICATIONS

United States District Court Western District of Texas Austin Division, "Complaint," *YETI Coolers, LLC* v. *Vickery Products, LLC d/b/a Axis Cups, f/d/b/a Frio Cups*, Case: 1:17-cv-00260, Document #1, Mar. 24, 2017, 52 pages.
United States District Court Western District of Texas Austin Division, "First Amended Complaint," *YETI Coolers, LLC* v. *Wal-Mart Stores, Inc. and Olympia Tools International, Inc.*, Case: 1:16-cv-00454-RP, Document #17, May 24, 2016, 26 pages.
United States District Court Western District of Texas Austin Division, "Complaint," *YETI Coolers, LLC* v. *Wal-Mart Stores, Inc.*, Case: 1:16-cv-00454, Document #1, Apr. 8, 2016, 29 pages.
United States District Court Western District of Texas Austin Division, "Olympia Tools International, Inc.'s Answer to YETI Coolers, LLC's First Amended Complaint," *YETI Coolers, LLC* v. *Wal-Mart Stores, Inc. and Olympia Tools International, Inc.*, Case: 1:16-cv-00454-RP, Document #28, Jul. 14, 2016, 12 pages.
United States District Court Western District of Texas Austin Division, "Wal-Mart Stores, Inc.'s Answer to First Amended Complaint," *YETI Coolers, LLC* v. *Wal-Mart Stores, Inc. and Olympia Tools International, Inc.*, Case: 1:16;v-00454-RP, Document #22, Jun. 7, 2016, 13 pages.
United States District Court Western District of Texas Austin Division, "Complaint" *YETI Coolers, LLC* v. *Zhejiang Zhuosheng Industry& Trade Co, Ltd., d/b/a Wuyi Zhuosheng Household Metal Products Co., Ltd., d/b/a Yongkang Zhuosheng Metal Products Products Co., Ltd., d/b/a Zhejiang Zhuosheng Industry& Trade Co, Ltd.*, Case 1:17-cv-00821, Document 1, filed Aug. 23, 2017, 27 pages.
Apr. 4, 2017—(PCT) Written Opinion and International Search Report App PCT/US2016/059514.
United States District Court Western District of Texas Austin Division, "Complaint," *YETI Coolers, LLC* v. *Bonanza.com, Inc.*, Case: 1:17-cv-00935, Document #1, filed Sep. 28, 2017, 142 pages.
United States District Court Western District of Texas Austin Division, "Complaint," *YETI Coolers, LLC* v. *Alibaba Group Holding Limited, Alibaba(China) Technology Co., Ltd., Alibaba.com Hong Kong Limited, Alibaba.com Singapore E-Commerce Private Limited, Hangzhou Alibaba Advertising Co. Ltd., and Huizhou Dashu Trading Co., Ltd*, Case: 1:17-cv-00936, Document #1, filed Sep. 28, 2017, 272 pages.
United States District Court Western District of Texas Austin Division, "Complaint," *YETI Coolers, LLC* v. *ContextLogic, Inc. d/b/a Wish.com*, Case: 1:17-cv-00937, Document #1, filed Sep. 28, 2017, 238 pages.
Nov. 13, 2020—(AU) Examination Report No. 1—App. No. 2019257415.
Nov. 13, 2020—(AU) Examination Report No. 1—App. No. 2019257416.
"Tervis Travel Lids", Tervis.com, captured Nov. 20, 2015, pp. 1.
"Stainless Steel Tumbler", Starbucks.com, captured Nov. 20, 2015, pp. 1.
"Tumbler", Corkcicle.com, captured Nov. 20, 2015, pp. 1-2.
Photographic image of YETI 30oz Rambler Tumbler, published date unknown, but prior to the filing date of the present application.
Second photographic image of YETI 30oz Rambler Tumbler, published date unknown, but prior to the filing of the present application.
Promotional Items, Inc., "Stainless Steel 14oz. Deluxe Coffee Insulated Tumbler Lid", retrieved from <http://www.promotional-items-inc.com/catalog/stainless_steel_18oz_commuter_coffee_mug_lid.html> on Aug. 27, 2015.
The Product Farm, "BeerNStein Rocks Tumbler Lid—Blue", retrieved from<http://store.theproductfarm.com/beernstein-rocks-tumbler-lid-blue/> on Aug. 27, 2015.
Hit Promotional Products, "24 Oz. Biggie Tumbler with Lid", retrieved from <http://www.hitpromo.net/product/show/5853/24-oz-biggie-tumbler-with-lid> on Aug. 27, 2015.
The Alexon Group, "16 Oz. Stainless Steel Travel Mug with Slide Action Lid and Plastic Inner Liner", retrieved from <https://alexongroup.com/16-oz-stainless-steel-travel-mug-with-slide-action-lid-and-plastic-inner-liner> on Aug. 27, 2015.
"New 16oz Insulated Coffee Travel Mug Stainless Steel Double Wall Thermos Tumbler", retrieved from <http://www.ebay.com/itm/New-16oz-Insulated-COFFEE-TRAVEL-MUG-Stainless-Steel-Double-Wall-Thermos-Tumbler-/171416296921> on Aug. 27, 2015.
"Stainless Steel Travel Mug with Slide Action Lid and Plastic Inner Liner—16oz.", retrieved from <http://waterbottles.com/stainless-steel-travel-mug-with-slide-action-lid-and-plastic-inner-liner-16-oz> on Aug. 27, 2015.
Vat19, "16 oz. Dual Auto/USB Heated Mug", retrieved from <https://www.vat19.com/item/16-oz-dual-auto-usb-heater-coffee-mug> on Aug. 27, 2015.
Timolino, "Signature Thermal Travel Mug Slide-Tab Lid", retrieved from <http://timolino.com/products/signature-thermal-travel-mug-slide-tab-lid> on Aug. 27, 2015.
Eshine Industrial & Maoyuan International, "400ml Double Wall Stainless Steel Travel Mug with Sliding Drink Lid", retrieved from <http://www.chinawaterbottle.com/product/400ml-double-wall-stainless-steel-travel-mug-with-sliding-drink-lid-77-520.html> on Aug. 27, 2015.
Photo USA Electronic Graphic Inc., "17fl oz Personalised Travel Mug (Plastic Insert and Metal Shell, Reverse Screw)", retrieved from <http://www.meikeda.com/stainless-steel-mug/item/15-oz-personalised-travel-mug.html> on Aug. 27, 2015.
Promo Industrial Co., Limited, "16 Oz. Blue Bullet Travel Mug W/ Handle", retrieved from <http://www.oempromo.com/Bottle-cup-and-mug/Mugs/index_73.htm> on Aug. 27, 2015.
Gold Bond Inc., "16CT—16 oz Cafe Tumbler", retrieved from <http://www.goldbondinc.com/16ct> on Aug. 27, 2015.
"YETI Rambler 20 and 30 oz", published on Apr. 19, 2014, retrieved from https://web.archive.org/web/20140419041951/http://yeticoolers.com/rambler-tumblers/ on Sep. 2, 2015.
Photographic image of YETI 20oz Rambler Tumbler, published date unknown, but prior to the filing date of the present application.
"Tervis Lids", retrieved from http://www.tervis.com/designs/Accessories/Travel-lids/dc0fe00377e0ec722da5bd146541427c#!upc=093597437694&upc=093597240386 on Sep. 10, 2015.
Aladdin, "Recycled & Recyclable Travel Mug—Grey Replacement Lid", retrieved from http://www.shopaladdin-pmi.com/product/recycled-recyclable-travel-mug-grey-replacement-lid on Sep. 10, 2015.
Zak! Designs, "Grip 16 oz Travel Coffee Mug—Sapphire", retrieved from http://www.zak.com/planet_zak_blue_stainless_steel_water_bottle_0187-5720 on Sep. 10, 2015.
Promotional Items, Inc., "Stainless Steel 14 oz. Tool Box Travel Mug Lid", retrieved from http://www.promotional-items-inc.com/catalog/stainless_steel_14oz_tool_box_travel_mug_lid.html on Sep. 10, 2015.
"Starbucks® Stainless Steel Logo Tumbler, 16 fl oz", retrieved from <http://store.starbucks.com/starbucks-stainless-steel-logo-tumbler-16-fl-oz-011023529.html> on Nov. 3, 2015.
"Corkcicle Tumbler", retrieved from <http://corkcicle.com/pages/tumbler> on Nov. 3, 2015.
Apr. 4, 2017—(PCT) International Search Report and Written Opinion—App PCT/US2016/059514.
United States District Court Western District of Texas Austin Division, "Complaint," *YETI Coolers, LLC* v. *Godinger Silver Art, Ltd., Cathy's Concepts, Inc., Viatek Consumer Products Group, Inc.*, Case: 1:17-cv-00467, Document #1, filed May 16, 2017, 22 pages.
United States District Court Western District of Texas Austin Division, "Complaint," *YETI Coolers, LLC* v. *Bayou Ice Boxes, Inc.*, Case: 1:17-cv-00261, Document #1, filed Mar. 24, 2017, 41 pages.
United States District Court Western District of Texas Austin Division, "Complaint," *YETI Coolers, LLC* v. *Vickery Products, LLC d/b/a Axis Cups, f/d/b/a Frio Cups*, Case: 1:17-cv-00260, Document #1, filed Mar. 24, 2017, 52 pages.
United States District Court Western District of Texas Austin Division, "Complaint," *YETI Coolers, LLC* v. *Gourmet Home Products, LLC*, Case: 1:17-cv-00533, Document #1, filed Jun. 2, 2017, 25 pages.

(56) References Cited

OTHER PUBLICATIONS

United States District Court Western District of Texas Austin Division, "Complaint," *YETI Coolers, LLC v. Wadley Holdings, LLC d/b/a Meadowcraft, and Southern Sales& Marketing Group, Inc. d/b/a/ nICE*, Case 1:17-cv-00421, Document 1, filed May 5, 2017, 121 pages.
United States District Court Western District of Texas Austin Division, "Complaint," *YETI Coolers, LLC v. JDS Industries, Inc., Lionel Laundry Jr., d/b/a Accolades Awards& Engraving, Creating and Fast LLC d/b/a Promotional Products San Antonio, Kelly Scoggins d/b/a King Engraving, Jamey Z. Apps d/b/a Roberts Trophies, and Eagle Media, Inc.*, Case 1:17-cv-00424, Document 1, filed May 5, 2017, 62 pages.
United States District Court Western District of Texas Austin Division, "Complaint," *YETI Coolers, LLC v. Glacier Coolers, LLC, and Tecomate Holdings, LLC*, Case 1:17-cv-00586, Document 1, filed Jun. 15, 2017, 161 pages.
United States District Court Western District of Texas Austin Division, "Complaint," *YETI Coolers, LLC v. Gametime Sidekicks, LLC*, Case 1:17-cv-00413, Document 1, filed May 5, 2017, 107 pages.
United States District Court Western District of Texas Austin Division, "Complaint," *YETI Coolers, LLC v. Kodiak Coolers, LLC and Flexible Automation LLC*, Case 1:17-cv-00422, Document 1, filed May 5, 2017, 51 pages.
English translation of Office Action dated Oct. 18, 2016 for JP Application No. 2016-004374, 4 pages.
"Osulloc Green Cup," retrieved from http://www.edaymall.com/display/goods.do?media_code=E06&goods_code=10183708 on Sep. 6, 2016.
United States District Court Western District of Texas Austin Division, "Complaint," *YETI Coolers, LLC v. Benner China and Glassware Florida, Inc.*, Case: 1:16-cv-00142-RP, Document #1, filed Feb. 16, 2016, 21 pages.
United States District Court Western District of Texas Austin Division, "Complaint," *YETI Coolers, LLC v. Blackbird Products Group, LLC, d/b/a Mammoth Coolers*, Case: 1:15-cv-01105, Document #1, filed Dec. 7, 2015, 266 pages.
United States District Court Western District of Texas Austin Division, "Defendant Blackbird Products Group, LLC's Answer and Affirmative Defenses to Plaintiff YETI Coolers, LLC's Complaint," *YETI Coolers, LLC v. Blackbird Products Group, LLC, d/b/a Mammoth Coolers*, Case: 1:15-cv-01105-SS, Document #13, filed Dec. 28, 2015, 11 pages.

United States District Court Western District of Texas Austin Division, "Order," *YETI Coolers, LLC v. Blackbird Products Group, LLC, d/b/a Mammoth Coolers*, Case: 1:15-cv-01105-RP, Document #26, filed Apr. 20, 2016, 1 page.
United States District Court Western District of Texas Austin Division, "Complaint," *YETI Coolers, LLC v. The Boelter Companies, Inc., Boelter Brands, LLC and Boelter Beverage, LLC*, Case: 1:16-cv-00456, Document #1, filed Apr. 8, 2016, 20 pages.
United States District Court Western District of Texas Austin Division, "Defendants' Answer to Complaint," *YETI Coolers, LLC v. The Boelter Companies, Inc., Boelter Brands, LLC and Boelter Beverage, LLC*, Case: 1:16-cv-00456-RP, Document #21, filed Jun. 7, 2016, 9 pages.
United States District Court Western District of Texas Austin Division, "Consent Judgment," *YETI Coolers, LLC v. The Boelter Companies, Inc., Boelter Brands, LLC and Boelter Beverage, LLC*, Case: 1:16-cv-00456-RP, Document #25, filed Sep. 13, 2016, 3 pages.
United States District Court Western District of Texas Austin Division, "Complaint," *YETI Coolers, LLC v. Jennifer Leverne Bootz Evans d/b/a Bling and Burlap Buy In's and Blanks*, Case: 1:15-cv-00995, Document #1, filed Nov. 2, 2015, 128 pages.
United States District Court Western District of Texas Austin Division, "Order," *YETI Coolers, LLC v. Jennifer Leveme Bootz Evans d/b/a Bling and Burlap Buy In's and Blanks*, Case: 1:15-cv-00995-RP, Document #18, filed Apr. 18, 2016, 1 page.
United States District Court Western District of Texas Austin Division, "Defendant Kaiser Group Inc.'s Answer, Affirmative Defenses, and Counterclaims to Plaintiff YETI Coolers, LLC's Complaint," *YETI Coolers, LLC v. Kaiser Group Inc., d/b/a Thermo Steel, d/b/a Vino2Go, d/b/a Brew2GO*, Case: 1:15-cv-00725-RP, Document #14, filed Oct. 13, 2015, 65 pages.
United States District Court Western District of Texas Austin Division, "Complaint," *YETI Coolers, LLC v. Great American Products, Ltd.*, Case: 1:15-cv-00686, Document #1, filed Aug. 6, 2015, 20 pages.
United States District Court Western District of Texas Austin Division, "Order," *YETI Coolers, LLC v. Great American Products, Ltd.*, Case: 1:15-cv-00686-RP, Document #25, filed Mar. 14, 2016, 1 page.
United States District Court Western District of Texas Austin Division, "Complaint," *YETI Coolers, LLC v. Home Depot U.S.A., Inc., Takeya USA Corporation*, Case: 1:17-cv-00342, Document #1, filed Apr. 12, 2017, 24 pages.

\* cited by examiner

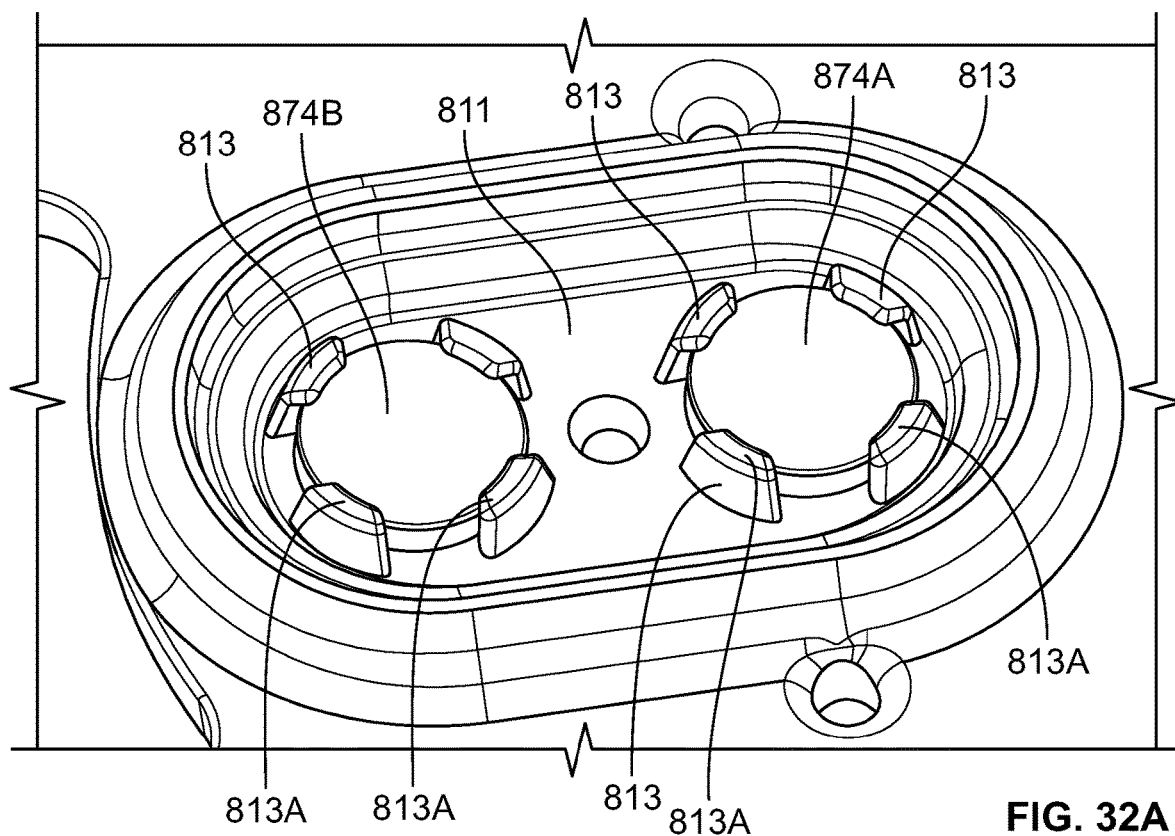
FIG. 32A
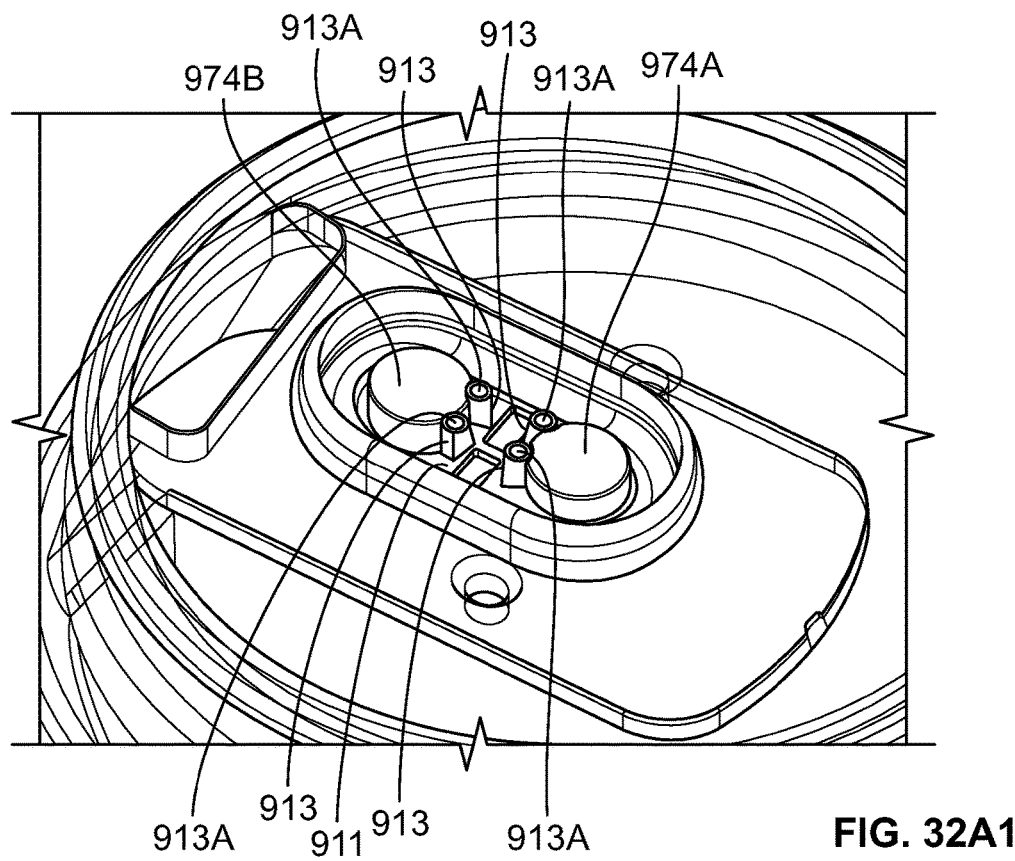
FIG. 32A1

CLOSURE AND LID AND METHOD OF FORMING CLOSURE AND LID

This application is a continuation of U.S. application Ser. No. 16/261,661 filed Jan. 30, 2019, which is a divisional of U.S. application Ser. No. 15/288,175 filed Oct. 7, 2016, now U.S. Pat. No. 10,232,993, which is a continuation-in-part of U.S. application Ser. No. 14/971,779 filed on Dec. 16, 2015, now U.S. Pat. No. 10,232,992, and is a continuation-in-part of U.S. application Ser. No. 14/971,788 filed on Dec. 16, 2015, now U.S. Pat. No. 10,124,942, and both U.S. application Ser. No. 14/971,779 and U.S. application Ser. No. 14/971,788 claim priority to U.S. Application No. 62/248,996 filed on Oct. 30, 2015. The above applications are fully incorporated by reference herein.

FIELD

The present disclosure herein relates broadly to lids for drinkware, and more specifically to closeable lids for drinkware containers used for drinkable beverages or foods.

BACKGROUND

Beverage containers can be filled with hot or cold drinkable liquids, such as water, coffee, tea, soft drink, or alcoholic beverage, such as beer. These beverage containers can be made of a variety of materials such as stainless steel, glass, plastic, cardboard, or paper material. Lids may be provided on beverage containers to provide an opening for pouring out the contents of the beverage container. In certain instances, it can be desired to selectively close and store the container such that the contents of the container do not spill.

SUMMARY

This Summary provides an introduction to some general concepts relating to this invention in a simplified form that are further described below in the Detailed Description. This Summary is not intended to identify key features or essential features of the invention.

Aspects of the disclosure herein may relate to a closable lid assembly for drinkware. In one example, the lid assembly can include a movable slider, which may include a tab or handle. In certain examples, the slider can be configured to perform one or more of the following: (1) slide between a closed position and an opened position where the slider covers an opening to aid in preventing spilling of contents of the container and an opened position where the slider uncovers the opening such that the contents of the container can be consumed, (2) lock in place in both the closed position and the opened position, (3) remain secured to the lid during movement between the closed position and the opened position, or (4) to be removable from the lid so that the lid and slider can be cleaned.

BRIEF DESCRIPTION OF THE DRAWINGS

The foregoing Summary, as well as the following Detailed Description, will be better understood when considered in conjunction with the accompanying drawings in which like reference numerals refer to the same or similar elements in all of the various views in which that reference number appears.

FIG. 32A shows an enlarged portion of a bottom view of a partially formed example lid.

FIG. 32A1 shows an enlarged portion of a bottom view of another partially formed example lid.

DETAILED DESCRIPTION

In the following description of the various examples and components of this disclosure, reference is made to the accompanying drawings, which form a part hereof, and in which are shown by way of illustration various example structures and environments in which aspects of the disclosure may be practiced. It is to be understood that other structures and environments may be utilized and that structural and functional modifications may be made from the specifically described structures and methods without departing from the scope of the present disclosure.

Also, while the terms "frontside," "backside," "top," "base," "bottom," "side," "forward," and "rearward" and the like may be used in this specification to describe various example features and elements, these terms are used herein as a matter of convenience, e.g., based on the example orientations shown in the figures and/or the orientations in typical use. Nothing in this specification should be construed as requiring a specific three dimensional or spatial orientation of structures in order to fall within the scope of the claims.

Figure 1A:
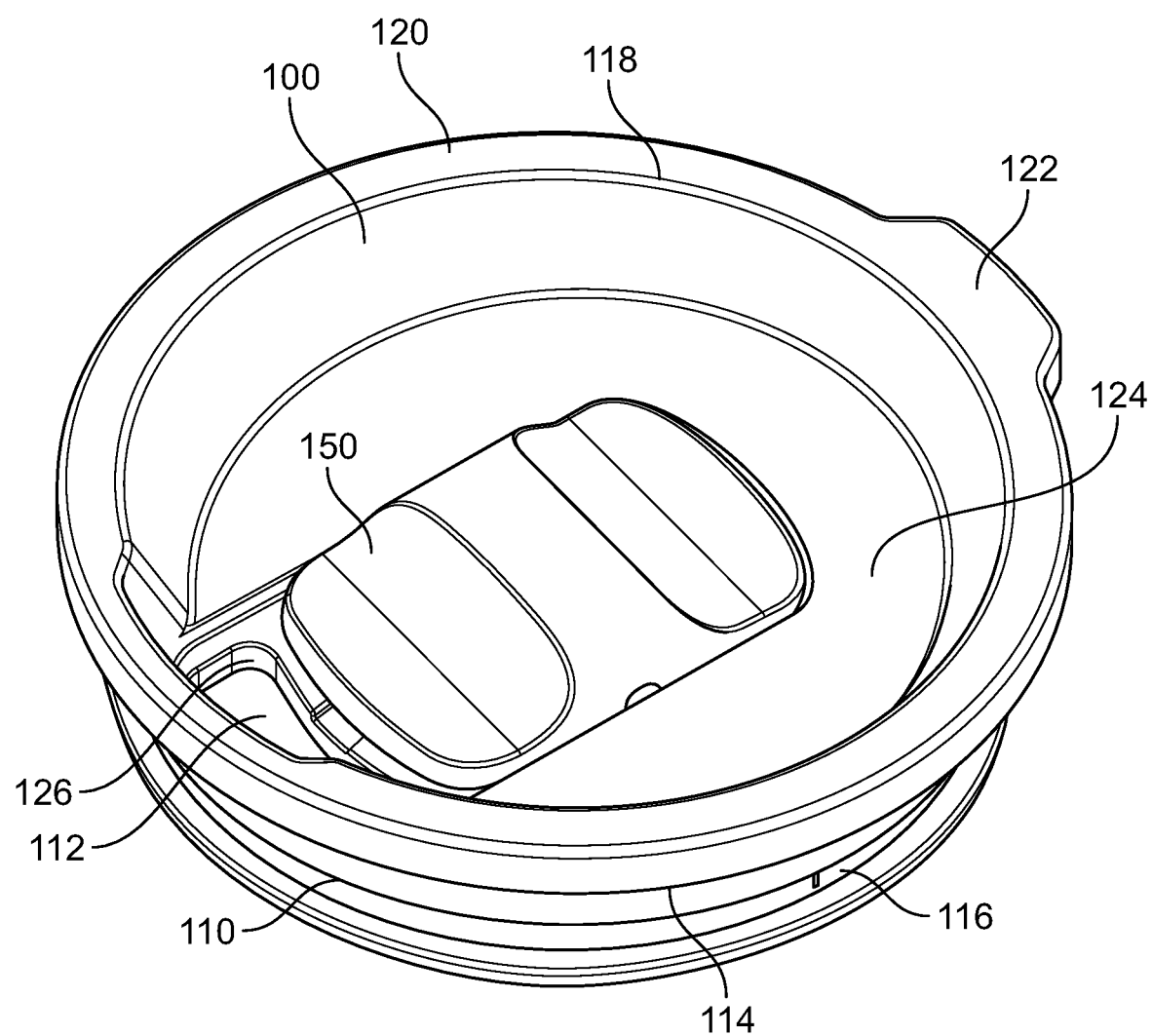
FIG. 1A shows an isometric top view of an example lid assembly in the opened position.
Figure 1B:
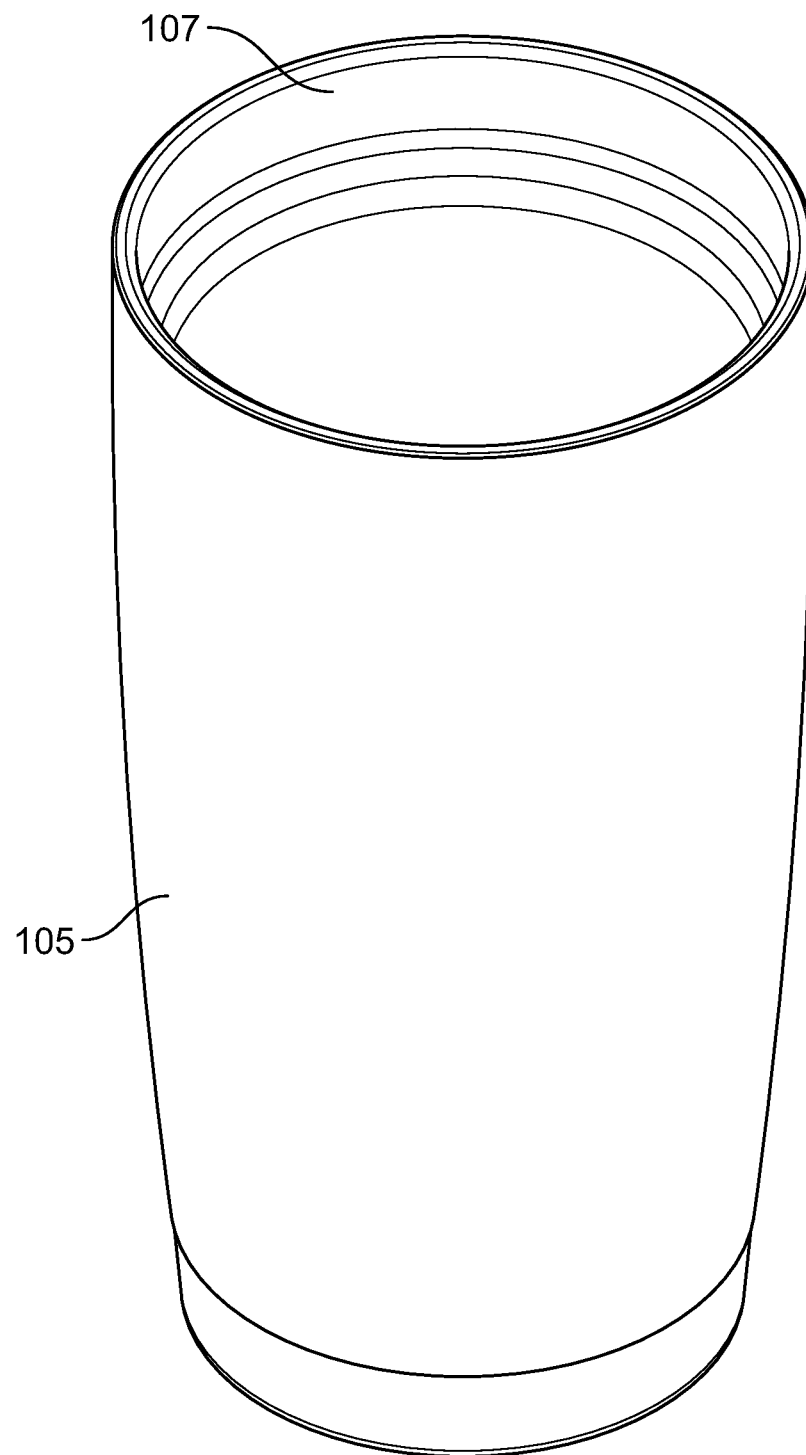
FIG. 1B shows an isometric view of an example container for receiving an example lid.

FIG. 1A depicts an example lid assembly 100. The lid assembly 100 generally includes a lid 110 and a slider 150 that is configured to move between an opened position and a closed position to selectively open or close an opening 112 for liquid. FIG. 1A depicts an isometric view of the example lid assembly 100 with the slider 150 in the opened position on a container 105, and FIG. 1B depicts an isometric view of an example container 105 for receiving the lid 110. The lid 110 may also include a side wall 114, which can define a groove 116 for placement of a gasket (not shown), which provides a seal between the lid assembly 100 and the container 105. However, as will be discussed below, other sealing methods for sealing the lid 110 to the container 105 are also contemplated. The lid 110 may also include a rim 118 for engaging an opening 107 of the container 105. The rim 118 may also include a top wall 120 and an optional lid tab 122 extending from the top wall 120 to assist the user in removing the lid assembly 100 from the container 105.

Figure 2:
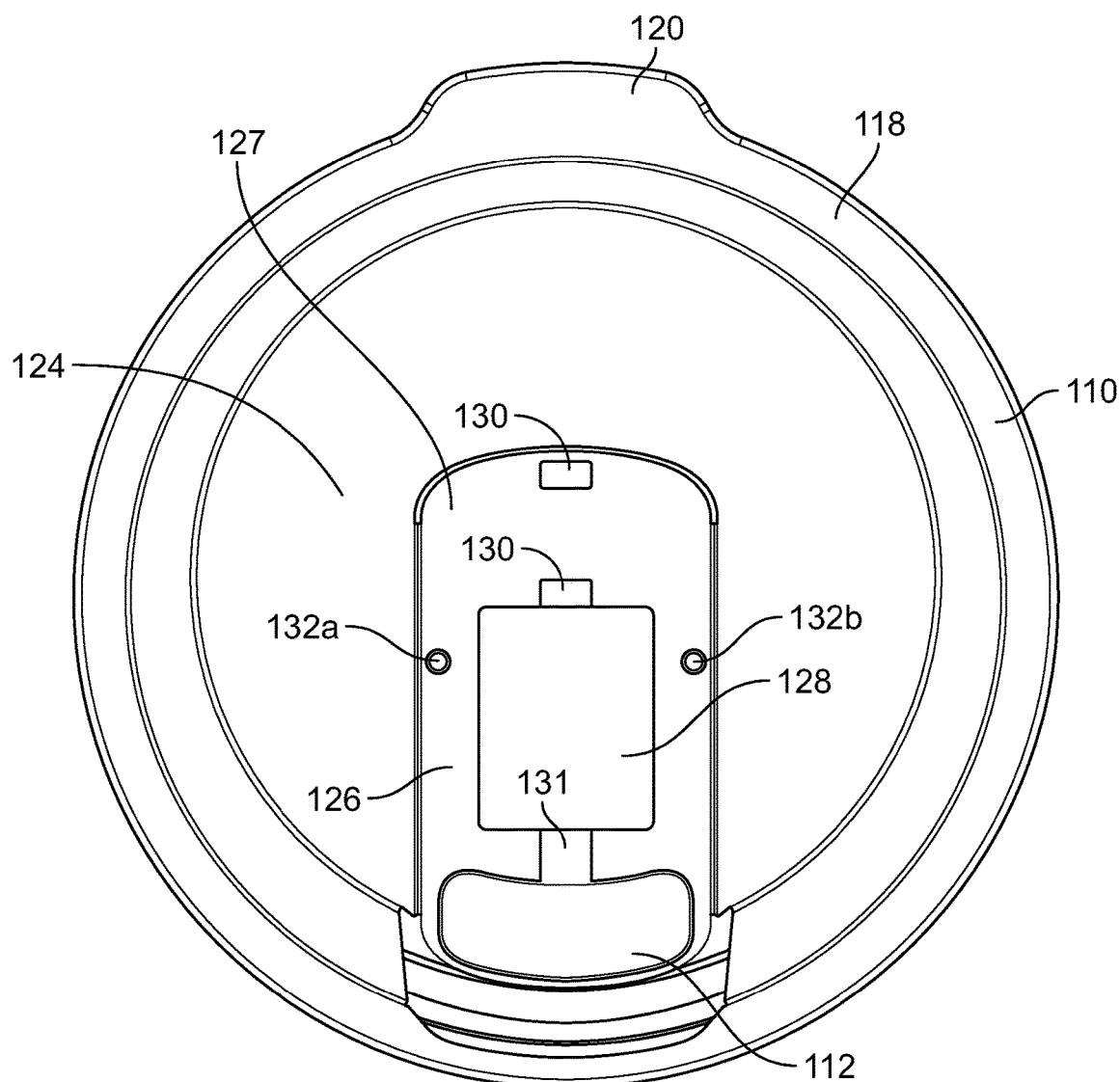
FIG. 2 shows a top view of the example lid of FIG. 1A.

FIG. 2 shows a top perspective view of the lid 110 with the slider 150 removed. As shown in FIG. 2, the lid 110 may also include a middle wall 124 extending below the rim 118. The middle wall 124 can define a recess 126 for receiving the slider 150, and, in particular, the recess 126 can define a guide channel 127 for the slider 150 to move between the open position and the closed position. As shown in FIG. 2, the opening 112 for drinking or pouring liquid out of the container can also be formed in the recess 126. The recess 126 can also include a central opening 128 for placement of the slider 150.

In addition, the recess 126 can include one or more openings 130 for receiving corresponding detents on the slider 150. This allows the slider 150 to be selectively locked in either the opened position or the closed position during use such that the slider 150 does not inadvertently move in the guide channel 127. The recess 126 of the lid 110 can also be provided with a narrow channel 131 that is configured to allow the detents in the slider to travel along the guide channel 127 from the closed to the open position of the slider. However, it is also contemplated that the slider 150 can be provided with openings, and the lid 110 can be provided with detents for placement into the openings of the slider 150. Additionally, the recess 126 of the lid 110 can include one or more air vents 132a, 132b that provide for the escape of air during pouring of the liquid from the container. As will be discussed in further detail below, a first air vent 132a and a second air vent 132b can be selectively opened by the slider 150 depending on the slider position with respect to the lid 110.

Figure 3:
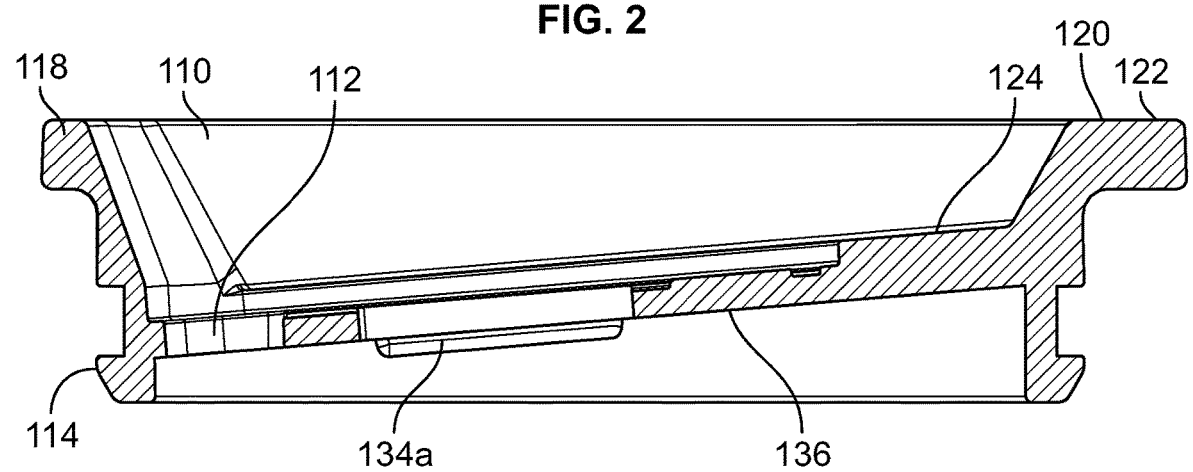
FIG. 3 shows a cross-sectional view of the example lid of FIG. 1A.

As can be seen in FIG. 3, which is a cross-sectional view of the lid 110, the middle wall 124 can extend at an angle with respect to the top wall 120 and the side wall 114. This allows for the opening 112 for pouring liquid out of the container to be located below a certain height of the rim 118.

Figure 4:
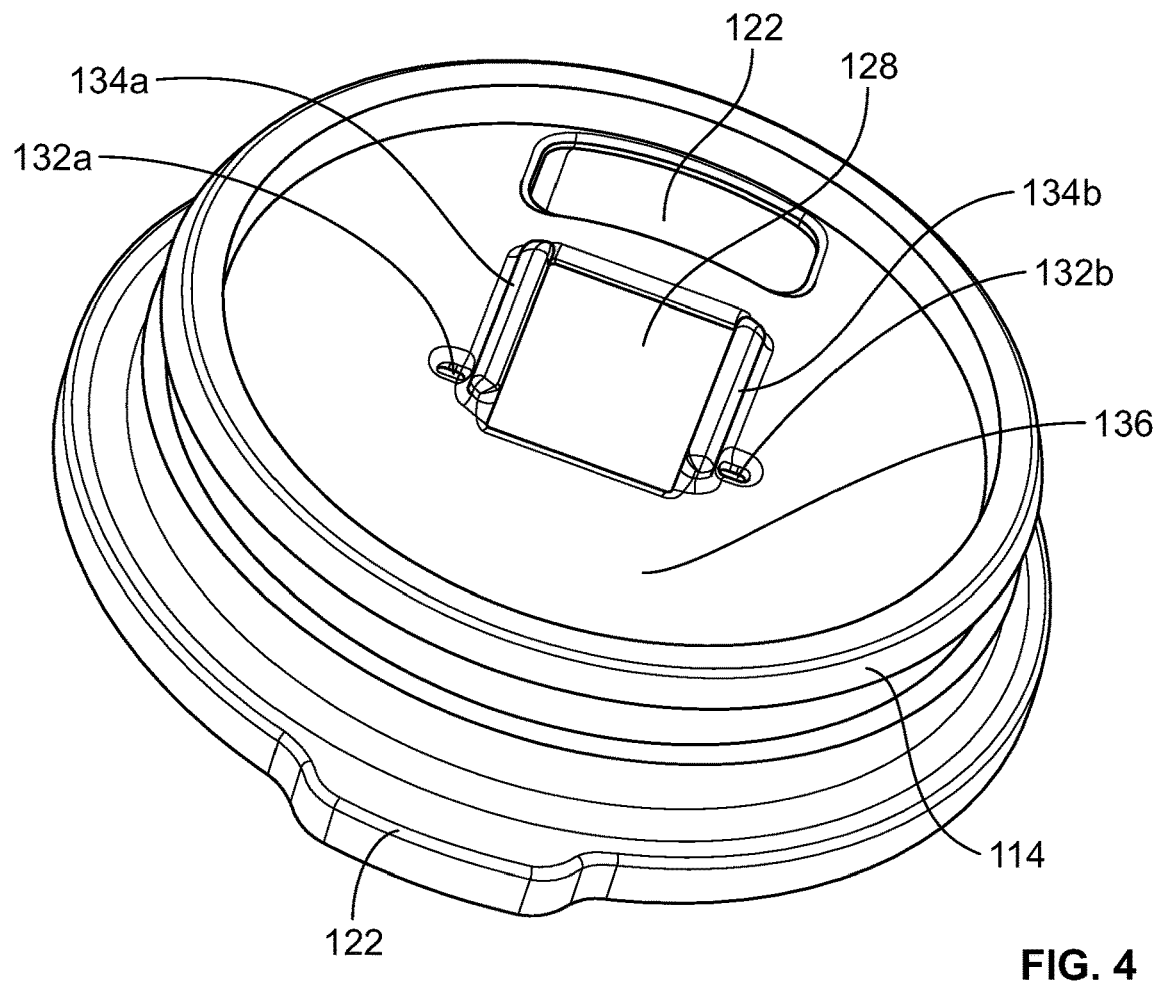
FIG. 4 shows an isometric bottom view of the example lid of FIG. 1A.

FIG. 4 shows a perspective bottom view of the lid 110 again with the slider 150 removed. A first guide 134a and a second guide 134b extend below a plane defined by a bottom surface 136 of the guide channel 127 and a plane defined by the middle wall 124. Additionally, the first guide 134a and the second guide 134b can extend below the bottom surface of 136 the guide channel 127 and can be located adjacent to the central opening 128. The first guide 134a and the second guide 134b can extend parallel to each other and can be formed elongated to extend along the entire length of the central opening 128. As will be discussed in further detail below, the first guide 134a and the second guide 134b are configured to guide the slider 150 from an opened position to a closed position.

It is also contemplated that the guides 134a, 134b may include channels or grooves for receiving corresponding projections on the slider or could be replaced entirely with channels or grooves for receiving a corresponding projection on the slider. Moreover, the central opening could also be replaced with channels or grooves that act as a track for the slider. In other examples, the central opening could be formed as a singular narrow opening for receiving a single leg or projection of the slider or the central opening could be arranged as two separate elongated openings with a central portion of the lid acting as a monorail-type track for the slider to move from the opened position to the closed position. In yet another example, the guide channel could be formed helical to require a twisting action to move the slider from the opened position to a closed position.

FIGS. 5-8 depict an example slider 150, which as discussed herein, is configured to selectively cover or uncover the opening 112 to provide an open position and a closed position of the lid assembly 100. The slider 150 can generally include a cap 151, a tab or handle 152 which extends from the cap, an elastic first leg 154a, an elastic second leg 154b, and a central post 156. As shown in FIGS. 5-8, the slider 150 can be provided with two degrees of symmetry, which allows for the slider 150 to be placed in two different orientations in the lid 110. This eliminates user error in installing the slider 150 onto the lid 110.

The cap 151 can include two symmetrical flanges 151a, 151b, which are both configured to selectively cover and seal the opening 112 for pouring liquid out of the container and the central opening 128 in the guide channel 127. The tab or the handle 152 is configured for the user to grasp to selectively move the slider 150 into an opened position to uncover the opening 112 on the lid 110 or closed position to cover the opening 112 on the lid 110. The tab or handle 152 may include two inwardly tapered portions 153a, 153b for grasping purposes.

Figure 6:
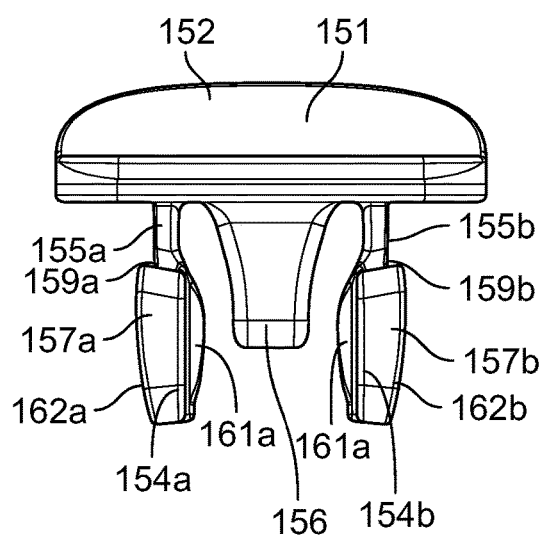
FIG. 6 shows an isometric front view of the example slider of FIG. 5.

FIG. 6, which is a front perspective view of the slider 150, illustrates the elastic first leg 154a and the elastic second leg 154b, which are each configured to flex inwardly to engage the sides of the central opening 128 and ultimately to engage the first guide 134a and the second guide 134b to secure the slider 150 into place on the lid 110.

Figure 7:
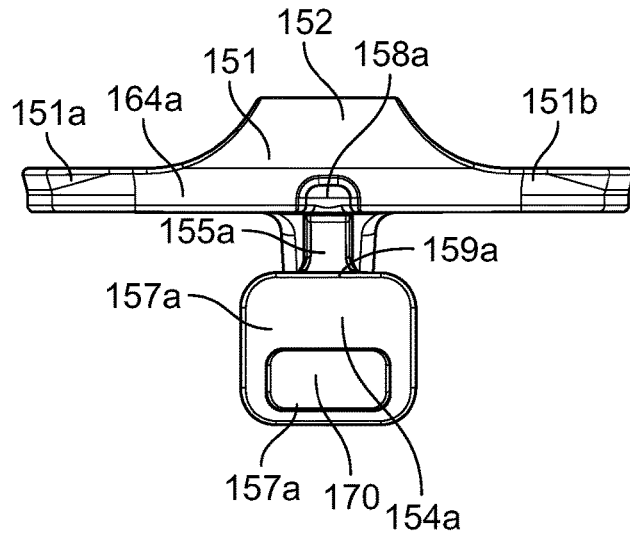
FIG. 7 shows an isometric side view of the example slider of FIG. 5.

Referring to FIGS. 6 and 7, the elastic first leg 154a and the elastic second leg 154b are formed with proximal ends 155a, 155b and distal ends 157a, 157b. The proximal ends 155a, 155b are formed of a thinner profile and cross section than the distal ends 157a, 157b. This provides the first elastic leg 154a and the second elastic leg 154b with the required flexibility to allow the user to insert the slider 150 into the central opening 128 in the lid 110.

Additionally, the intersections of the distal ends 157a, 157b and the proximal ends 155a, 155b form ridges or ledges 159a, 159b for receiving the first guide 134a and the second guide 134b of the lid 110 when the slider 150 is inserted into the central opening 128 of the lid 110. The interaction of the ledges 159a, 159b of the first and second legs 154a, 154b and the first and second guides 134a, 134b of the lid 110 helps to maintain the slider 150 in the guide channel 127. Moreover, the interaction between the cap 151 and the guide channel 127 and the engagement of the first and second legs 154a, 154b with the first and second guides 134a, 134b of the lid 110 helps to maintain the slider 150 on the lid 110.

As shown in FIG. 6, both the elastic first leg 154a and the elastic second leg 154b have inwardly tapered portions 162a, 162b to facilitate the ability of the user to insert the slider 150 into the central opening 128 of the lid 110. The elastic first leg 154a and the elastic second leg 154b can also include curved internal portions 161a, 161b that are configured to interact with the tapered profile of the central post 156. The distal ends 157a, 157b are provided with a larger surface area so that the user can easily grasp the distal ends 157a, 157b and move the first elastic leg 154a and the second elastic leg 154b inwardly. Moreover, as shown in FIG. 7, the distal end 157a can include a tactile groove 170. Likewise, although not shown, the distal end 157b can include a tactile groove. The tactile grooves provide a location for the user to grasp when squeezing the elastic first leg 154a, and the elastic second leg 154b inwardly to remove the slider 150 from the central opening 128.

Additionally, FIG. 6 shows the central post 156 located on the bottom of the slider 150, which limits the amount that the elastic first leg 154a and the elastic second leg 154b are permitted to move inwardly during the removal of the slider 150 from the lid assembly 100. The central post 156 is aligned with the elastic first leg 154a and the elastic second leg 154b and prevents the user from inadvertently shearing or breaking the elastic first leg 154a and the elastic second leg 154b from the slider 150 during the removal of the slider 150 from the lid 110. As also shown in FIG. 6, the central post 156 is tapered and diverges from a bottom surface of the slider 150, and the tapered profile of the central post 156 limits the inward movement of the elastic first leg 154a and the elastic second leg 154b.

Figure 5:
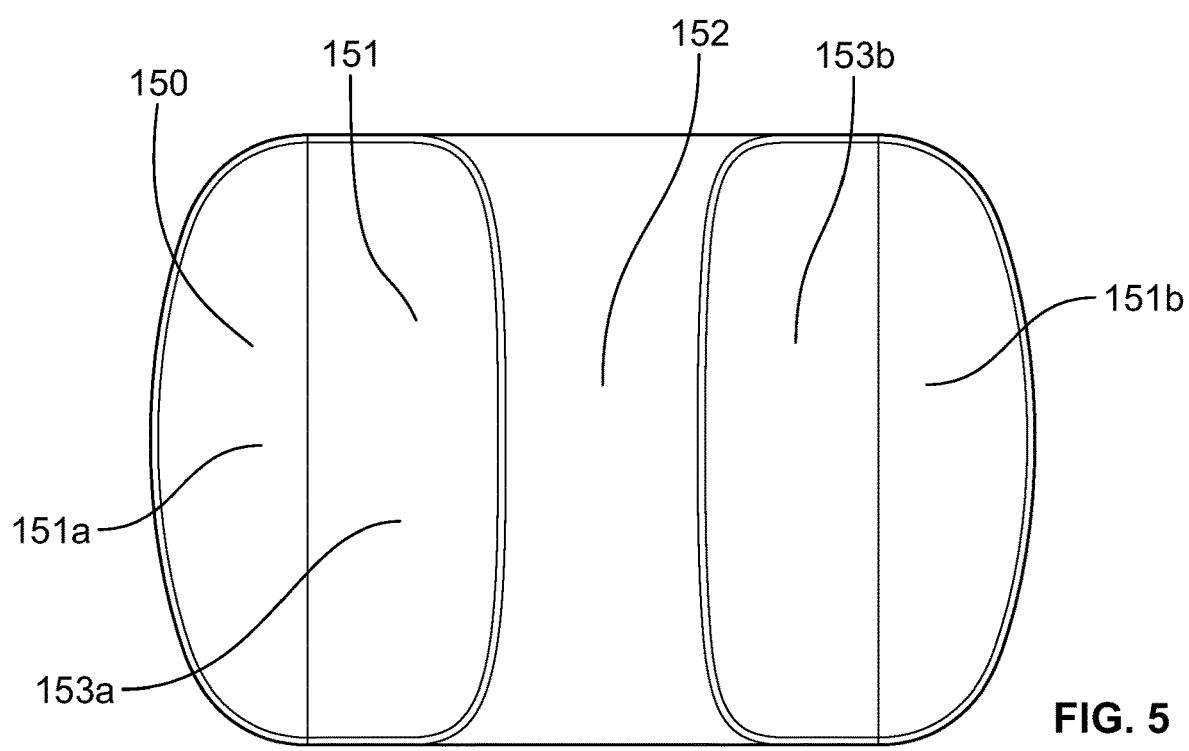
FIG. 5 shows an isometric top view of an example slider.
Figure 8:
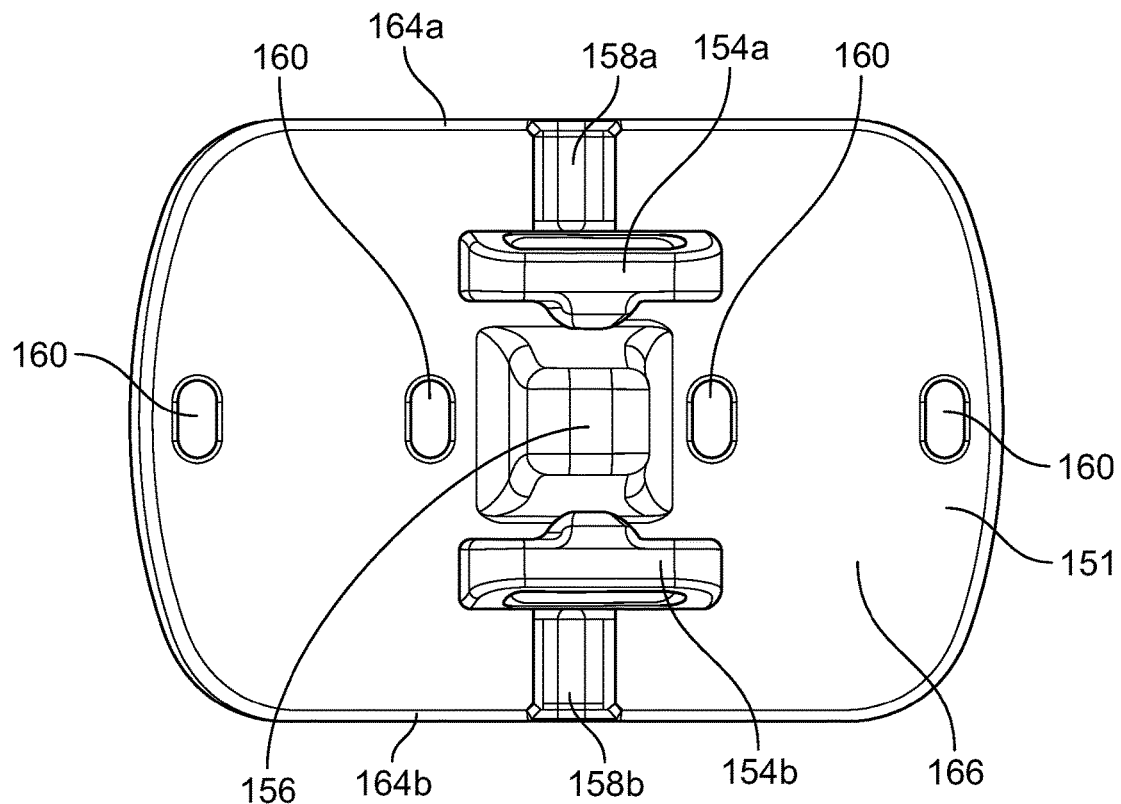
FIG. 8 shows an isometric bottom view of the example slider of FIG. 5.
Figure 9:
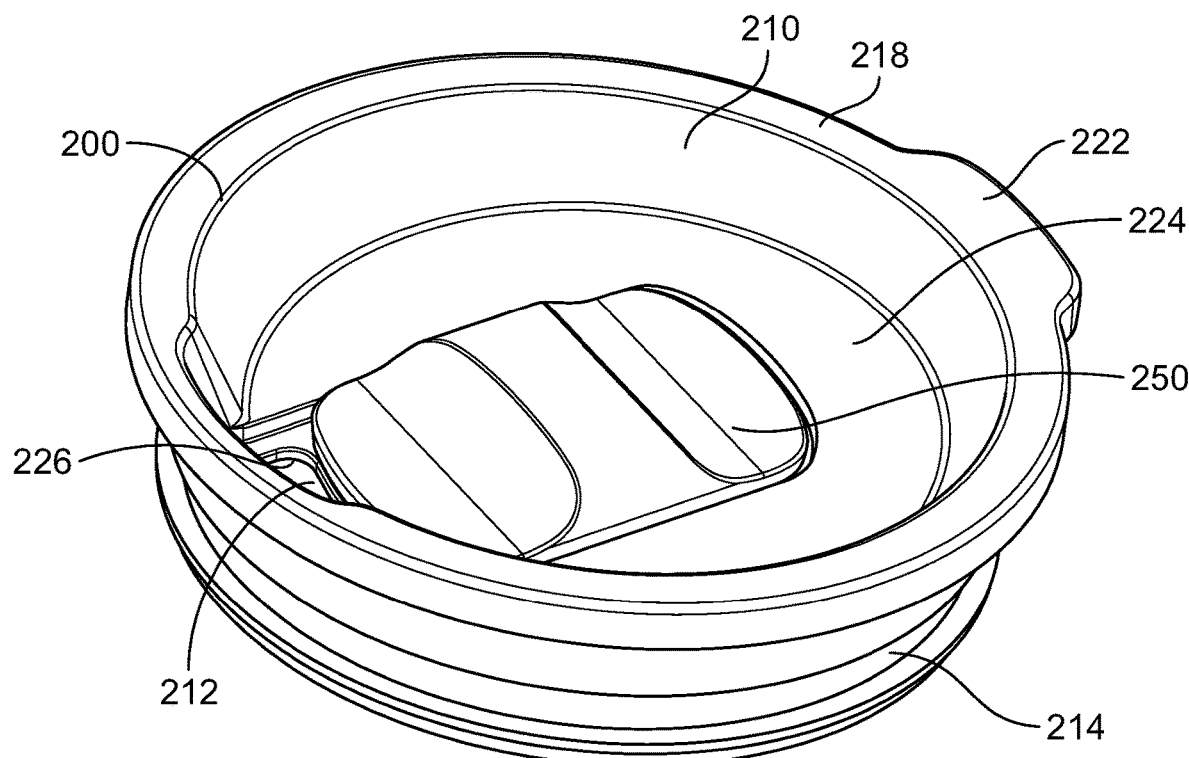
FIG. 9 shows an isometric top view of another example lid assembly.
Figure 10:
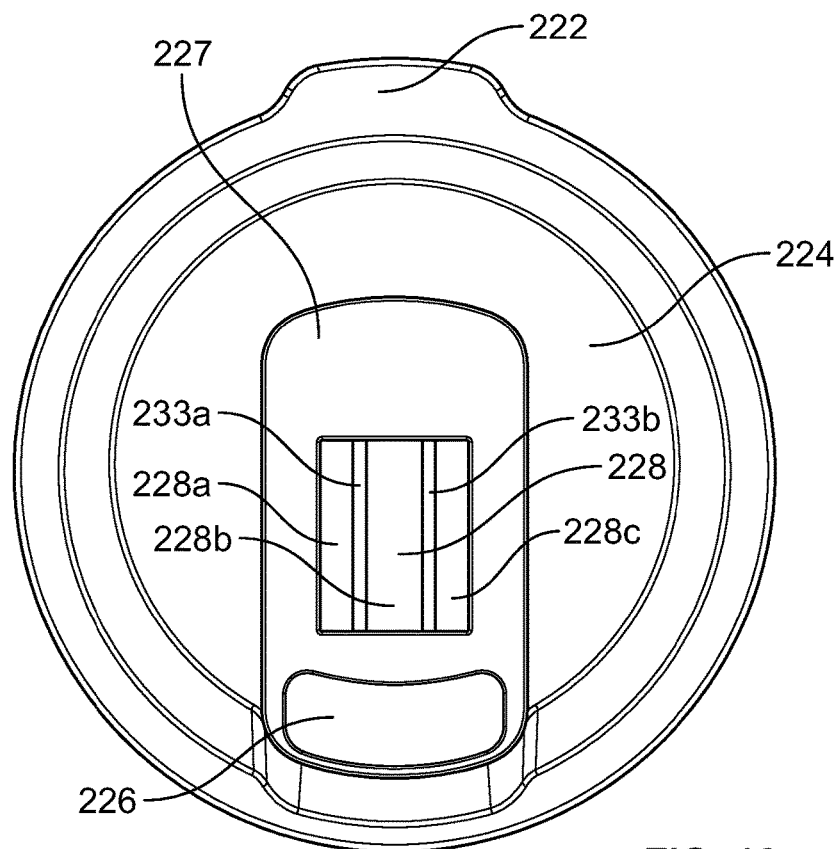
FIG. 10 shows an isometric top view of the example lid of FIG. 9.
Figure 11:
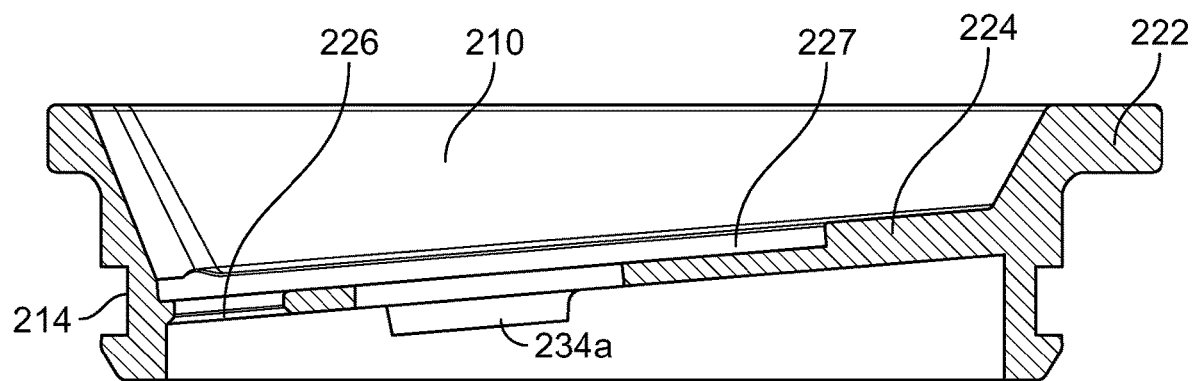
FIG. 11 shows a cross-sectional view of the example lid of FIG. 9.
Figure 12:
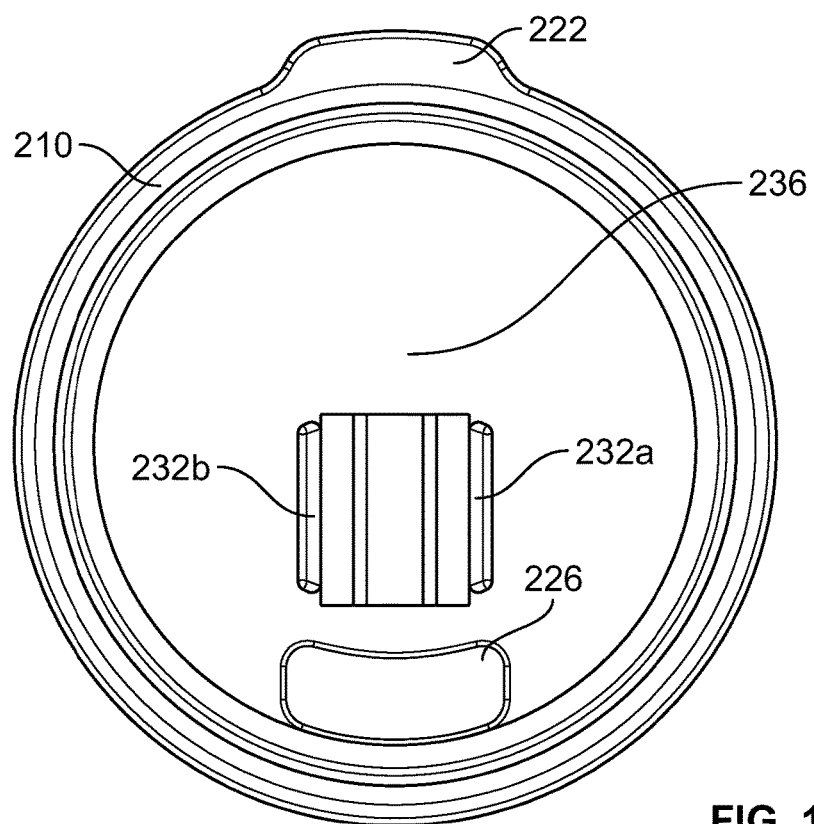
FIG. 12 shows an isometric bottom view of the example lid of FIG. 9.
Figure 13:
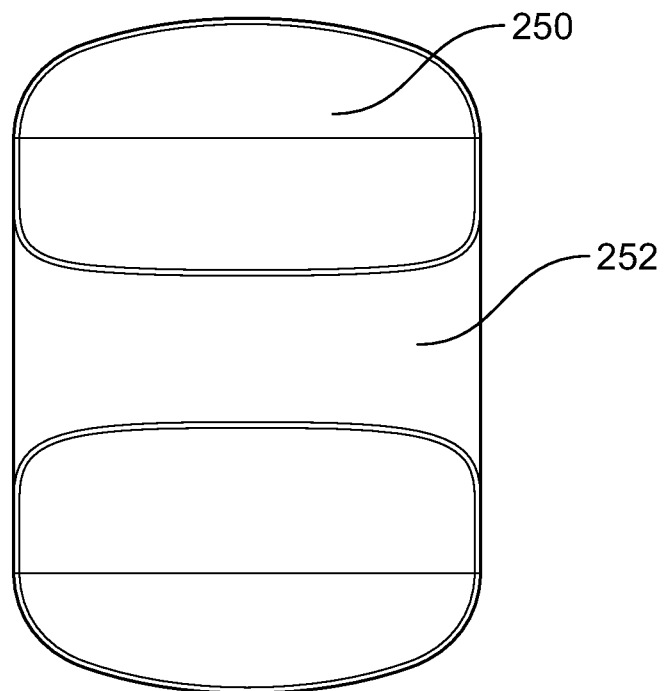
FIG. 13 shows an isometric top view of another example slider.
Figure 14:
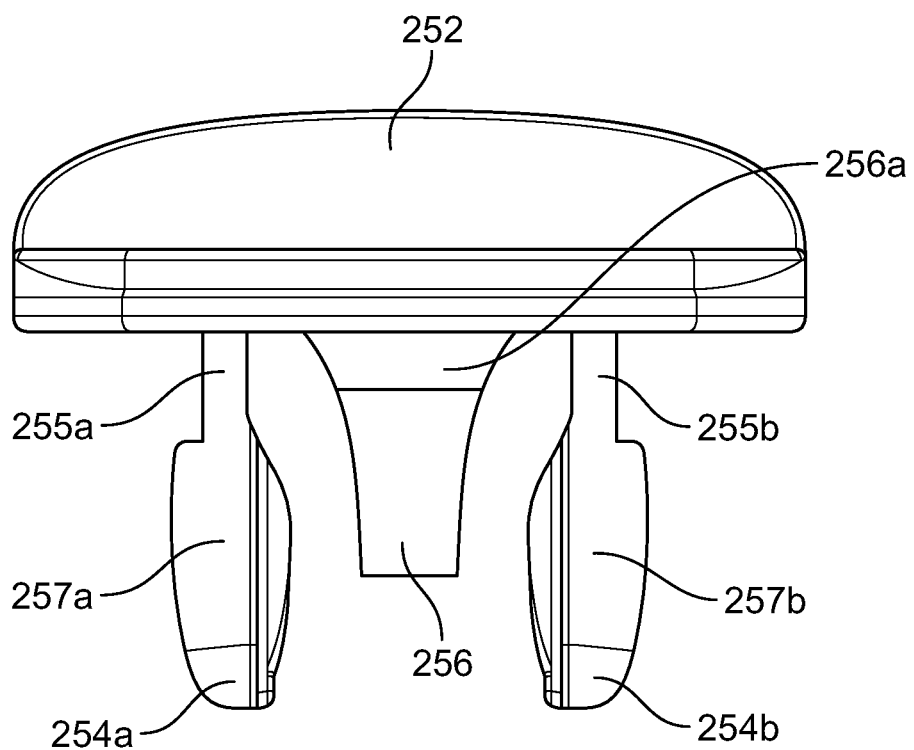
FIG. 14 shows an isometric front view of the example slider of FIG. 13.
Figure 15:
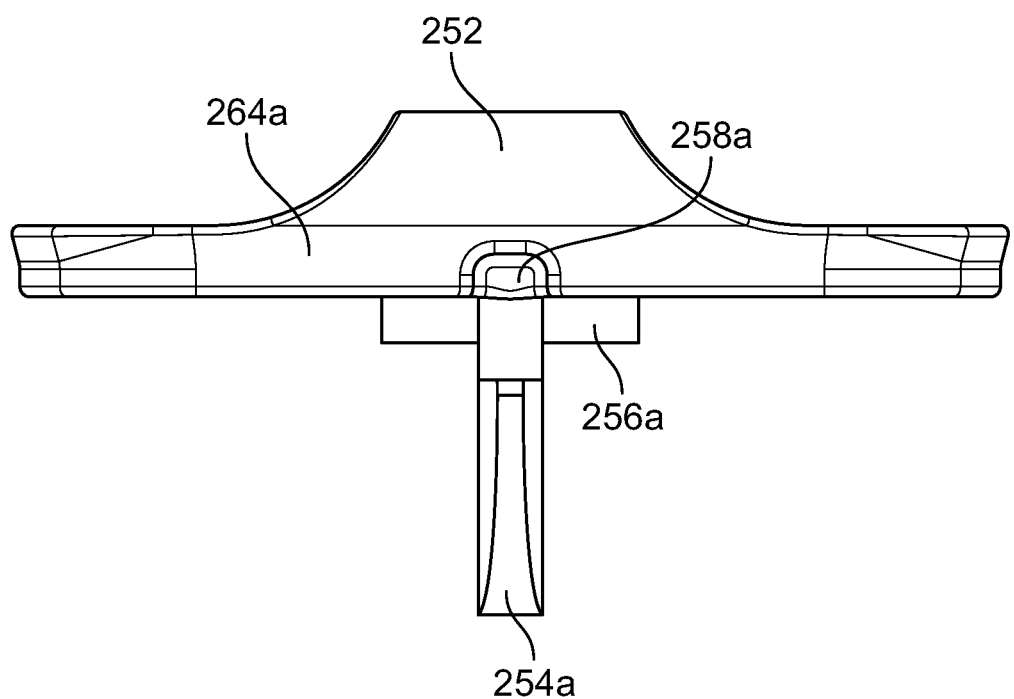
FIG. 15 shows an isometric side view of the example slider of FIG. 13.
Figure 16:
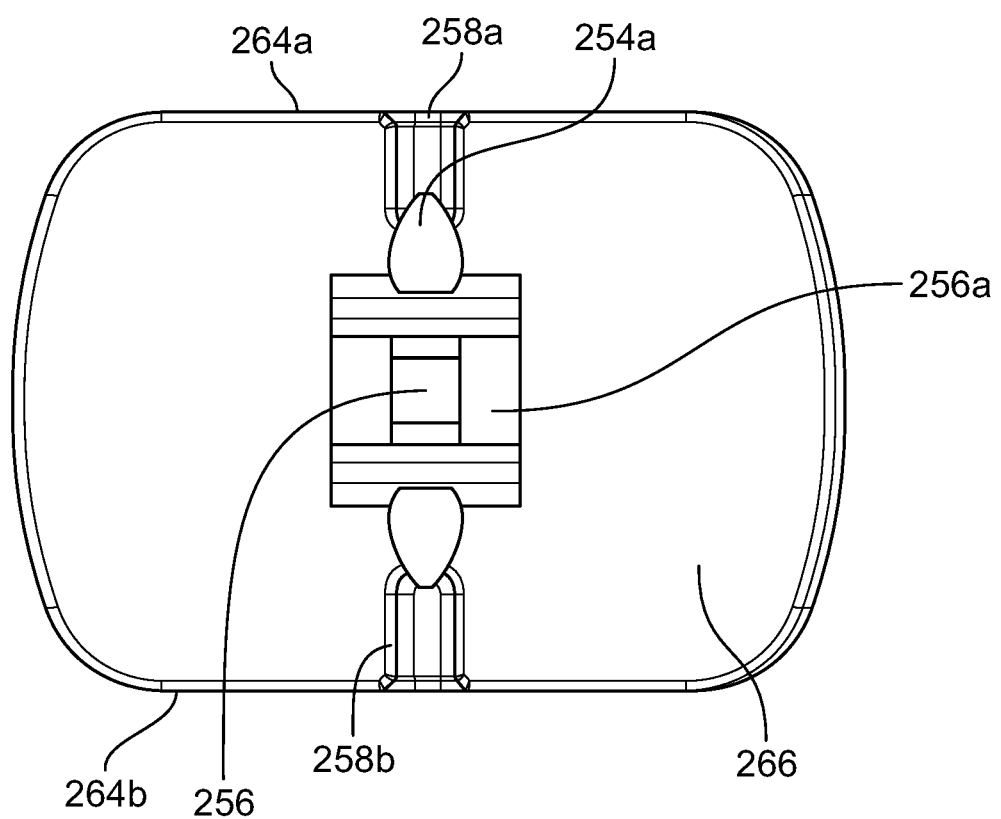
FIG. 16 shows an isometric bottom view of the example slider of FIG. 13.

As shown in FIGS. 7 and 8, the slider 150 can include a first channel 158a and a second channel 158b, which are configured to align with the first and second air vents 132a, 132b on the lid 110 when the slider 150 is in the opened position. The first channel 158a and the second channel 158b are formed in a bottom surface of the slider 150 and can open respectively into a first side wall 164a and a second side wall 164b of the slider 150. However, it is also contemplated that the channels could extend through the top of the slider. The first channel 158a is configured to align with the first air vent 132a on the lid 110, and the second channel 158b is configured to align with the second air vent 132b on the lid 110 located in the guide channel 127 when the slider 150 is in the opened position. This allows for fluid contact between the contents of the container and the ambient air when the slider is in the open position. As shown in FIG. 5, which is a top view of the slider 150, the air vents 132a, 132b are not visible to the user from the top view.

FIG. 8 shows a bottom perspective view of the slider 150. As shown in FIG. 8, the bottom 166 of the slider 150 can be provided with multiple openings 160 for receiving corresponding detents on the lid 110, which allows for the slider 150 to lock in either the open position or the closed position.

To operate the slider 150, the user can move the slider 150 from the opened position to the closed position by grasping the handle 152. When the user moves the slider 150 from the closed position to the opened position, the slider 150 moves along the guide channel 127 and the central opening 128 causing one of the flanges 151a, 151b of the cap 151 to uncover the opening 112 of the lid 110. Likewise, when the user moves the slider 150 from the opened position to the closed position, the slider 150 moves along the guide channel 127 and the central opening 128 causing one of the flanges 151a, 151b of the cap 151 to cover the opening 112 of the lid 110 to seal the opening 112 and to help prevent the contents of the container from spilling from the container. Also when the user moves the slider 150 between the open position and the closed position, the detents engage the openings 160 in the bottom of the cap 151 of the slider 150 to secure the slider 150 in either the open or closed position.

Additionally, the slider 150 can be selectively removed from the lid 110 for cleaning purposes or if the user otherwise does not desire the slider 150 to be on the lid 110. To remove the slider 150 from the lid 110, from the underside of the lid assembly 100, the user can grasp the first leg 154a and the second leg 154b on or near the tactile grooves 170 and squeeze the first leg 154a and the second leg 154b inwardly toward the central post 156 to cause the ledges 159a, 159b of the distal ends 157a, 157b to become disengaged from the first guide 134a and the second guide 134b, thereby permitting removal of the slider 150 from the central opening 128 of the lid 110. The central opening 128 provides a wide opening to give the user the ability to thoroughly clean the lid 110 when the slider 150 is removed from the lid 110.

Moreover, to replace the slider 150 back onto the lid 110, while gripping the cap 151 of the slider 150, the central post 156, the elastic first leg 154a and the elastic second leg 154b can be placed into the central opening 128. When the inwardly tapered portions 162a, 162b of the elastic first leg 154a and the elastic second leg 154b engage the central opening 128, the elastic first leg 154a and the elastic second leg 154b flex inwardly such that the distal ends 157a, 157b each move past the first guide 134a and the second guide 134b to cause the ledges 159a, 159b to engage the bottom surfaces of the first guide 134a and the second guide 134b. The elastic nature of the first leg 154a and the second leg 154b maintains the engagement of the ledges 159a, 159b of the first and second legs 154a, 154b with the first and second guides 134a, 134b, thus maintaining the slider 150 in position on the lid 110. Because the slider 150 is symmetrical, the slider 150 can be placed in two different orientations on the lid.

FIGS. 9-16 depict another exemplary lid assembly 200, in which like reference numerals refer to the same or similar elements as in the example lid assembly 100 discussed above. The example lid assembly 200 includes similar features that have similar functionality as discussed above in relation to the example lid assembly 100 in FIGS. 1A-8. However, in this example, additional guides 233a, 233b can be provided in the central opening 228 of the guide channel 227 and divide the opening 228 into three separate openings 228a, 228b, 228c. Additionally, the first elastic leg 254a and the second elastic leg 254b can be formed with less material.

The guides 233a, 233b provide additional support for the movement of the slider 250 when the slider 250 is moved between the opened position and the closed position. The additional guides 233a, 233b also provide for accurate placement of the first elastic leg 254a, the second elastic leg 254b, and the central post 256 into the separate openings 228a, 228b, 228c. Moreover, referring to FIG. 14, the central post 256 can be provided with a widened proximal end 256a, which can be sized to fit between the additional guides 233a, 233b and can be guided by the additional guides 233a, 233b to provide the slider with additional support when the slider is moved between the opened and closed positions. In another example, the proximal end 256a and the additional guides 233a, 233b can be sized to provide and interference fit such that the slider can be locked in any position along the guide channel 227 such as the opened position or the closed position. Because of the additional guides 233a, 233b, less material can be used to form the first elastic leg 254a and the second elastic leg 254b.

Figure 17:
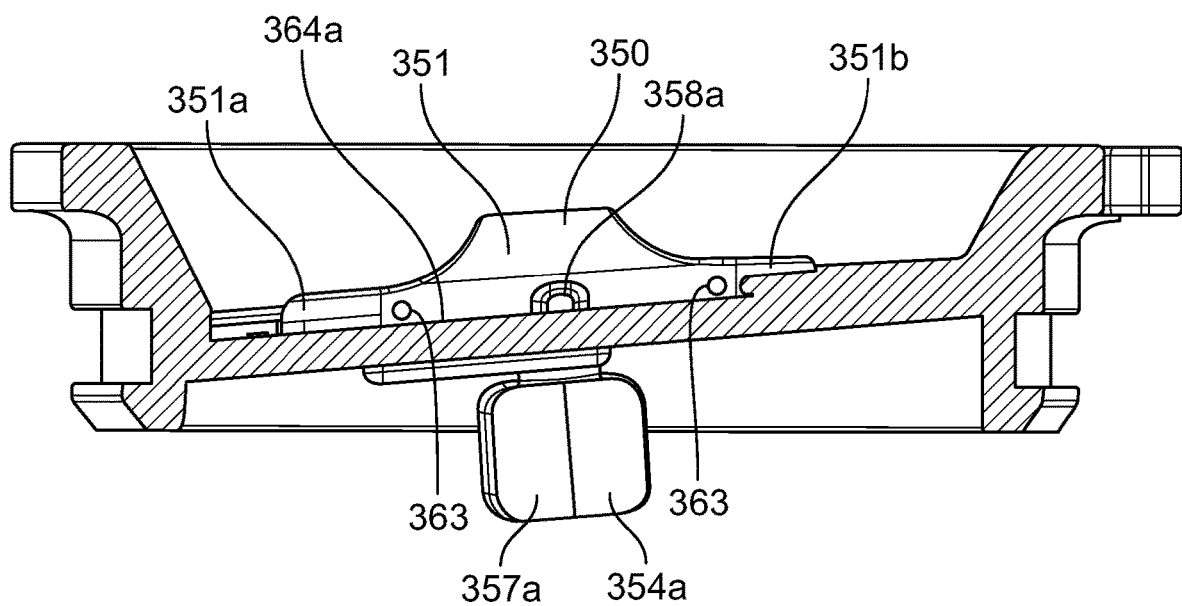
FIG. 17 shows a cross-sectional view of another example slider and lid.
Figure 18:
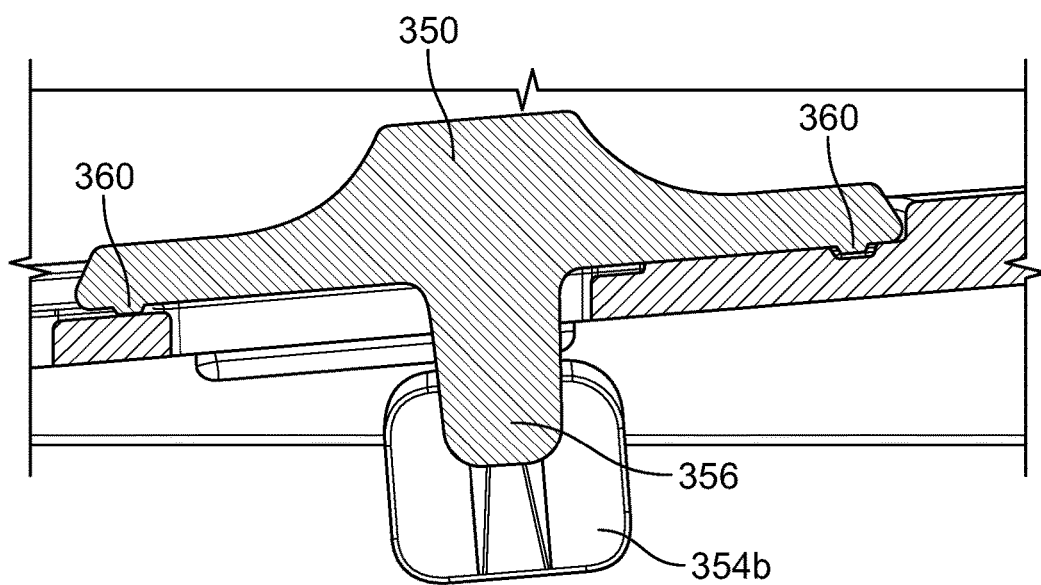
FIG. 18 shows an alternate cross-sectional view of the example slider of FIG. 17.
Figure 19:
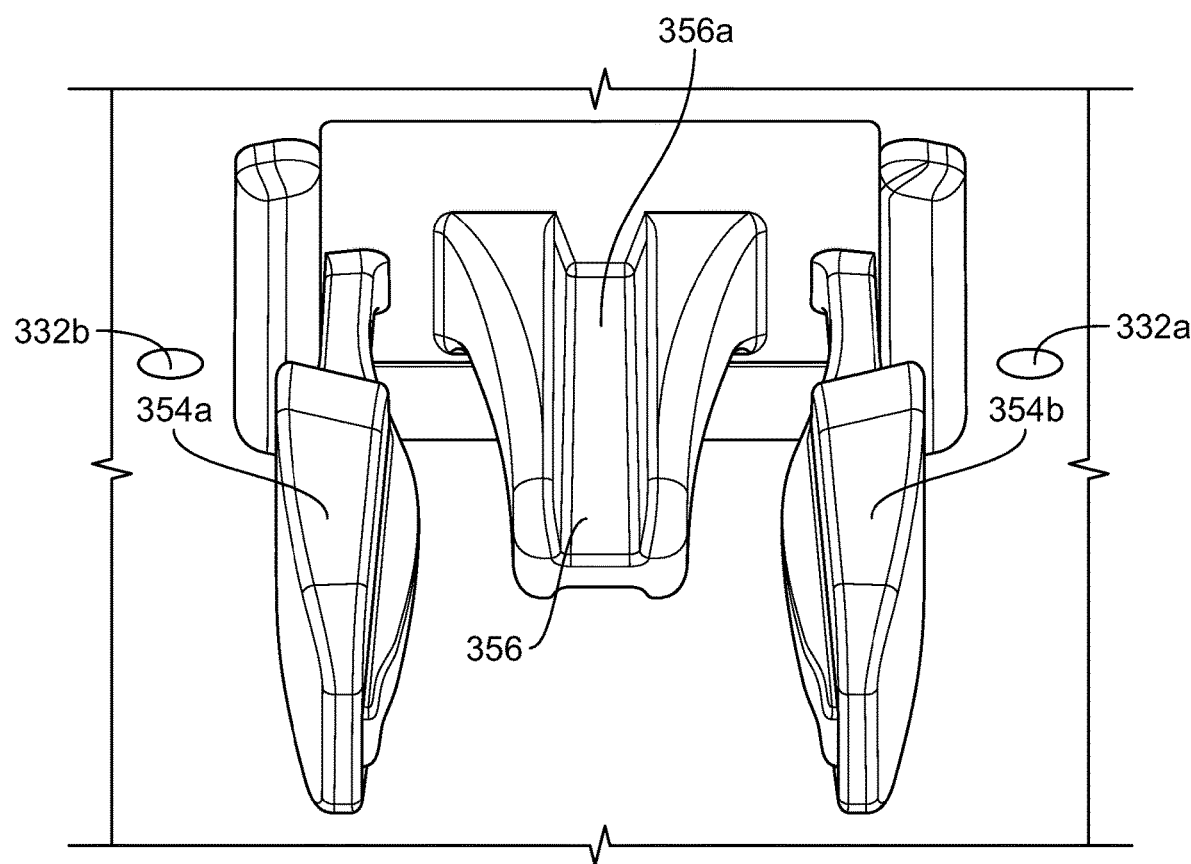
FIG. 19 shows a partial bottom view of the example slider of FIG. 17.
Figure 20:
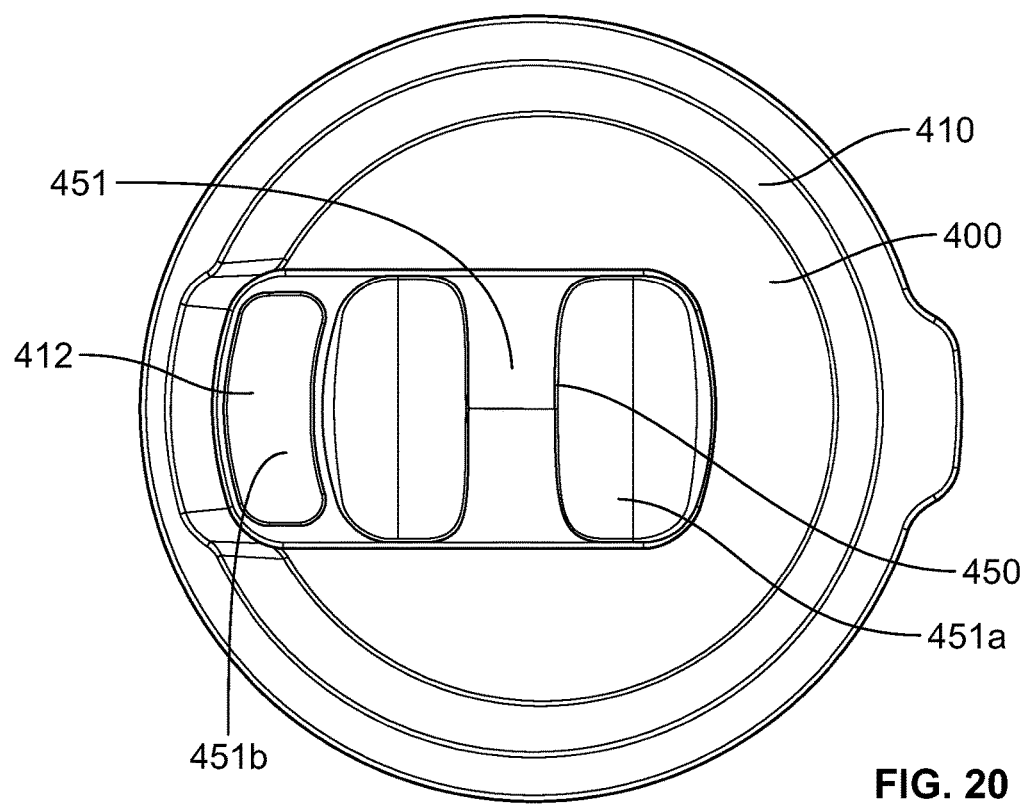
FIG. 20 shows a top view of another example lid assembly.
Figure 21:
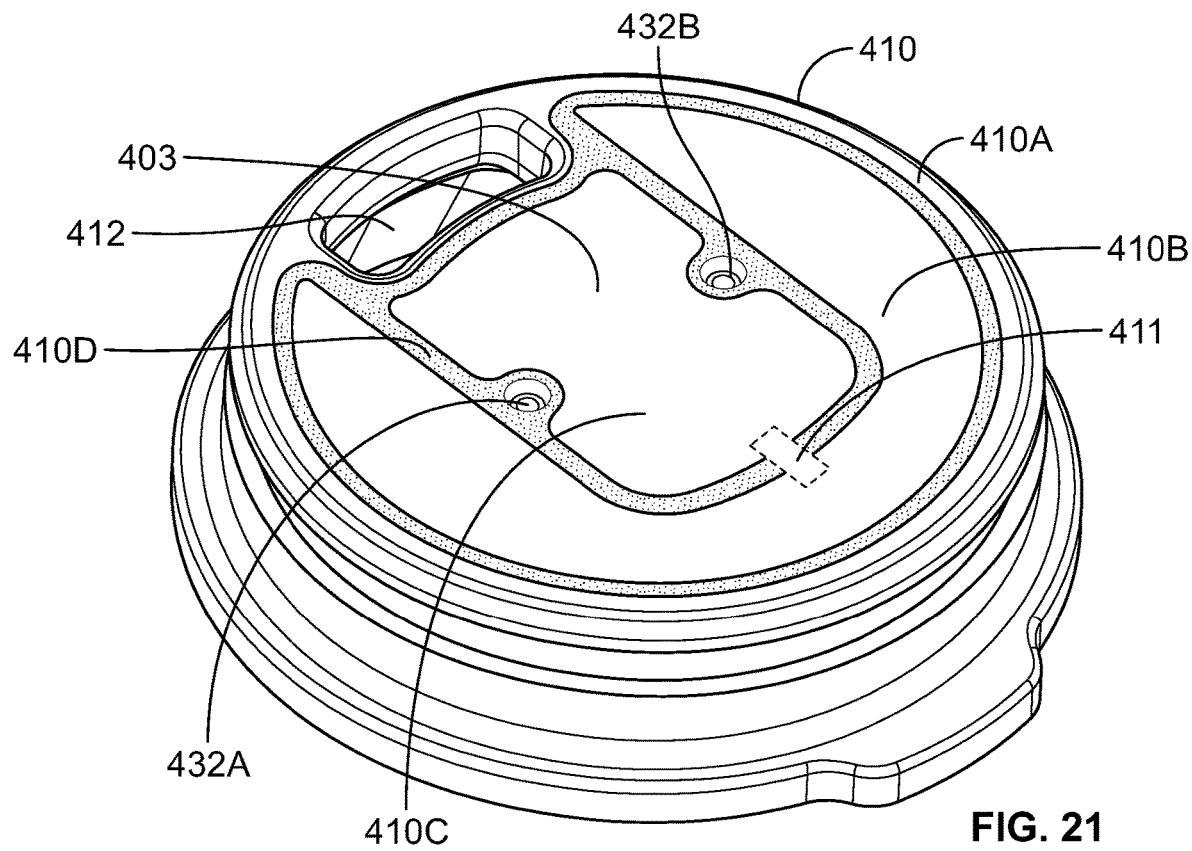
FIG. 21 shows a bottom view of the example lid assembly of FIG. 20.

FIGS. 17-19 show another exemplary slider 350, where like reference numerals show like components with similar functionality. This example slider 350 is similar to the example sliders discussed herein. However, in this example, the slider 350 can be provided with detents 360 instead of openings on the bottom surface. The detents 360 can be received in slots located in the lid for securing the slider in place in either the open or closed position on the lid. Additionally, the slider 350 can include one or more protuberances 363 which also assist in maintaining the slider 350 in place along the channel located in the lid 310. Additionally, as shown in FIG. 19, a removed section 356a can be included on the central post to reduce sink marks on the top exposed surface of the slider 350 due to part thicknesses.

Figure 22:
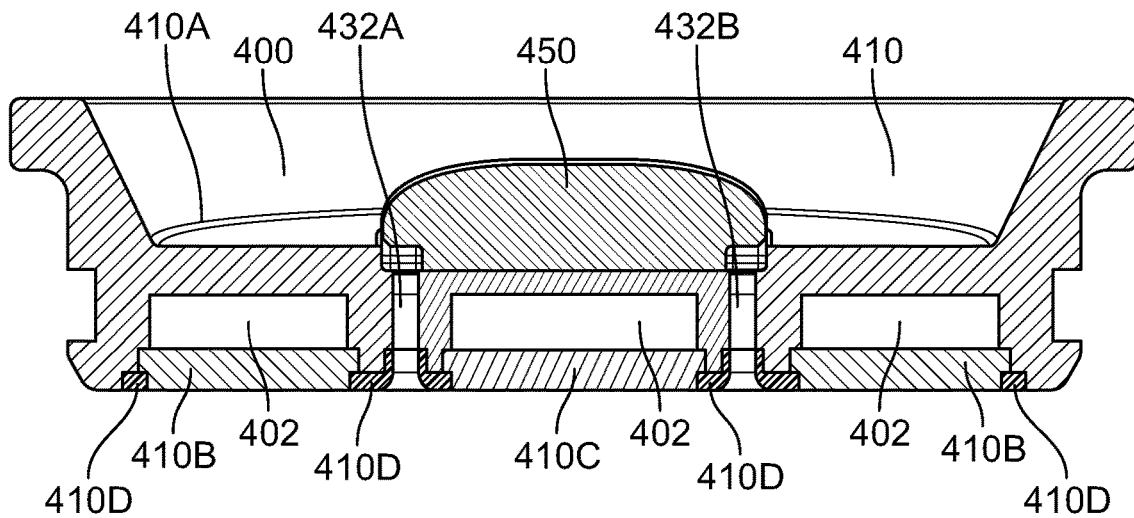
FIG. 22 shows a cross-sectional view of the example lid assembly of FIG. 20.
Figure 23:
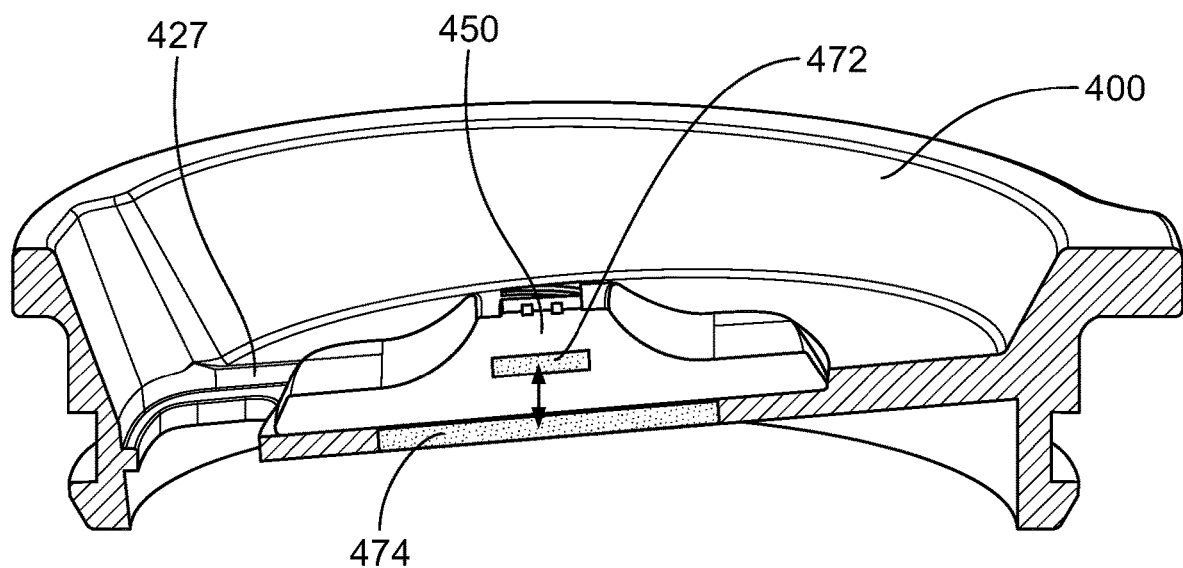
FIG. 23 shows a schematic cross-sectional view of the example lid assembly of FIG. 20.

FIGS. 20-24 show another alternative example slider lid assembly 400. This example is similar to the above examples discussed herein where like reference numerals represent similar features with similar functionality. However, in this example, the lid 410 and slider 450 can be provided with one or more magnets. The magnets can provide one or more of (1) maintaining the slider 450 onto the lid 410, (2) maintaining the slider 450 in either the open or closed positions during the use of the slider 450, and (3) limiting the movement of the slider 450 on the lid 410. The lid assembly 400 can be provided with a slider 450 for opening and closing the lid 410 like in the above examples. Additionally, the lid 410 can be provided with an internal magnet assembly 403 for interacting with one or more internal magnets in the slider 450. As shown in FIG. 22, which is a cross sectional side view of the slider lid assembly 400, the slider lid assembly 400 has a smaller profile than the examples discussed in relation to FIGS. 1-20. Also as will be discussed in further detail below, the lid 410 can be formed in a three-shot injection molding process to help in insulating the lid 410 and to secure the magnet assembly 403 in place on the lid 410. This technique may also be applied to the other example lid assemblies discussed herein.

In maintaining the slider 450 onto the lid 410, one or more magnets can be provided in each of the slider 450 and the lid 410 to achieve the proper clamping force to maintain the slider 450 onto the lid 410. In particular, as shown schematically in FIG. 23, a first clamping magnet 472 can be provided within the slider 450 and a second clamping magnet 474 can be provided within the lid 410. The length of the second clamping magnet 474 can be selected such that the second clamping magnet 474 interacts with the first clamping magnet 472 during the entire length of travel of the slider 450 from the opened position to the closed position. Moreover, the second clamping magnet 474 in the lid can be longer than the first clamping magnet 472 in the slider, so in either orientation, the second clamping magnet is underneath the first clamping magnet 472 whether open or closed. In one example, the magnets 472 and 474 can be polarized through the thicknesses of the magnets as opposed to the length such that the overwhelming attraction/repulsion forces are based upon the large parallel slider/lid magnet surfaces.

The interaction between the first clamping magnet 472 in the slider 450 and the second clamping magnet 474 in the lid 410 helps to maintain the slider 450 on the lid 410 during the operation of the slider 450. The channel 427 in conjunction with the slider 450 can help to limit the travel of the slider 450 on the lid 410 in the lateral direction or the x-direction. In one example, the clamp force can be sufficient to withstand force from the pressure of a filled container being turned upside down. In this way, the slider 450 will remain in the closed position while the pressure from the liquid acts on the flange 451a or the flange 451b through the opening of the lid. In one specific example, the force produced by the first clamping magnet 472 and the second clamping magnet 474 can be at or between 0.25 to 2.0 lbs.

Figure 24:
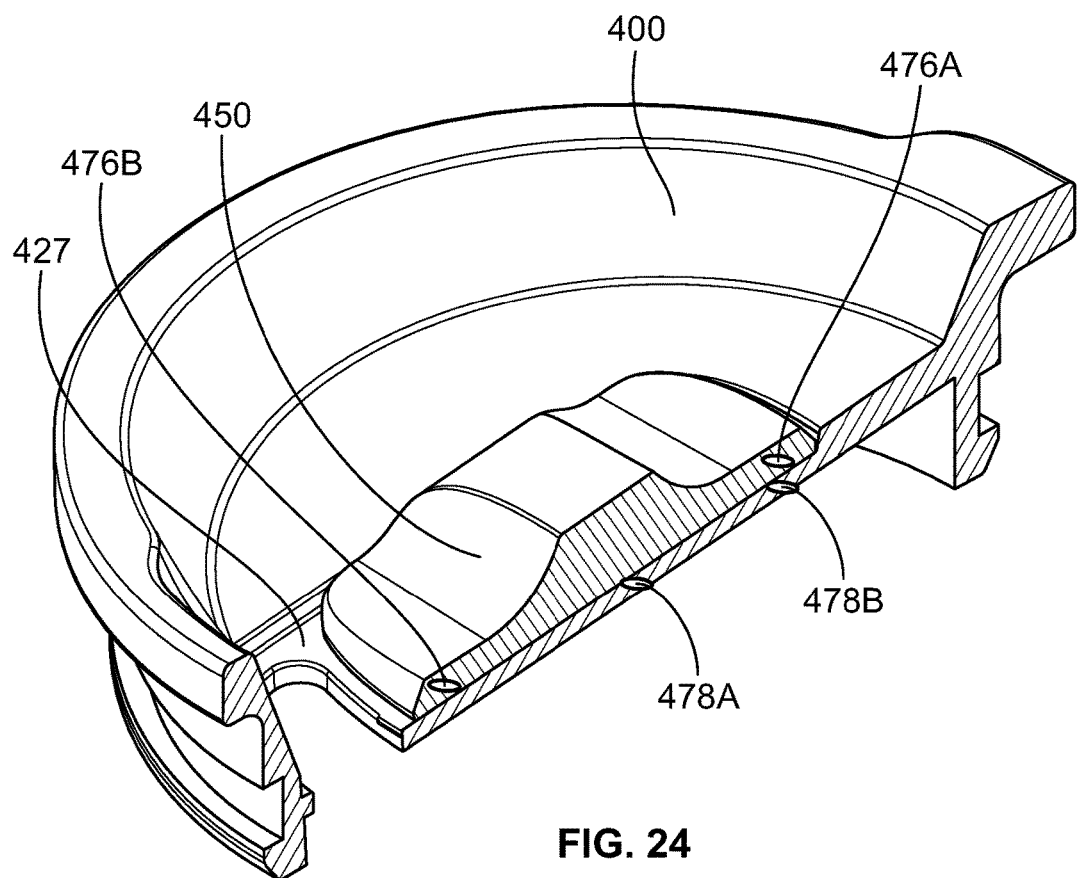
FIG. 24 shows another schematic cross-sectional view of the example lid assembly of FIG. 20.

Moreover, as shown schematically in FIG. 24, to maintain the slider 450 in either the open or closed positions, another series of magnets can be provided in the slider 450 and the lid 410. Specifically, a first positioning magnet 476A and a second positioning magnet 476B can be provided in the slider 450. Likewise, a third positioning magnet 478A and a fourth positioning magnet 478B can be provided within the lid 410. As shown in FIG. 24, the first positioning magnet 476A is aligned with the fourth positioning magnet 478B to selectively maintain the slider 450 in the open position where the slider 450 is held out of the way of the opening 412 in the lid 410. Likewise, the first positioning magnet 476A can be aligned with the third positioning magnet 478A to selectively lock the slider 450 in a closed position. The second positioning magnet 476B of the slider 450 is not being used in this particular example and is included in the slider 450 to provide a reversible and symmetrical slider 450 such that the slider 450 can be positioned in the channel 427 in either orientation. Additionally, when the first positioning magnet 476A and the second positioning magnet 476B come into close proximity and interact with the third positioning magnet 478A or the fourth positioning magnet 478B the slider 450 can "snap" open or closed to provide a noticeable sound indicating to the user that the slider 450 is in either the open or closed position. Additionally in certain examples, the force required to open or close the slider can be sufficient to keep the slider locked during normal operating conditions of the container. The force required to open or close the slider 450 can be in certain instances 0.25 to 3 lbs.

Various techniques for including the magnets in the lid 410 and the slider 450 are contemplated. For example, the each magnet can be overmolded in the slider 450 and then magnetized afterward. In this example, each magnet can be placed into the lid 410 or the slider and then the lid 410 or the slider 450 can be injection molded or otherwise formed of a polymer material over each magnet. In other examples the magnets can be assembled to the slider 450 or lid 410 with ultrasonic welds or can be attached using cover plates on the lid 410 or the slider 450.

To form the lid, in one implementation, the lid 410 may be formed using a three or four shot molding process, where the lid body 410A may be injection molded with a first shot of polymer material. A first plate portion 410B may be injection molded with a second shot of polymer material, and a second plate portion 410C may be injection molded with a third shot of material. In this example, the second plate portion 410C can include a magnet assembly which can include all or some of the lid magnets as discussed herein. The magnet assembly can be in-molded into the second plate portion 410C with the third shot of material. Also a seal portion 410D which can be formed of a fourth shot of material can provide a seal or seam between the first plate portion 410B and the second plate portion 410C. Moreover, the seal portion 410D can also provide a seal or seam between the first plate portion 410B and the lid body 410A. Additionally, one or more air pockets 402 can be trapped between the lid body 410A and both the first plate portion 410B and the second plate portion 410C to increase the insulative properties for the lid 410. To form the air pocket 402, the second plate portion 410C may also include a raised section around the perimeter (or just in one or two locations) that extends downward into an opening and presses against the magnet assembly 403 holding it in place. Alternatively, a seal portion 410D can hold the magnet assembly 403 in place by applying a second seal portion to over the magnet assembly. Additionally, the seal portion 410D could overmold the magnet assembly 403. This can help to accommodate dimensional tolerances of the magnet assembly 403 (thinner or thicker magnet assembly).

As shown in FIG. 22, the lid body 410A, the second plate portion portion 410C, and the seal portion 410D each define the air vents 432a, 432b for the lid. In one example, the air vents 432a, 432b can be formed by bosses or pins in the injection mold or by blow molding. The air vents 432a, 432b are selectively opened and closed by the slider 450 in accordance with the other examples discussed herein. In an alternative embodiment, an optional channel 411 can be provided between the first plate portion 410B and the second plate portion 410C to combine the second and third shots of polymer material such that the first plate portion 410B and the second plate portion 410C can be formed together to reduce the number of shots of material and to simplify the injection molding process.

This four or three shot injection molding process may utilize different polymer materials (one for each of the lid body 410A, the first plate portion 410B, the second plate portion 410C, and the seal portion 410D). In another example, the four or three shot injection molding process may utilize the same polymer material for the lid body 410A, the first plate portion 410B, the second plate portion 410C, and a different polymer material for the seal portion 410C. In yet another example, the four or three shot injection molding process may utilize the same polymer material for each of the lid body 410A, the first plate portion 410B, the second plate portion 410C, and the seal portion 410D.

In other implementations, the lid 410 may be formed using additional or alternative processes. For example, the lid body 410A may be coupled to the first plate portion 410B and the second plate portion 410C by an alternative coupling process, such as, among others, spin welding, gluing, ultrasonic welding, an interference fit, a threaded coupling, or use of one or more fasteners (such as rivets, screws or bolts) or combinations thereof. It is also contemplated that the entire lid 410 can be formed by a single injection molding process, while in-molding the magnets. It is contemplated that any of the lids discussed herein can be formed by a four or three shot injection mold technique. Moreover, similar techniques could also be used in forming the sliders discussed herein.

In various implementations, the lids and sliders discussed herein may be formed of a single, or multiple polymer materials, including, among others, Acrylonitrile Butadiene Styrene, polypropylene, polyethylene, polystyrene, polyvinyl chloride, nylon, polycarbonate or acrylic, or combinations thereof.

The slider 450 can operate in a similar fashion as the examples discussed above. The user can move the slider 450 from the opened position to the closed position by grasping the handle 452. When the user moves the slider 450 from the closed position to the opened position, the slider 450 moves along the guide channel 427 causing one of the flanges 451a, 451b of the cap 451 to uncover the opening 412 of the lid 410. Likewise, when the user moves the slider 450 from the opened position to the closed position, the slider 450 moves along the guide channel 427 causing one of the flanges 451a, 451b of the cap 451 to cover the opening 412 of the lid 410 to seal the opening 412 and to help prevent the contents of the container from spilling from the container. Also when the user moves the slider 450 between the open position and the closed position, the first positioning magnet 476A or the second positioning magnet 476B in the slider 450 interact with the third positioning magnet 478A or the fourth positioning magnet 478B in the bottom of the cap 451 of the slider 450 to secure the slider 450 in either the open or closed position. Additionally, when the user moves the slider 450 to either the opened position or the closed position the interaction of the slider 450 and the lid 410 produces a sound indicating to the user that the slider 450 is in either the open position or the closed position.

Additionally, like in the above examples, the slider 450 can be selectively removed from the lid 410 for cleaning purposes or if the user otherwise does not desire the slider 450 to be on the lid 410. To remove the slider 450 from the lid 410, the user can simply pull or twist the slider 450 off of the lid 410 by exceeding the clamping force provided by the attraction of the first clamping magnet 472 in the slider 450 and the second clamping magnet 474 in the lid 410. Likewise, to replace the slider 450 back onto the lid 410, the user simply places the slider 450 back into the channel 427 such that the first clamping magnet 472 of the slider 450 is attracted to the second clamping magnet 474 in the lid 410. Because the slider 450 is symmetrical, the slider 450 can be placed in two different orientations on the lid.

Figure 25:
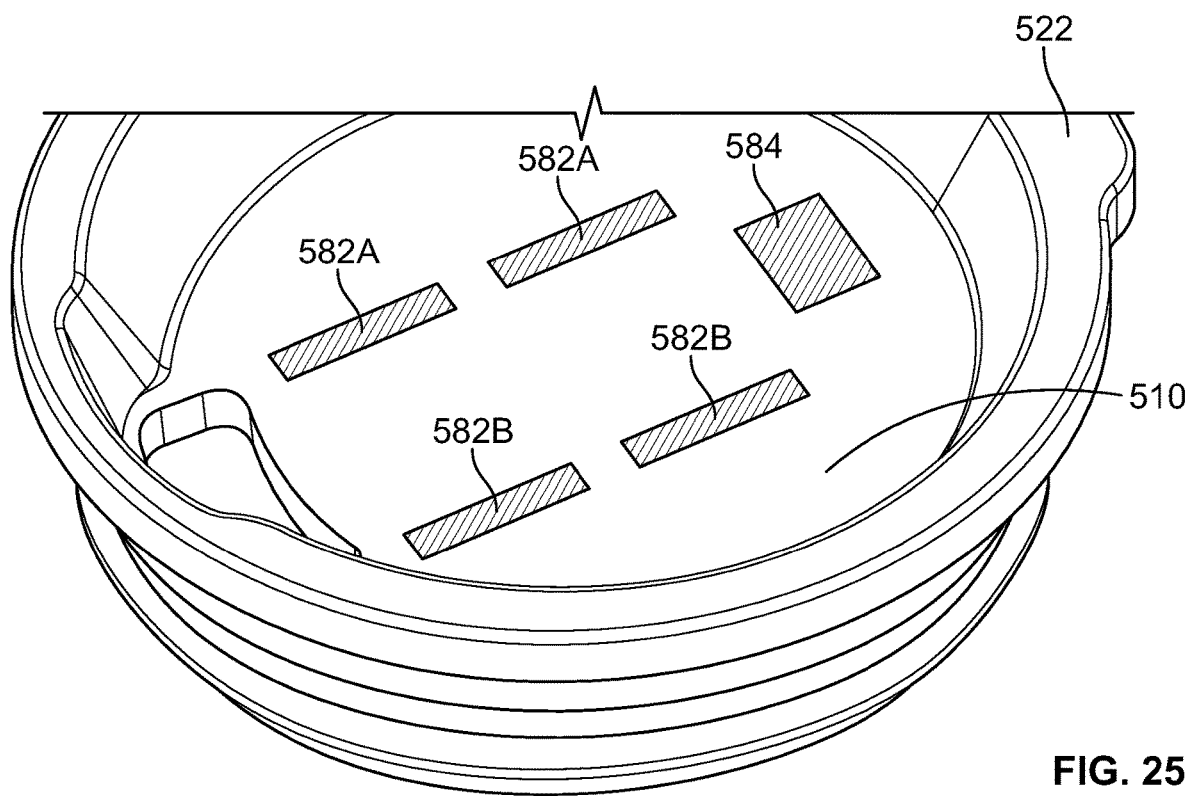
FIG. 25 shows a schematic view of another example lid.

FIG. 25 shows another example, where the slider guiding magnets 582A, 582B can be provided within the lid 510 to maintain the slider on the lid in the x-direction or the lateral direction. The slider guiding magnets 582A, 582B can be used in place of the channel 427 and act as guides or guide rails for the slider on the lid 510. The slider may also be provided with corresponding guide magnets (not shown), which can be positioned within the slider or overmolded into the slider and located on each of the outer edges of the slider. The interaction of the slider guiding magnets 582A, 582B with the guide magnets located within the slider help to maintain the slider in position on the lid 510. In this example, four slider guiding magnets 582A, 582B are depicted, however, any number of slider guiding magnets can be used depending on the guiding forces required on the slider.

In addition, a limiting magnet 584 can be molded into the lid 510 which may either repel or attract the slider such that it is locked in the open position and cannot move beyond the locked position on the lid 510. In this example, corresponding limiting magnets can be positioned at each end of the slider. The polarity of corresponding limiting magnets can be oppositely aligned with the limiting magnet 584 such that one of the limiting magnets is attracted to the limiting magnet 584 or can be similarly aligned such that one of the limiting magnets repels against the limiting magnet 584. In this way, the slider can be limited from moving past the opened position on the lid 510 toward the lid tab 522. In this example, the slider can be removed from the lid 510 in a similar fashion as discussed above in relation to the examples in FIGS. 20-24. However, the slider may also be twisted or pivoted to remove the slider out of alignment with the clamping, positioning and guide magnets and then removed from the lid 510.

In forming the lid and slider, the magnets can be magnetized before or after being molded into the slider and or lid. It is also contemplated that permanent magnets, ferromagnetic materials, and/or metal strips could be used in either the lid or the slider. For example, one or more permanent magnets, metal strips, or ferromagnetic materials could be placed in the slider or the lid to control the slider magnetically on the lid. In certain instances, this may reduce the manufacturing costs in not having to magnetize the lid or the slider.

In another implementation a first permanent magnet can be separated from a second permanent magnet by a metal strip in the lid in such a way that a high magnetic attraction occurs at both ends of the lid as the slider snaps open and closed. In this example, however a metal (non-magnetic) pathway will occur in between the ends of the lid. In other examples, the lid and/or the slider may be formed of a plastic having a magnetic powder additive. The magnetic powder additive can be included in the injection molding process and may include ferrite, neodymium-iron-boron (NdFeB), and samarium cobalt (SmCo). The magnetic powder additive can provide for similar lid securing and locking functions as discussed herein such as providing for maintaining the slider onto the lid, maintaining the slider in either the open or closed positions during the use of the slider, and limiting the movement of the slider on the lid.

Another example may include the use of polymagnets, where a singular magnet is magnetized with a matrix of regions where the poles may alternate or stay the same to create different regions of magnetization and force that is applied to the lid. With the use of polymagnets it is possible to reduce the number of magnets in only having one magnet in the lid or slider to provide for maintaining the slider onto the lid, maintaining the slider in either the open or closed positions during the use of the slider, and limiting the movement of the slider on the lid.

Figure 26A:
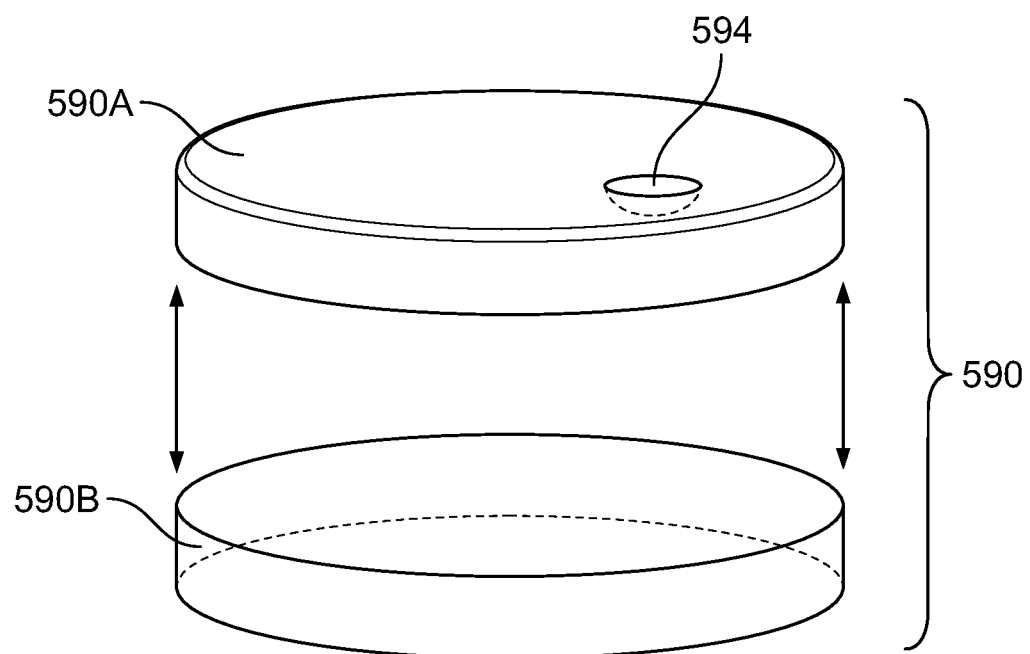
FIG. 26A shows an exploded view of an example insulative disc.
Figure 26B:
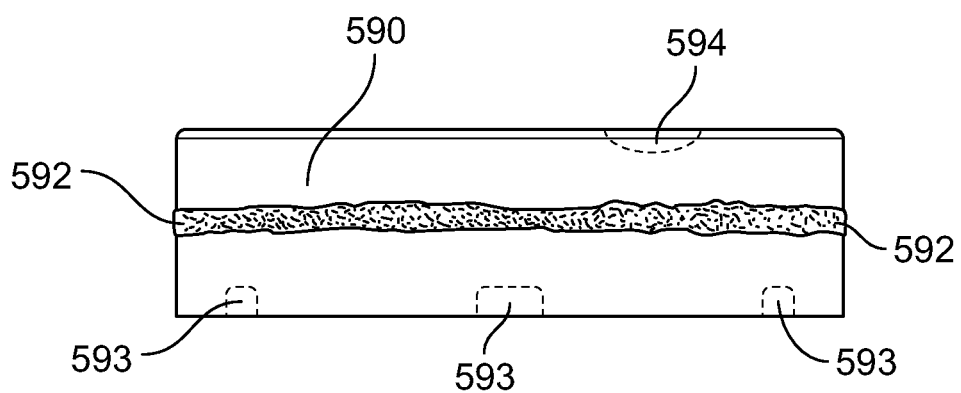
FIG. 26B shows a side view of the example insulative disc of FIG. 26A.

In another example, an insulated disc 590, as shown in FIGS. 26A and 26B, can be included within the lid to help insulate the lid. The exemplary disc 590 may be placed within any of the lids discussed herein. FIG. 26A depicts an example assembly method for the disc 590, and FIG. 26B shows the example disc 590 in an inverted position for the vacuumization process. In one example, the disc 590 can be vacuum formed for insulating any of the lids discussed herein. The disc 590 can be formed by welding a first cap 590A and a second cap 590B together at welds 592. The disc 590 can be formed of a stainless steel or titanium, for example. The first cap 590A can be formed with a dimple or divot 594 for forming the vacuum within the disc 590, which is discussed below. In this example, the dimple or divot 594 can be placed onto the first cap 590A at an off-centered position, which may provide for the positioning of a logo if desired. Additionally, optionally, in this example, one or more magnets 593 can be placed into the second cap 590B to control the slider as discussed herein. The magnets 593 can include one or more of clamping, positioning and guide magnets as discussed above. Once the disc 590 is formed, it can be placed into a lid to improve the insulative properties of the lid.

To achieve a vacuum between the walls of the disc, the air within the disc can be removed by heating the disc 590 within a vacuum and removing the air within the interior of the disc 590 through an opening in the divot or dimple 594 located on the upper cylindrical piece or cap 590A. Specifically, the disc 590 once formed with the first cap 590A and the second cap 590B can be placed into a vacuum formation chamber, and a resin, which can be in the shape of a pill, can be placed into the divot or dimple 594 during the vacuum forming process. In certain examples, the resin can be approximately 3 mm to 5 mm in diameter, and the opening in the dimple 594 can be approximately 1 mm in size. In this way, when the disc 590 is heated, the resin becomes viscous so as to not flow or drip into the disc through the opening in the dimple 594. However, the resin is permeable to air such that the air can escape the internal volume of the disc. Once the resin cools and solidifies, it covers the openings of the disc 590 and seals the internal volume of the disc 590 to form a vacuum within the disc 590. The dimple 594 can be covered by welding a cover over the dimple of the same material as the disc, by capping the dimple, or otherwise covering the dimple. Again, once the disc 590 is formed, it can be placed into a lid to provide for insulation in the lid.

Moreover, a series of magnets 593 can be placed into the disc 590 and can be oriented in a similar fashion as the magnets 593 discussed above to control and clamp the slider to the lid. In one example, the magnets 593 can be placed into the disc 590 prior to vacuumization. Additionally, the magnets 593 may also be magnetized either before or after the vacuumication process.

Figure 27:
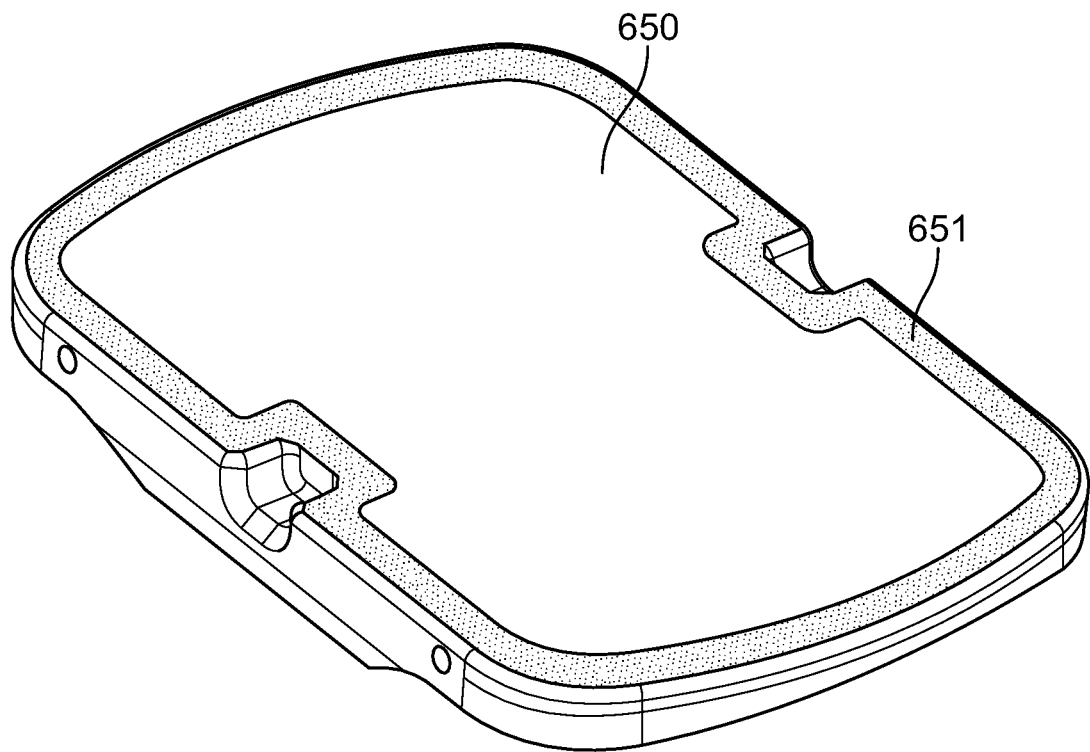
FIG. 27 shows a bottom view of an exemplary slider.

In certain examples, the slider can be formed as a rigid plastic such as the materials disclosed herein. FIG. 27 shows an example slider 650 that can be used in conjunction with the exemplary lids discussed herein. In this example, the underside of the slider 650 can include a rubber material along the perimeter 651 of the slider for increasing the leak resistance of the lid assembly. The rubber material may also reduce the amount of noise that occurs when the slider is opened and closed. In one example, the rubber material can be overmolded onto the slider 650 after the slider 650 is produced or can be formed from different rubber materials such as silicone rubber or thermoplastic elastomer (TPE). Additionally, the entire slider 650 can be formed of a rubber material such as silicone rubber or TPE. Moreover, the rubber can be only located around the edge of the underside of the slider and can be slightly raised to reduce the amount of friction between the slider 650 and the lid.

Figure 28:
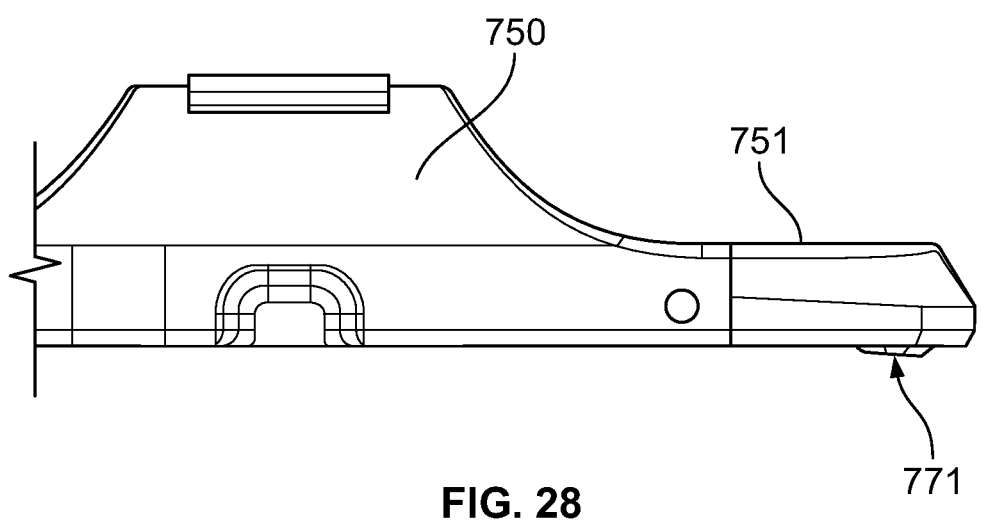
FIG. 28 shows a partial side view of another exemplary slider.

FIG. 28 shows another example slider 750, which is similar to the examples discussed herein, where like reference numerals represent similar features with similar functionality. In this example, each symmetrical flange, e.g., 751 of the slider 750 can include a tapered portion 771, which can taper inwardly. The tapered portion 771 can be configured to engage the opening for pouring liquid on the lid. The tapered portion 771 can make the force that is required to close the slider less than the force required to open the slider such that the slider does not snap closed as forcefully and closes more easily. This may help to reduce the tendency of the slider 750 to splash any liquid settled on the surface near the opening in the lid for pouring the contents of the container. It is also contemplated that any of the sliders discussed herein may include the tapered portion for changing the closing force and for reducing the amount of splashing on the lid. Moreover, it is also contemplated that the tapered portion 771 can be included on other locations on the slider 750 to decrease the closing force of the slider 750.

FIGS. 29-32B show another example slider lid assembly 800, which is similar to the examples discussed herein, where like reference numerals represent similar features with similar functionality. The lid 810 and the slider 850 of the lid assembly 800 can include similar features and functionality as the examples above and may include features from the examples discussed herein that are not specifically discussed or shown in relation to the example lid assembly 800. However, in contrast with the examples above, the example slider lid assembly 800, the lid 810 and slider 850 can be provided with three magnets, which in this example can be disc magnets 872, 874A, and 874B.

Figure 29:
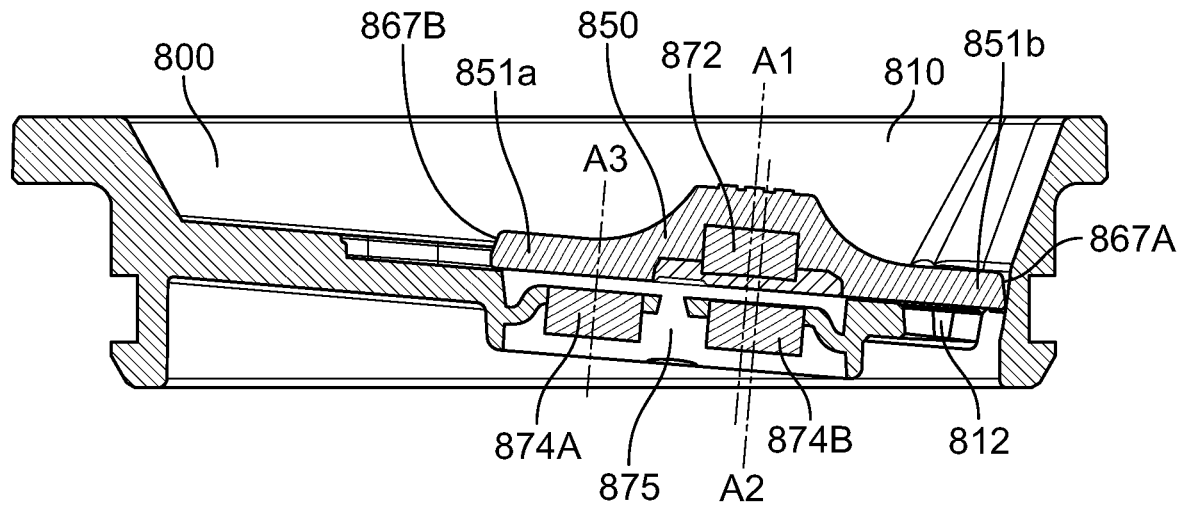
FIG. 29 shows a cross-sectional view of another exemplary slider and lid.

As depicted in the cross-sectional view of FIG. 29, a first clamping and positioning magnet 872 can be provided within the slider 850, and a second clamping and positioning magnet 874A, and a third clamping and positioning magnet 874B can be provided within the lid 810. In this example, the magnets 872, 874A, and 874B can maintain the slider 850 onto the lid 810, and maintain the slider 850 in either the open or closed positions during the use of the slider 850. For instance, the first clamping and positioning magnet 872 in the slider interacts with the second clamping and positioning magnet 874A to maintain the lid in the opened position; whereas the first clamping and positioning magnet 872 in the slider interacts with the third clamping and positioning magnet 874B to maintain the lid in the closed position.

Figure 30:
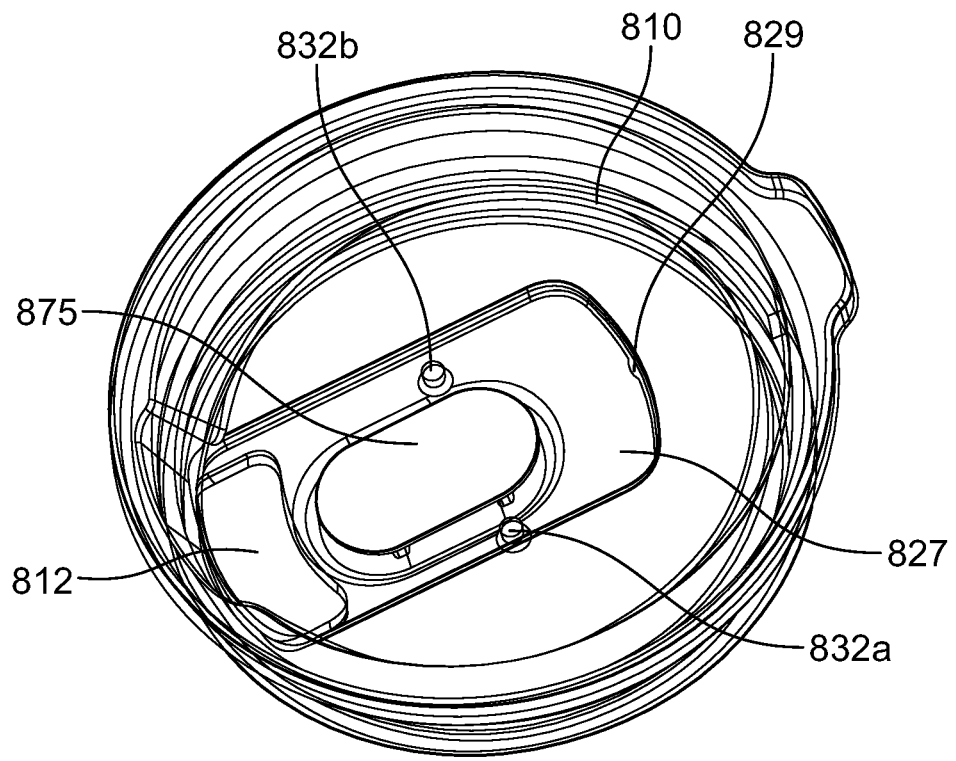
FIG. 30 shows a perspective view of the exemplary lid of FIG. 29.

FIG. 30 shows a perspective view of the lid 810 without the slider 850. As shown in FIG. 30, a magnet shroud 875 can be positioned in the top of the lid 810. The magnet shroud 875 may include the second clamping and positioning magnet 874A and the third clamping and positioning magnet 874B, where the second clamping and positioning magnet 874A and the third clamping and positioning magnet 874B can be encased within the magnet shroud 875. In one example, the magnet shroud 875 can be molded into the lid 810 as an integral assembly.

Also as shown in FIG. 30, the lid 810 may also include a nub 829 within the channel 827. The nub 829 can be located on a rear wall of the channel 827. The nub 829 provides a stop for the slider 850, such that the slider 850 engages the nub 829 when in the fully opened position. In this way, a gap can be formed between the slider 850 and the rear wall of the channel 827 and when any liquid is located in the channel 827, the gap can help to prevent displacement of liquid within the channel 827. This, in turn, helps to prevent the slider movement to the opened position from splashing the user with the liquid located in the channel 827. In addition, the slider 875 can be provided with tapered ends 867A, 867B, which also creates spacing between the slider 875 and the channel, thus, reducing the amount of splashing of any contents located in the channel 827 of the lid 810. This may help especially near the opening of the lid, where due to the angle of the channel 827, liquid tends to travel down the slope of the channel 827 and collect near the opening 812 in the lid 810. In this way, when the user closes the lid 810 with the slider 850, the splashing of the contents near the opening of the lid 810 is reduced.

Figure 31A:
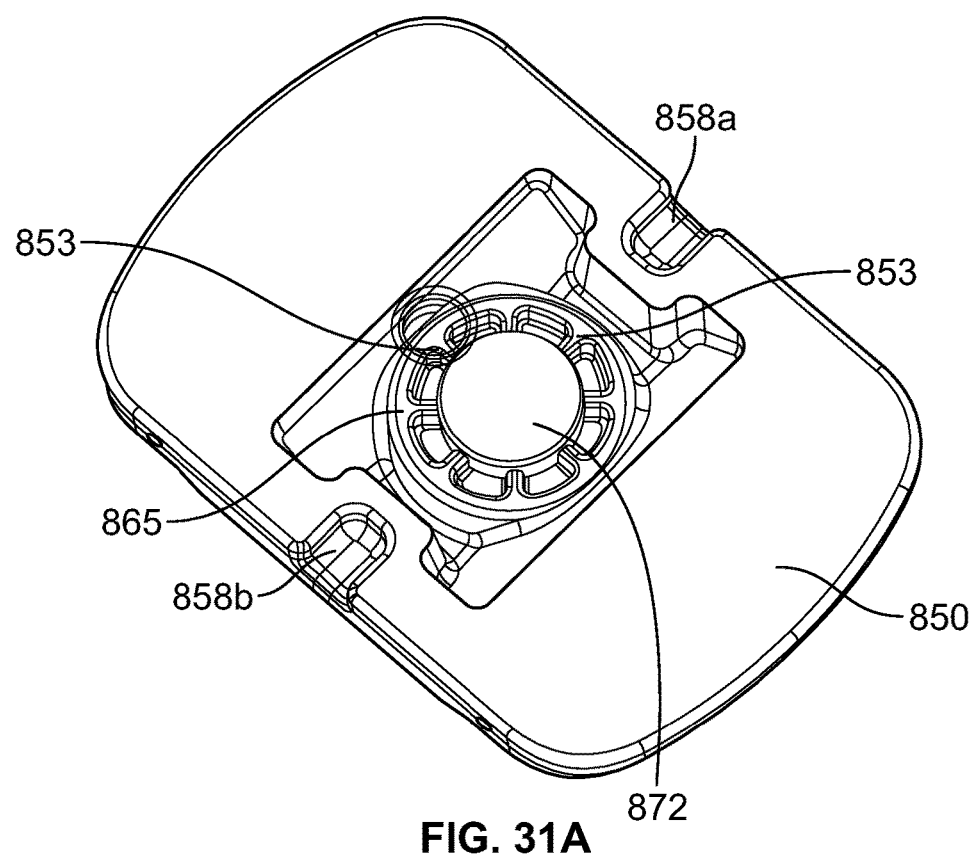
FIG. 31A shows a bottom view of a partial assembly of an example slider.

The slider 850 can generally have a similar outward appearance as the slider 450 discussed above in relation to FIGS. 20-24, but in certain examples can be formed wider and can be formed according to the method discussed below. For example, the slider 850 can be formed by a two shot over-molding process. During this process, the positioning magnet 872 can be placed within a mold for forming the slider 850. During the formation of the body of the slider 850 in the mold, the slider 850 can be formed with a cavity 865 for receiving the first clamping and positioning magnet 872, which is shown in FIG. 31A. The cavity 865 can be formed with a series of legs or claws 853 that are configured to hold the first clamping and positioning magnet 872 in place during the formation of the slider 850.

In one exemplary process, the legs or claws 853 can be formed around the first clamping and positioning magnet 872 to hold the first clamping and positioning magnet into place during the formation of the slider and, in particular, during the application of the second shot of material forming the slider 850. The legs or claws 853 can be positioned in the slider 850 in a circular arrangement, where there are eight claws holding the magnet 872 in place. In other examples, there can be more or fewer numbers of legs or claws to hold the magnet 872 into place. In one example, a circumference of the opening defined by the legs or claws 853 can be slightly smaller than the circumference of the first clamping and positioning magnet 872, such that the first clamping and positioning magnet 872 is held into place by way of a friction fit.

It is also contemplated that the claws can be omitted entirely, and a circular opening can be formed in the slider prior to the placement of the first clamping and positioning magnet. In this example, the circular opening can be configured to receive the first clamping and positioning magnet 872 therein. In this way, the opening could be sized slightly smaller than the first clamping and positioning magnet 872 such that an interference fit is formed between the opening and the first clamping and positioning magnet 872 to hold the first clamping and positioning magnet 872 in place while the remainder of the slider 850 is formed.

Figure 31B:
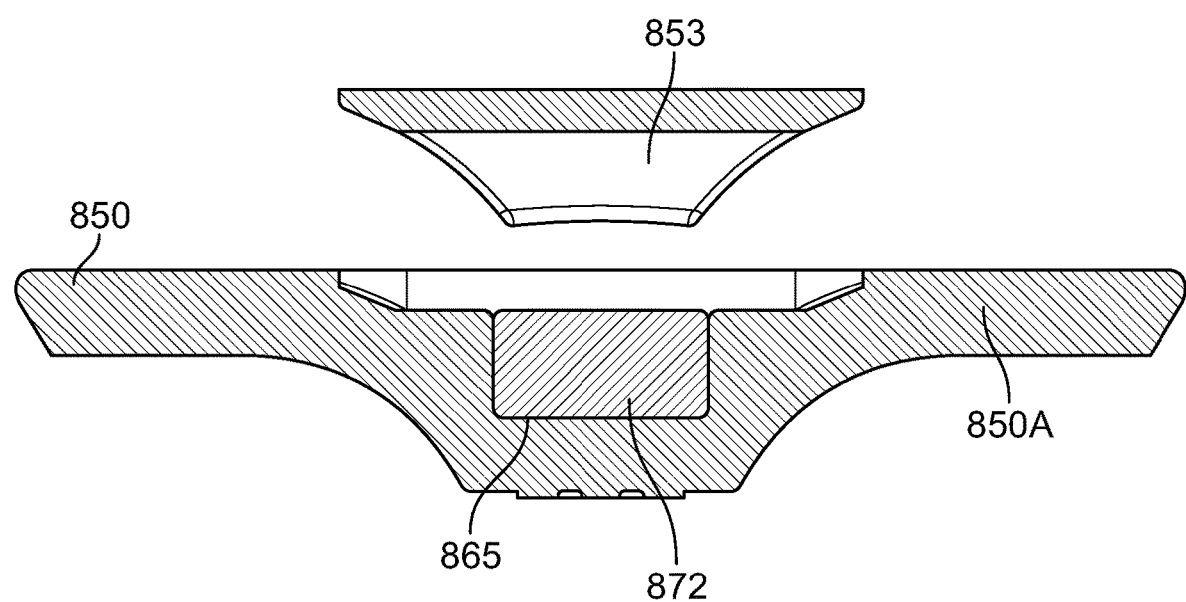
FIG. 31B shows a cross-sectional view of an exemplary method of forming the slider of FIG. 29.

FIG. 31B illustrates an exemplary technique for forming the slider 850. The first clamping and positioning magnet 872 can be placed into a mold for forming the body of the slider 850. In one example, a robot can place the magnet 872 into the mold. Once the magnet 872 is placed within the mold, the slider body 850A can be injected molded by a first shot of material such that a cavity or opening 865 is formed therein around the magnet 872. In addition, during the formation of the first shot of material, the legs or claws 853 can also be formed around the magnet to hold the magnet 872 into place while the second shot of material 853 is added. The second shot of material 853 can be added to cover the first clamping and positioning magnet 872 and to seal the first clamping and positioning magnet 872 into place within the slider 850. Once the first clamping and positioning magnet 872 is sealed within the slider, it can then be magnetized in a suitable operation.

In an alternative example, the first clamping and positioning magnet 872 can be placed into the slider 850 after the first shot forming the slider body is cured. In this example, the first clamping and positioning magnet 872 can be placed into the opening formed by the legs or claws 853. The legs or claws 853 can flex outwardly to receive the first clamping and positioning magnet 872, and the internal flexibility of the legs or claws 853 can maintain the first clamping and positioning magnet 872 in position within the slider 850. In this way, the legs or claws 853 can form an interference fit with the first clamping and positioning magnet 872 to maintain the first clamping and positioning magnet 872 in place during the formation of the slider 850. Again, in this example, the first clamping and positioning magnet 872 can be placed into the cavity 865 by a robot. Once the first clamping and positioning magnet is held into place by the legs or claws, the second shot of material can be added.

In another example, the first clamping and positioning magnet 872 can be in-molded into the slider 850. For example, the first clamping and positioning magnet 872 could be placed in a mold and a single shot of injection molded material could encase the first clamping and positioning magnet 872. After this step, the first clamping and positioning magnet 872 could then be magnetized.

In other examples, the first clamping and positioning magnet 872 could be secured by an adhesive or a suitable mechanical fastener connection, such as a thread, bayonet, ball and socket, or an interference-fit type of connection. With any of the methods for securing the first clamping and positioning magnet 872, it is contemplated that the first clamping and positioning magnet 872 could be pre-magnetized or magnetized after being secured to the slider 850. Moreover, it is contemplated that the first clamping and positioning magnet can be magnetized prior to the injection molding process or after the injection molding process with respect to any of the formation processes discussed herein.

Figure 32B:
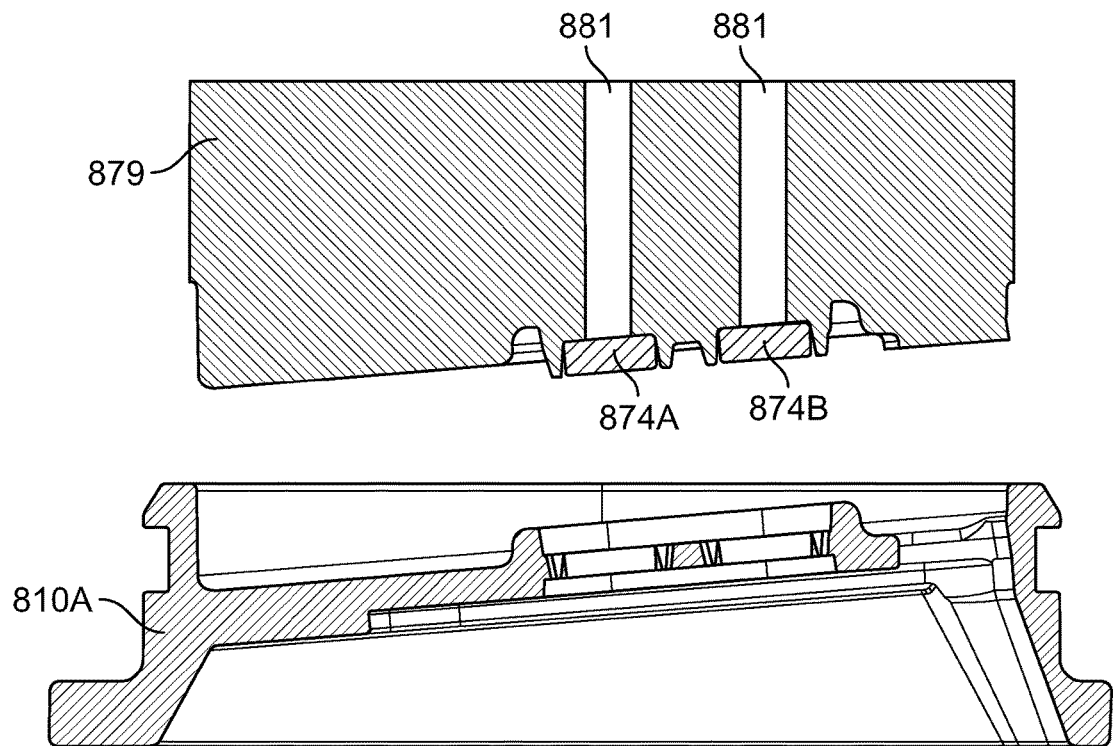
FIGS. 32B and 32C show cross-sectional views of an exemplary method of forming the lid of FIG. 29.
Figure 32C:
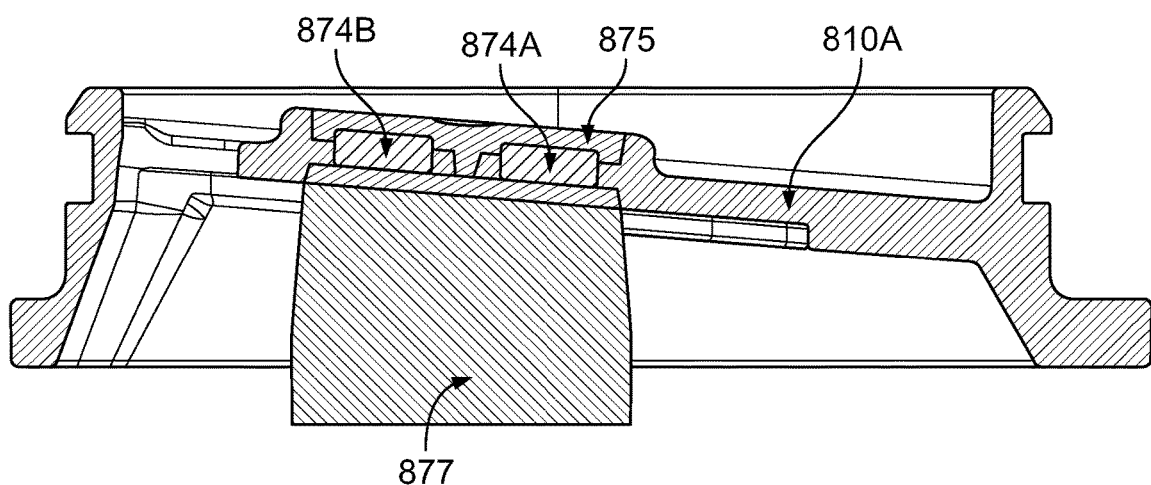
Figure 6:
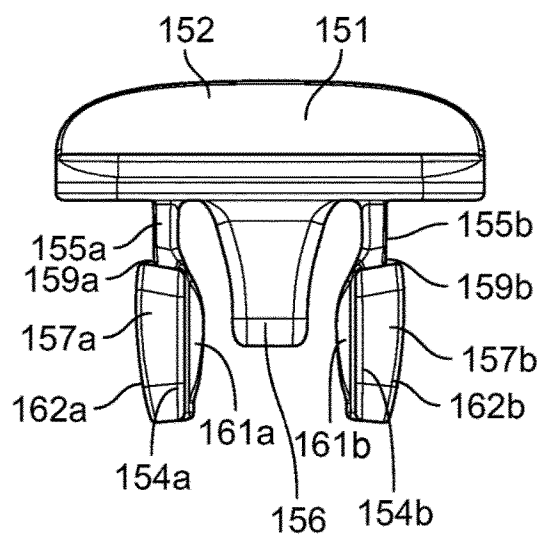
Figure 7:
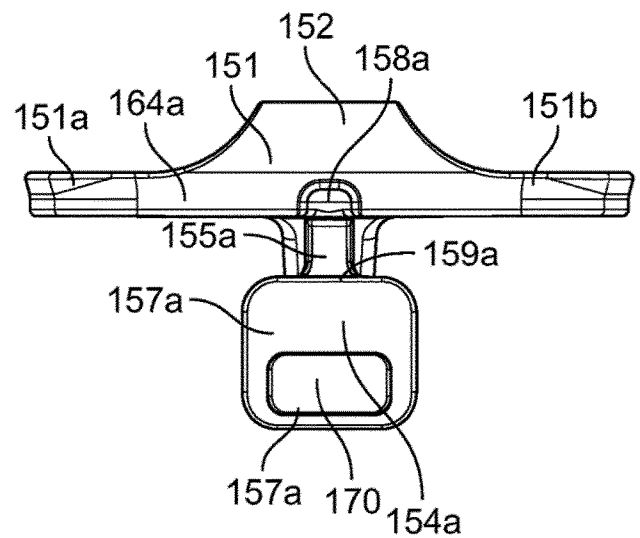
Figure 8:
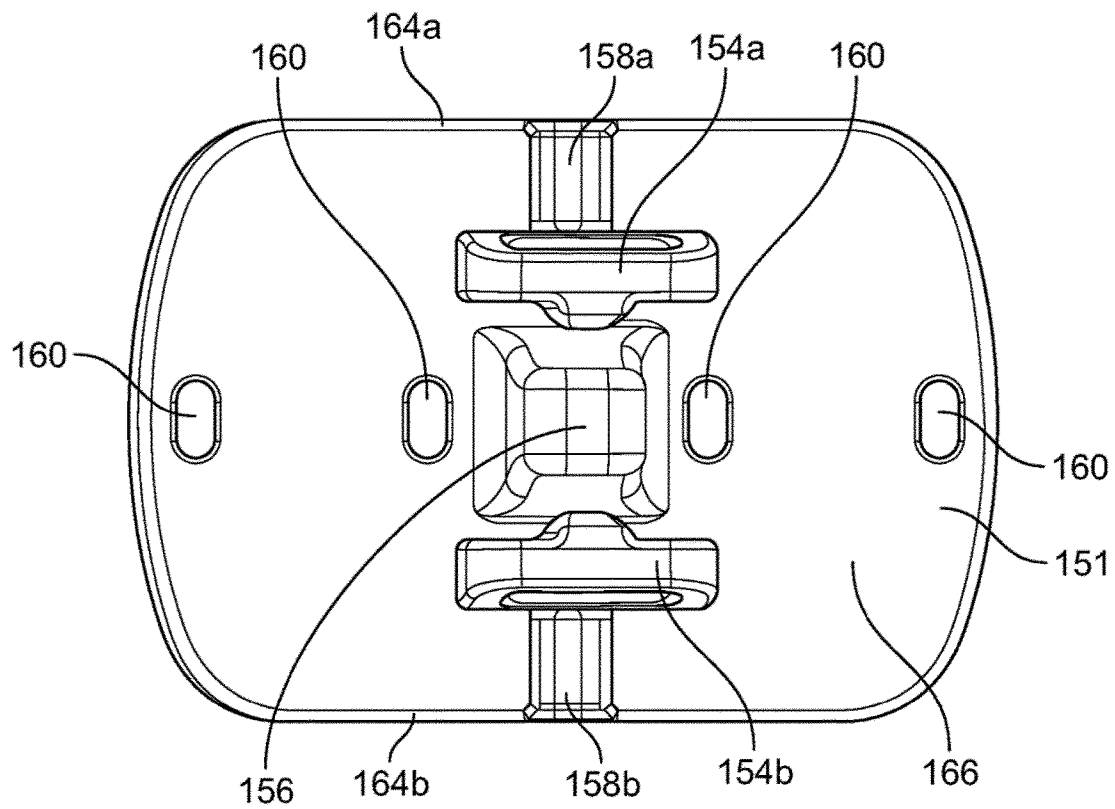

FIGS. 32A and 32B show an exemplary lid 810 during formation. In certain examples, the lid 810 may be formed mostly of a clear polymeric material, including, among others, Acrylonitrile Butadiene Styrene, polypropylene, polyethylene, polystyrene, polyvinyl chloride, nylon, polycarbonate or acrylic, or combinations thereof. In one example, the magnet shroud 875 can be formed of a black polymeric material, such as the materials discussed herein, among others. In certain examples, the lid 810 can be injection molded with several shots of material, which in one example can be two shots of material. For example, the lid body 810A can be formed of a first shot of material, and the magnet shroud 875 can be formed of a second shot of material.

FIG. 32A shows a partial bottom view of the lid body 810A. Similar to the slider 850 the lid body 810 can be formed with a cavity 811 for receiving the second clamping and positioning magnet 874A and the third clamping and positioning magnet 874B. The cavity 811 may also include a series of legs or claws 853 that are configured to hold the second clamping and positioning magnet 874A and the third clamping and positioning magnet 874B in position during the formation of the lid 810. The legs or claws 813 can be positioned in the lid body 810A in a circular arrangement to provide a location for the second clamping and positioning magnet 874A and the third clamping and positioning magnet 874B where there are four claws 813 holding each of the second clamping and positioning magnet 874A and the third clamping and positioning magnet 874B magnet in place. In another example, there may only be two claws holding each magnet in place. In other examples, there can be more or fewer numbers of legs or claws to hold each magnet into place.

The legs or claws may also each be provided with a lip 813A. The lips 813A provide additional retention support for maintaining the second clamping and positioning magnet 874A and the third clamping and positioning magnet 874B in place during formation of the lid 810. In certain examples, the circumference of the openings provided by the legs or claws 813 can be slightly smaller than the circumference of the second clamping and positioning magnet 874A and the third clamping and positioning magnet 874B to hold the second clamping and positioning magnet 874A and the third clamping and positioning magnet 874B in place during the formation of the lid. The second clamping and positioning magnet 874A and the third clamping and positioning magnet 874B can be held into place in the openings formed by the legs or claws 813. Additionally or alternatively, the legs or claws 813 can form an interference fit with the second clamping and positioning magnet 874A and the third clamping and positioning magnet 874B to maintain second clamping and positioning magnet 874A and the third clamping and positioning magnet 874B in place during the formation of the lid 810.

FIG. 32A1 shows another partially formed lid example. In this example, instead of utilizing four claws to retain each magnet in place on the lid body 810A, the partially formed lid two posts or legs 913A can be formed adjacent to each magnet 974A, 974B. The posts 913A help to retain each of the magnets 974A, 974B in place during the formation of the lid and specifically when the second shot of material is applied to cover the magnets and form the magnetic shroud 875. In other examples, there can be more or fewer numbers of posts or legs to hold each magnet into place.

As shown in FIG. 32B, during the formation of the lid 810, the second clamping and positioning magnet 874A and the third clamping and positioning magnet 874B can be positioned in the mold forming the lid. In one example, the second clamping and positioning magnet 874A and the third clamping and positioning magnet 874B can be placed into a mold by a robotic arm. A first shot of material can then be injection molded around the second clamping and positioning magnet 874A and the third clamping and positioning magnet 874B. The first shot of material can include the lid body 810A. Referring back to FIGS. 32A and 32A1, the underside of the lid body may be formed with legs or claws 813, 913 for maintaining the magnets 874A, 874B, 974A, 974B in position while the magnet shroud 875 is formed around each of the magnets.

In one example, a vacuum can be applied to the openings 891 in the suction device 879 through the separate openings 881 to hold the second clamping and positioning magnet 874A and the third clamping and positioning magnet 874B in place on the suction device 879 while being placed into a mold forming the lid body 810A. The application of a vacuum to the suction device 879 ensures that the second clamping and positioning magnet 874A and the third clamping and positioning magnet 874B are inserted in the correct position on the lid. Other examples for applying the second clamping and positioning magnet 874A and the third clamping and positioning magnet 874B to the lid are also contemplated.

After the first shot of material is complete, a second shot of material can be applied to the lid 810. In one example, a core insert 877, shown in FIG. 32C, can be used to control the second shot of material forming the magnet shroud 875. The second shot of material that forms the magnet shroud 875 can completely enclose the second clamping and positioning magnet 874A and the third clamping and positioning magnet 874B. In this way, the second clamping and positioning magnet 874A and the third clamping and positioning magnet 874B are not exposed to liquids or the user. The shroud 875 also hides the second clamping and positioning magnet 874A and the third clamping and positioning magnet 874B to give the lid 810 a cleaner and better appearance. After the lid 810 is formed, the second clamping and positioning magnet 874A and the third clamping and positioning magnet 874B can be magnetized after the molding process.

In other examples, the second clamping and positioning magnet 874A and the third clamping and positioning magnet 874B can be placed into the lid 810 after the lid is formed. In placing the second clamping and positioning magnet 874A and the third clamping and positioning magnet 874B into the lid, the legs or claws can flex outwardly to receive the second clamping and positioning magnet 874A and the third clamping and positioning magnet 874B over their respective lips 813A, and the internal flexibility of the legs or claws 813 can maintain the second clamping and positioning magnet 874A and the third clamping and positioning magnet 874B in position in the lid body 810A during the formation of the lid 810. This same technique could be employed with the example discussed in relation to FIG. 32A1.

In this alternate example, after the second clamping and positioning magnet 874A and the third clamping and positioning magnet 874B are inserted into the openings formed by the legs 813 in the lid body, the magnet shroud 875 can then be formed by a second shot of material. In one example, the second shot of material can be formed of a black polymeric material, such as the materials discussed herein, among others, to conceal the second clamping and positioning magnet 874A and the third clamping positioning magnet 874B.

It is also contemplated that in other examples, the second clamping and positioning magnet 874A and the third clamping and positioning magnet 874B could be secured to the lid body 810A by an adhesive or a suitable mechanical fastener connection, such as a thread, bayonet, ball and socket, or an interference-fit type of connection. With any of the methods for securing the second clamping and positioning magnet 874A and the third clamping and positioning magnet 874B to the lid body 810A, it is contemplated that the first clamping and positioning magnet 872 could be pre-magnetized or magnetized after being secured to the slider 850.

Lid 810 and slider 850 may operate similar to the examples discussed herein above. During the operation of the slider 850, the first clamping and positioning magnet 872 can interact with either the second clamping and positioning magnet 874A or the third clamping and positioning magnet 874B. In the opened position, the first clamping and positioning magnet 872 interacts with the second clamping and positioning magnet 874A. The attraction of the first clamping and positioning magnet 872 to the second clamping and positioning magnet 874A holds or locks the slider in the opened position such that the slider uncovers the opening 812 for liquid in the lid 850. In the closed position, the first clamping and positioning magnet 872 interacts with the third clamping and positioning magnet 874B. The attraction of first clamping and positioning magnet 872 to the third clamping and positioning magnet 874B locks or holds the slider 850 in the closed position such that the slider 850 is positioned over the opening 812 and seals the opening of the lid 850. This helps to prevent liquid from exiting the opening.

Additionally, referring again to FIG. 29, when in the closed position, the axes $A_1$, $A_2$, and $A_3$ of magnet 872 in the slider 850 and magnets 874B in the lid can be arranged slightly out of alignment with each other. This creates a stronger pulling force on the slider 850 such that it is maintained in the closed position during the use of the lid 810. For example, as shown in FIG. 29, the axis $A_1$ of magnet 872 is arranged slightly out of alignment with axis $A_2$ of magnet 874B. Additionally, although not shown, the axis $A_1$ of the magnet 872 in the slider 850 and the axis $A_3$ of the magnet 874A can be arranged slightly out of alignment with each other to create a pulling force on the slider 850, thus maintaining the slider 850 in the opened position during the use of the lid 810.

Also the clamp force between the slider and the lid can be sufficient to withstand force from the pressure of a filled container being turned upside down. In this way, the slider 850 will remain in the closed position while the pressure from the liquid acts on the flange 851a or the flange 851b through the opening of the lid 810. In one specific example, the force produced by the interaction of the magnets can be at or between 0.25 to 2.0 lbs. Additionally, the clamping force can be configured such that the slider 850 will eventually open to vent in the case of a hot and/or pressurized liquid. This may be desirable as opposed to a fully sealed non-venting/leaking lid or a press-fit lid on a container, because the press-fit lid may come off of the container completely when encountering a highly pressurized liquid. In certain examples, the clamping force on the lid provided by the magnets can be formed less than the holding force of the gasket between the lid and the container. For example, the lid 810 can be held onto the container by a first force and the slider 850 can be held onto the lid by a second force, and the first force can be greater than the second force such that the slider will release from the lid prior to the lid releasing from the container. In this way, the clamping force provided by the magnets can be less than the holding force of the gasket between the lid and the container such that the slider will vent prior to the gasket, thus, preventing the container from rapidly spilling.

The user may also be able to remove the slider 850 from the lid 850 when desired for cleaning purposes or when the slider is not desired during the use of the lid 800. Like in the above examples, the slider 850 can be symmetric such that the slider 850 may be placed onto the lid 850 in any orientation.

Additionally, in certain examples, the surface roughness of the area of the lid that interacts with the slider 850 can be adjusted depending on the desired amount of feedback for the user. For example, the surface roughness of the area of the lid that interacts with the slider 850 may be reduced to allow the user to easily manipulate the slider 850 from the closed position to the opened position and from the opened position to the closed position during the use of the product.

An exemplary lid assembly may include a rim for engaging an opening of a container. The rim can define a top wall and a lid tab extending from the top wall. The exemplary lid can include a side wall defining a groove for placement of a gasket, and a middle wall extending below the rim. The middle wall can define a recess. The recess can have a first opening, a second opening, at least one detent, and at least one air vent. Additionally, a first guide and a second guide can extend from the second opening.

The exemplary lid may also include a slider configured to selectively provide a closed position by covering both the first opening and the second opening and an opened position by only covering the second opening. The slider may include a slider tab, an elastic first leg, an elastic second leg, a central post, and at least one slider recess for receiving the at least one detent of the middle wall. The first leg and the second leg can be configured to extend through the central opening and can be configured to resiliently engage the first guide and the second guide. Moreover, the at least one detent can be configured to extend into the slider recess to maintain the slider in the closed position or the opened position.

The slider can also include a channel, and the channel can be configured to align with the at least one air vent when the slider is in the open position. The slider may also include a first side wall and a second side wall. The first side wall can at least partially define the channel. The second side wall can at least partially define a second channel, and the first channel can be configured to align with the at least one air vent. The second channel can be configured to align with a second air vent on the middle wall recess when the slider is in the opened position. Moreover, the first channel and the second channel can be additionally formed in a bottom surface of the slider.

The first leg and the second leg can each comprise a first portion and a second portion, and the second portion can be formed thicker than the first portion. The first leg may define a first ridge, and the second leg may define a second ridge. The first ridge can be configured to engage the first guide and the second ridge can be configured to engage the second guide. The central post can be tapered and can diverge from a bottom surface of the tab, and the central post can limit inward movement of the elastic first leg and the elastic second leg. The first leg and the second leg can be tapered to permit the legs to flex inward as the slider is placed into the central opening. The slider may include two degrees of symmetry so that the slider can be placed onto the lid assembly in different orientations.

In another example a container assembly can include a container and a lid having a wall defining a recess. The recess can include an opening for receiving liquid from the container. The container assembly may also include a slider having a handle. The slider can be configured to slide in the recess and can be configured to move between a closed position where the slider covers the opening to aid in preventing spilling of contents of the container and an opened position where the slider uncovers the opening such that the contents of the container can be consumed. The slider is configured to lock into place on the lid and can be configured to be removable from the lid. Additionally, the slider can be configured to lock into place on the recess in both the closed position and the opened position. In one example, the container can be formed of stainless steel.

The lid can include a rim for engaging an opening of the container, the rim may define a top wall and a lid tab extending from the top wall. The recess of the lid can also include a second opening for receiving the slider therein, and a first guide and a second guide can extend from the second opening.

Furthermore, the slider may include a slider recess for receiving the at least one detent. The at least one detent can be configured to extend into the slider recess to maintain the slider in the closed position or the open position. The slider may also include an elastic first leg, an elastic second leg, and a central post. The first leg and the second leg can be configured to extend through the second opening and to resiliently engage the first guide and the second guide. The first leg can define a first ridge, and the second leg can define a second ridge. The first ridge can be configured to engage the first guide, and the second ridge can be configured to engage the second guide. The first leg and the second leg can be tapered to permit the legs to flex inward as the slider is placed into the central opening. The central post can limit inward movement of the elastic first leg and the elastic second leg. The slider may include a channel, and the channel can be configured to align with an air vent when the slider is in the open position. Additionally, the slider can include two degrees of symmetry such that the slider can be placed on the lid in different orientations.

In another example, a lid assembly may include a rim for engaging an opening of a container, the rim defining a top wall, a side wall defining a groove for placement of a gasket. The lid assembly may also include a slider which may have a slider tab, a first clamping magnet, and a first positioning magnet and may include a middle wall extending below the rim. The middle wall may have a first opening and at least one air vent, a second clamping magnet, a second positioning magnet, and a third positioning magnet. The slider can be configured to selectively provide a closed position by covering the first opening and an opened position by uncovering the first opening and the at least one air vent. The first clamping magnet on the slider can be configured to interact with the second clamping magnet on the middle wall to maintain the slider on the lid and the first positioning magnet can be configured to interact with the second positioning magnet to maintain the slider in the closed position, and the first positioning magnet can be configured to interact with the third positioning magnet to maintain the slider in the opened position.

The slider can also include a channel and the channel can be configured to align with the at least one air vent when the slider is in the open position. The slider may also include a first side wall and a second side wall, and the first side wall can at least partially define the channel, and the second side wall can at least partially define a second channel. The first channel can be configured to align with the at least one air vent. The second channel can be configured to align with a second air vent on the middle wall when the slider is in the opened position. The first channel and the second channel can be additionally formed in a bottom surface of the slider. The slider can further include a fourth positioning magnet and the fourth positioning magnet can be configured to interact with the second positioning magnet to maintain the slider in the closed position, and the fourth positioning magnet can be configured to interact with the third positioning magnet to maintain the slider in the opened position. The middle wall can further comprise a channel configured to receive the slider. Alternatively, the middle wall can include a first guide magnet and a second guide magnet, and the first guide magnet and the second guide magnet can maintain the slider on the lid in the lateral direction. The slider can have a degree of symmetry such that the slider can be placed onto the lid assembly in different orientations.

The lid may further include a limiting magnet, and the limiting magnet can be configured to repel or attract the slider to prevent the slider from moving beyond the opened position on the lid. The lid can further include an insulating disc, and the insulating disc can be vacuum formed. The insulating disc may include the second clamping magnet, the second positioning magnet, and the third positioning magnet. When the slider moves to either the opened position or the closed position the interaction of the slider and the lid can produce a sound indicating to the user that the slider is in either the open position or the closed position.

In another example, a container assembly may include a container, a lid having an opening for receiving liquid from the container, a slider having a handle, and the slider can be configured to slide along the lid. The slider can be configured to move between a closed position where the slider covers the opening to aid in preventing spilling of contents of the container and an opened position where the slider uncovers the opening such that the contents of the container can be consumed. The slider can be configured to lock into place on the recess in both the closed position and the opened position, and the slider can be configured to be secured on the lid and can be configured to be removable from the lid. The slider can include a first clamping magnet, and a first positioning magnet and the lid may also include a second clamping magnet, a second positioning magnet, and a third positioning magnet. The first clamping magnet on the slider may be configured to interact with the second clamping magnet on the lid to maintain the slider on the lid. The first positioning magnet can be configured to interact with the second positioning magnet to maintain the slider in the closed position, and the first positioning magnet can be configured to interact with the third positioning magnet to maintain the slider in the opened position.

The slider may also include a fourth positioning magnet and the fourth positioning magnet can be configured to interact with the second positioning magnet to maintain the slider in the closed position, and the fourth positioning magnet can be configured to interact with the third positioning magnet to maintain the slider in the opened position.

The slider may also include a channel, and the channel can be configured to align with at least one air vent on the lid when the slider is in the open position. The lid may also include a channel configured to receive the slider. Alternatively, the lid can include a first guide magnet and a second guide magnet and the first guide magnet and the second guide magnet can maintain the slider on the lid in the lateral direction. The slider can include a degree of symmetry such that the slider can be placed onto the lid assembly in different orientations. The lid can further include a limiting magnet, and the limiting magnet can be configured to repel or attract the slider to prevent the slider from moving beyond the opened position on the lid. The lid may also include an insulating disc, and the insulating disc can be vacuum formed. The insulating disc may include the second clamping magnet, the second positioning magnet, and the third positioning magnet.

In another example, a method of forming a lid assembly can include one or more of: injection molding a lid body of a first shot of material, injection molding a first plate portion of a second shot of material onto the lid body, injection molding a second plate portion of a third shot of material onto the lid body, and injection molding a seal portion with a third shot of material to seal the first plate portion and the second plate portion to the lid body. The method may further include in-molding a magnet assembly into the second plate portion. A channel can be formed between the first plate portion and the second plate portion and the second shot of material can be combined with the third shot of material. The method may also include trapping a pocket of air between the lid body and both the first plate portion and the second plate portion.

In another example, a container assembly may include a container, a lid having an opening for receiving liquid from the container, and a slider having a handle. The slider can be configured to slide along the lid, and the slider can be configured to move between a closed position where the slider covers the opening to aid in preventing spilling of contents of the container and an opened position where the slider uncovers the opening such that the contents of the container can be consumed. The slider can be configured to lock into place in both the closed position and the opened position, and the slider can be configured to be secured on the lid. The slider may also be configured to be removable from the lid.

In one example, the slider and the lid may include a series of magnets for locking the slider in both the closed position and in the opened position. The series of magnets may also help to maintain the slider on the lid. The series of magnets may include a first clamping and positioning magnet, a second clamping and positioning magnet, a third clamping and positioning magnet. The first clamping and positioning magnet can be configured to interact with the second clamping and positioning magnet to maintain the slider in an opened position and the first clamping and positioning magnet can be configured to interact with the third clamping and positioning magnet to maintain the slider in a closed position. The first clamping and positioning magnet can be located on the slider, and the second clamping and positioning magnet and the third clamping and positioning magnet can both be located on the lid. A magnet shroud can hold the second clamping and positioning magnet and the third clamping and positioning magnet. The magnet shroud may also be placed in the lid.

In certain example, the slider may include a channel, and the channel may be configured to align with at least one air vent on the lid when the slider is in the open position. The lid may also include a channel configured to receive the slider and the channel may limit lateral movement of the slider. The channel may define a nub configured to form a gap between the slider and a rear wall of the channel when the slider is in the opened position such that the gap helps to prevent displacement of liquid in the channel. Additionally, the slider may be tapered at each end to provide for areas between each end of the slider and the channel, which can help to prevent displacement of liquid in the channel.

The slider may include a degree of symmetry such that the slider can be placed onto the lid in different orientations. Additionally the lid can be held onto the container by a first force and the slider can be held onto the lid by a second force, and the first force can be greater than the second force such that the slider will release from the lid prior to the lid releasing from the container. The lid may also include an insulating disc.

In another example, a lid assembly may include a lid having an opening configured to receiving liquid from a container, and a slider having a handle. The slider can be configured to slide along the lid. The slider may be configured to move between a closed position where the slider covers the opening to aid in preventing spilling of contents of the container and an opened position where the slider uncovers the opening such that the contents of the container can be consumed. The slider can be configured to lock into place in both the closed position and the opened position. The slider may be configured to be secured on the lid and can be configured to be removable from the lid.

The slider and the lid may include a series of magnets for locking the slider in both the closed position and in the opened position and for maintaining the slider on the lid. The series of magnets can include a first clamping and positioning magnet, a second clamping and positioning magnet, a third clamping and positioning magnet. The first clamping and positioning magnet can be configured to interact with the second clamping and positioning magnet to maintain the slider in an opened position and the first clamping and positioning magnet can be configured to interact with the third clamping and positioning magnet to maintain the slider in a closed position. The first clamping and positioning magnet can be located on the slider, and the second clamping and positioning magnet and the third clamping and positioning magnet can be located on the lid.

The first clamping and positioning magnet can define a first axis, and the second clamping and positioning magnet can define a second axis and when the slider is in the open position, the first axis and the second axis are unaligned with each other. The third clamping and positioning magnet can define a third axis and when the slider is in the closed position, the first axis and the second axis can be unaligned with each other.

A magnet shroud may be included for receiving the second clamping and positioning magnet and the third clamping and positioning magnet, and the magnet shroud can be placed in the lid. The lid may include a channel configured to receive the slider and wherein the channel limits lateral movement of the slider. The slider may include a degree of symmetry such that the slider can be placed onto the lid in different orientations. The lid may also include an insulating disc.

In another example, a method of forming a lid assembly may include injection molding a slider with a first slider shot of material and forming the first slider shot of material with an opening, placing a first magnet into the opening and injection molding a second slider shot of material over the first magnet. The method of forming a lid assembly may also include injection molding a lid of a first lid shot of material around a second magnet and injection molding a second lid shot of material around the second magnet to form a magnet shroud. The method may include providing the lid with an opening and configuring the slider to selectively lock in a closed position where the slider covers the opening and to selectively lock in an opened position where the slider uncovers the opening. The method may also include injection molding the first lid shot of material around a third magnet and injection molding the second lid shot of material around the third magnet. Also the first lid shot of material may be a clear polymeric material.

Another exemplary method of forming a lid assembly may include injection molding a slider with a first slider shot of material and forming the first slider shot of material with an opening, placing a first magnet into the opening and injection molding a second slider shot of material over the first magnet. The method may also include injection molding a lid of a first lid shot of material to form a lid body and placing a second magnet in the lid body formed by the first lid shot of material and injection molding a second lid shot of material around the second magnet to form a magnet shroud. The example method may also include providing the lid with an opening and configuring the slider to selectively lock in a closed position where the slider covers the opening and to selectively lock in an opened position where the slider uncovers the opening. The method may also include placing a third magnet into the lid body and injection molding the second lid shot of material around the third magnet. Also the first lid shot of material may include a first polymeric material and the second shot of material may include a second polymeric material.

The present disclosure is disclosed above and in the accompanying drawings with reference to a variety of examples. The purpose served by the disclosure, however, is to provide examples of the various features and concepts related to the invention, not to limit the scope of the invention. One skilled in the relevant art will recognize that numerous variations and modifications may be made to the examples described above without departing from the scope of the present invention.

What is claimed is:

1. A container assembly comprising:
a container;
a lid having a first opening for liquid, an air vent, a first guide and a second guide extending parallel to each other, and a pair of second openings;
a slider configured to slide along the lid, the slider comprising a channel located on a bottom surface of the slider;
wherein the slider is configured to move between a closed position where the slider covers the opening to aid in preventing spilling of contents of the container and an opened position wherein the channel is configured to align with the air vent of the lid in the opened position such that air is allowed to vent through the channel and the air vent, and wherein the slider uncovers the first opening such that the contents of the container can be consumed;
wherein the slider further comprises an elastic first leg and an elastic second leg including proximal ends and distal ends, and wherein the distal ends of the elastic first leg and the elastic second leg each comprise a ledge forming a pair of ledges for contacting the first guide and the second guide of the lid and wherein the ledges of the elastic first leg and the elastic second leg extend through the second pair of openings to contact underside surfaces of the first guide and the second guide of the lid;
wherein the slider is configured to be secured on the lid and is configured to be removable from the lid by a user.

2. The lid assembly of claim 1 wherein the lid includes a middle wall and wherein the middle wall extends at an angle with respect to a top wall and a side wall of the lid.

3. The lid assembly of claim 1 wherein the first guide and the second guide are configured to guide the slider from the opened position to the closed position.

4. The lid assembly of claim 3 wherein one or more of the first guide and the second guide are each defined by an edge.

5. The lid assembly of claim 3 wherein the first guide extends adjacent to the pair of second openings.

6. The lid assembly of claim 3 wherein the second guide extends adjacent to the pair of second openings.

7. The lid assembly of claim 1 wherein the cap further comprises a flange and wherein the flange is configured to selectively cover the opening of the lid.

8. The lid assembly of claim 1 wherein the slider includes a tapered portion to move the slider.

9. The lid assembly of claim 1 wherein the elastic first leg and the elastic second leg are each configured to flex to engage the first guide and the second guide.

10. The lid assembly of claim 9 wherein the elastic first leg and the elastic second leg have a flexibility to allow the user to insert the slider onto the lid.

11. The lid assembly of claim 10 wherein the elastic first leg and the elastic second leg distal ends further comprise a tactile element.

12. A container assembly comprising:
a container;
a lid having a first opening for liquid in the container, a track comprising a first guide and a second guide extending parallel to each other, a pair of second openings, and an air vent;
a slider having a channel extending along a bottom of the slider; the slider is configured to slide along the track of the lid; the slider being configured to move between a closed position where the slider covers the opening to aid in preventing spilling of contents of the container and an opened position where the slider uncovers the opening such that the contents of the container can be consumed, the slider being configured to be secured on the lid and is configured to be removable from the lid by the user, and the channel being configured to align with the air vent of the lid such that air is allowed to vent through the channel and the air vent when the lid is in the opened position;
wherein the slider further comprises an elastic first leg and an elastic second leg including proximal ends and distal ends, and wherein the distal ends of the elastic first leg and the elastic second leg each comprise a ledge forming a pair of ledges for contacting the track and wherein the ledges of the elastic first leg and the elastic second leg extend through the second pair of openings to contact underside surfaces of the track.

13. The container assembly of claim 12 wherein the lid includes a middle wall and wherein the middle wall extends at an angle with respect to a top wall and a side wall of the lid.

14. The container assembly of claim 12 wherein the first guide and the second guide are configured to guide the slider from the opened position to the closed position.

15. The container assembly of claim 14 wherein one or more of the first guide and the second guide are each defined by an edge.

16. The container assembly of claim 15 wherein the elastic first leg and the elastic second leg flex allowing the slider to be placed onto the lid, and the slider further comprises a cap and wherein the cap further comprises a flange and wherein the flange is configured to selectively cover the opening of the lid.

17. The container assembly of claim 16 wherein the slider includes a tapered portion to move the slider.

18. The container assembly of claim 16 wherein the elastic first leg and the elastic second leg are each configured to flex to engage the first guide and the second guide.

19. The container assembly of claim 16 wherein the elastic first leg and the elastic second leg distal ends further comprise a tactile element.

20. The container assembly of claim 12 wherein the lid comprises a clear plyometric material.

21. A lid assembly comprising:
a lid comprising a rim for engaging an opening of a container, the rim defining a top wall; the lid having a side wall defining a groove for placement of a gasket; a middle wall extending below the rim, the middle wall having an opening, and at least one air vent, a pair of second openings, a first guide and a second guide extending parallel to each other; and
a slider configured to selectively provide a closed position by covering the opening and an opened position by exposing the opening, the slider comprising a slider tab, an elastic first leg, an elastic second leg, wherein the elastic first leg and the elastic second leg are configured to resiliently engage the first guide and the second guide, the slider further comprising a bottom channel, the channel being configured to align with the vent of the lid such that air is allowed to vent through the channel and the air vent when the slider is in the opened position
wherein the slider further comprises an elastic first leg and an elastic second leg wherein distal ends of the elastic legs each comprise a ledge forming a pair of ledges for contacting the first guide and the second guide of the lid and wherein the ledges of the elastic first leg and the elastic second leg extend through the second pair of openings to contact underside surfaces of the first guide and the second guide of the lid.

22. The lid assembly of claim 21 wherein the middle wall extends at an angle with respect to the top wall and the side wall of the lid.

23. The lid assembly of claim 21 wherein the first guide and the second guide are configured to guide the slider from the opened position to the closed position.

24. The lid assembly of claim 23 wherein one or more of the first guide and the second guide are each defined by an edge.

25. The lid assembly of claim 21 wherein the slider comprises a cap and wherein the cap further comprises a flange and wherein the flange is configured to selectively cover the opening of the lid.

26. The lid assembly of claim 21 wherein the slider includes a tapered portion to move the slider.

27. The lid assembly of claim 21 wherein the elastic first leg and the elastic second leg are each configured to flex to engage the first guide and the second guide.

28. The lid assembly of claim 21 wherein the lid comprises a track for the slider.

29. A lid assembly comprising:
a lid comprising a rim for engaging an opening of a container, the rim defining a top wall; the lid having a side wall defining a groove for placement of a gasket; a middle wall extending below the rim, the middle wall having an opening and a second pair of openings, and at least one air vent, a first guide and a second guide; and
a slider configured to selectively provide a closed position by covering the opening and an opened position by exposing the opening, the slider comprising a slider tab, an elastic first leg, an elastic second leg, wherein the elastic first leg and the elastic second leg are configured to resiliently engage the first guide and the second guide, the slider further comprising a bottom channel, the channel being configured to align with the vent of the lid such that air is allowed to vent through the channel and the air vent when the slider is in the opened position, wherein the elastic first leg and the elastic second leg are formed with proximal ends and distal ends and the elastic first leg and the elastic second leg have a flexibility to allow the user to insert the slider onto the lid and wherein the distal ends of the elastic first leg and the elastic second leg each comprise a ledge forming a pair of ledges for contacting the first guide and the second guide of the lid and wherein the ledges of the elastic first leg and the elastic second leg extend through the second pair of openings to contact underside surfaces of the first guide and the second guide of the lid.

30. The lid assembly of claim 29 wherein the distal ends of the elastic first leg and the elastic second leg further comprise a tactile element.

* * * * *

UNITED STATES PATENT AND TRADEMARK OFFICE
CERTIFICATE OF CORRECTION

| | |
|---|---|
| PATENT NO. | : 11,001,422 B2 |
| APPLICATION NO. | : 17/082957 |
| DATED | : May 11, 2021 |
| INVENTOR(S) | : Seiders et al. |

It is certified that error appears in the above-identified patent and that said Letters Patent is hereby corrected as shown below:

On the Title Page

Column 1, Related U.S. Application Data, Line 1:
Delete "(60)" and insert --(63)--

In the Drawings

Sheet 5 of 20, Fig. 6, Reference Numeral 161a (Second Occurrence):
Delete "161a" and insert --161b-- (see attached replacement sheet)

In the Specification

Column 4, Detailed Description, Line 18:
Delete "of 136" and insert --136 of--

Column 9, Detailed Description, Line 30:
Delete "portion portion" and insert --portion--

Column 9, Detailed Description, Line 51:
Delete "410C." and insert --410D.--

Column 13, Detailed Description, Line 50:
Delete "875" and insert --850--

Column 13, Detailed Description, Line 51:
Delete "875" and insert --850--

Column 17, Detailed Description, Line 42:
Delete "850." and insert --810.--

Signed and Sealed this
Thirteenth Day of September, 2022

Katherine Kelly Vidal
*Director of the United States Patent and Trademark Office*

Column 17, Detailed Description, Line 49:
Delete "850." and insert --810.--

Column 18, Detailed Description, Line 25:
Delete "850" and insert --810--

Column 18, Detailed Description, Line 26:
After "lid", insert --assembly--

Column 18, Detailed Description, Line 28:
Delete "850" and insert --810--

In the Claims

Column 24, Claim 2, Line 17:
Delete "lid" and insert --container--

Column 24, Claim 3, Line 20:
Delete "lid" and insert --container--

Column 24, Claim 4, Line 23:
Delete "lid" and insert --container--

Column 24, Claim 5, Line 25:
Delete "lid" and insert --container--

Column 24, Claim 6, Line 27:
Delete "lid" and insert --container--

Column 24, Claim 7, Line 29:
Delete "lid" and insert --container--

Column 24, Claim 8, Line 32:
Delete "lid" and insert --container--

Column 24, Claim 9, Line 34:
Delete "lid" and insert --container--

Column 24, Claim 10, Line 37:
Delete "lid" and insert --container--

Column 24, Claim 11, Line 40:
Delete "lid" and insert --container--

Column 25, Claim 20, Line 28:
Delete "plyometric" and insert --polymetric--

CERTIFICATE OF CORRECTION (continued)
U.S. Pat. No. 11,001,422 B2

Column 25, Claim 21, Line 47:
After "position", insert --;--